United States Patent
Chen et al.

(10) Patent No.: US 10,572,132 B2
(45) Date of Patent: Feb. 25, 2020

(54) FORMATTING CONTENT FOR A REDUCED-SIZE USER INTERFACE

(71) Applicant: Apple Inc., Cupertino, CA (US)

(72) Inventors: Kevin Will Chen, Sunnyvale, CA (US); Eliza Block, San Francisco, CA (US); Lawrence Y. Yang, Bellevue, WA (US); Christopher Wilson, San Francisco, CA (US); Eric Lance Wilson, San Jose, CA (US); Paul W. Salzman, Palo Alto, CA (US); David Schimon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/881,544

(22) Filed: Jan. 26, 2018

(65) Prior Publication Data

US 2018/0150212 A1 May 31, 2018

Related U.S. Application Data

(63) Continuation of application No. 14/839,889, filed on Aug. 28, 2015, now Pat. No. 9,916,075.
(Continued)

(51) Int. Cl.
*G06T 3/40* (2006.01)
*G06F 17/21* (2006.01)
(Continued)

(52) U.S. Cl.
CPC ........ *G06F 3/04847* (2013.01); *G06F 3/0488* (2013.01); *G06F 3/04842* (2013.01); *G06F 17/214* (2013.01); *G06F 17/2264* (2013.01)

(58) Field of Classification Search
CPC ......... G09G 2340/04; G09G 2340/145; G09G 5/26; G04G 13/026; G04G 21/04;
(Continued)

(56) References Cited

U.S. PATENT DOCUMENTS

| 3,148,500 A | 9/1964 | Hayes |
| 4,205,628 A | 6/1980 | Null |

(Continued)

FOREIGN PATENT DOCUMENTS

| AU | 2010249319 A1 | 6/2012 |
| AU | 2015101019 A4 | 9/2015 |

(Continued)

OTHER PUBLICATIONS

Final Office Action received for U.S. Appl. No. 14/846,511 dated May 10, 2018, 21 pages.
(Continued)

*Primary Examiner* — Sultana M Zalalee
(74) *Attorney, Agent, or Firm* — Dentons US LLP

(57) ABSTRACT

The present disclosure generally relates to displaying content on a reduced-size user interface. An electronic device with one or more processors, memory, and a display, receives content associated with a designated area of the display, where the content is associated with a plurality of available display formats stored in the memory. The device determines a size of the designated area and determines a first display format for the content from the plurality of available display formats based on at least the content and the size of the designated area. The device displays a representation of the content according to the first display format.

42 Claims, 20 Drawing Sheets

Related U.S. Application Data

(60) Provisional application No. 62/172,033, filed on Jun. 5, 2015.

(51) Int. Cl.
  *G06F 3/0484* (2013.01)
  *G06F 17/22* (2006.01)
  *G06F 3/0488* (2013.01)

(58) Field of Classification Search
  CPC ........ G06F 17/21; G06F 17/212; G06F 1/163; G06F 3/0481; G06F 3/0488; G06F 9/4443
  See application file for complete search history.

(56) References Cited

U.S. PATENT DOCUMENTS

| | | | |
|---|---|---|---|
| 5,124,959 A | 6/1992 | Yamazaki et al. | |
| 5,208,790 A | 5/1993 | Sato | |
| 5,455,808 A | 10/1995 | Grupp et al. | |
| 5,508,979 A | 4/1996 | Eisenegger | |
| 5,659,693 A | 8/1997 | Hansen et al. | |
| 5,825,353 A | 10/1998 | Will | |
| 5,845,257 A | 12/1998 | Fu et al. | |
| 5,892,519 A | 4/1999 | Hirai | |
| 5,986,655 A | 11/1999 | Chiu et al. | |
| 5,999,195 A | 12/1999 | Santangeli | |
| 6,043,818 A | 3/2000 | Nakano et al. | |
| 6,128,012 A * | 10/2000 | Seidensticker, Jr. ........................ G06F 3/0482 345/685 | |
| 6,279,018 B1 * | 8/2001 | Kudrolli ............ G06F 17/277 704/1 | |
| 6,351,556 B1 | 2/2002 | Loui et al. | |
| 6,359,839 B1 | 3/2002 | Schenk et al. | |
| 6,441,824 B2 | 8/2002 | Hertzfeld | |
| 6,449,219 B1 | 9/2002 | Hepp et al. | |
| 6,452,597 B1 * | 9/2002 | Goldberg ................. G09G 5/00 340/7.55 | |
| 6,477,117 B1 | 11/2002 | Narayanaswami et al. | |
| 6,496,780 B1 | 12/2002 | Harris et al. | |
| 6,539,243 B1 | 3/2003 | Kimura et al. | |
| 6,539,343 B2 | 3/2003 | Zhao et al. | |
| 6,549,218 B1 | 4/2003 | Gershony et al. | |
| 6,556,222 B1 | 4/2003 | Narayanaswami | |
| 6,606,411 B1 | 8/2003 | Loui et al. | |
| 6,690,623 B1 | 2/2004 | Maano | |
| 6,728,533 B2 | 4/2004 | Ishii | |
| 6,809,724 B1 | 10/2004 | Shiraishi et al. | |
| 6,871,076 B2 | 3/2005 | Samn | |
| 6,915,011 B2 | 7/2005 | Loui et al. | |
| 7,203,380 B2 | 4/2007 | Chiu et al. | |
| 7,257,254 B2 | 8/2007 | Tunney | |
| 7,325,198 B2 | 1/2008 | Adcock et al. | |
| 7,378,954 B2 | 5/2008 | Wendt | |
| 7,421,449 B2 | 9/2008 | Williams et al. | |
| 7,479,949 B2 | 1/2009 | Jobs et al. | |
| 7,515,509 B2 | 4/2009 | Klein | |
| 7,515,903 B1 * | 4/2009 | Cast ..................... H04L 51/066 455/413 | |
| 7,619,615 B1 | 11/2009 | Donoghue | |
| 7,636,733 B1 | 12/2009 | Rothmuller | |
| 7,680,340 B2 | 3/2010 | Luo et al. | |
| 7,716,194 B2 | 5/2010 | Williams et al. | |
| 7,747,625 B2 | 6/2010 | Gargi et al. | |
| 7,751,285 B1 | 7/2010 | Cain | |
| 7,788,592 B2 | 8/2010 | Williams et al. | |
| 7,831,100 B2 | 11/2010 | Gallagher | |
| 7,843,454 B1 | 11/2010 | Biswas | |
| 7,843,769 B2 | 11/2010 | Ishida et al. | |
| 7,898,542 B1 | 3/2011 | Yu et al. | |
| 7,991,234 B2 | 8/2011 | Hamasaki et al. | |
| 8,028,249 B2 | 9/2011 | Loui et al. | |
| RE43,260 E | 3/2012 | Paalasmaa et al. | |
| 8,200,669 B1 | 6/2012 | Iampietro et al. | |
| 8,352,471 B2 | 1/2013 | Oami | |
| 8,406,473 B2 | 3/2013 | Tanaka | |
| 8,462,997 B2 | 6/2013 | Pettit et al. | |
| 8,571,331 B2 | 10/2013 | Cifarelli | |
| 8,584,031 B2 | 11/2013 | Moore et al. | |
| 8,595,649 B2 | 11/2013 | Sherrard et al. | |
| 8,732,609 B1 | 5/2014 | Bayersdorfer et al. | |
| 8,884,874 B1 | 11/2014 | Kim et al. | |
| 8,938,394 B1 | 1/2015 | Faaborg et al. | |
| 8,963,894 B2 | 2/2015 | Klassen et al. | |
| 8,996,639 B1 | 3/2015 | Faaborg et al. | |
| 9,021,034 B2 | 4/2015 | Narayanan et al. | |
| 9,042,646 B2 | 5/2015 | Das et al. | |
| 9,070,092 B2 | 6/2015 | Chou et al. | |
| 9,082,314 B2 | 7/2015 | Tsai | |
| 9,123,086 B1 | 9/2015 | Freeland et al. | |
| 9,141,270 B1 | 9/2015 | Stuart et al. | |
| 9,143,601 B2 | 9/2015 | Padmanabhan et al. | |
| 9,173,052 B2 | 10/2015 | Hauser et al. | |
| 9,239,605 B1 | 1/2016 | Nanda et al. | |
| 9,244,562 B1 | 1/2016 | Rosenberg et al. | |
| 9,286,546 B2 | 3/2016 | O'Malley et al. | |
| 9,459,781 B2 | 10/2016 | Wilson et al. | |
| 9,547,425 B2 | 1/2017 | Wilson et al. | |
| 9,582,165 B2 | 2/2017 | Wilson et al. | |
| 9,753,436 B2 | 9/2017 | Ely et al. | |
| 9,870,554 B1 | 1/2018 | Leung et al. | |
| 2002/0054066 A1 | 5/2002 | Kikinis et al. | |
| 2002/0054541 A1 | 5/2002 | Hall | |
| 2002/0059623 A1 * | 5/2002 | Rodriguez ......... H04N 5/44543 725/91 | |
| 2002/0131331 A1 | 9/2002 | Molander | |
| 2002/0168108 A1 | 11/2002 | Loui et al. | |
| 2003/0002391 A1 | 1/2003 | Biggs | |
| 2003/0027621 A1 | 2/2003 | Libby et al. | |
| 2003/0033296 A1 | 2/2003 | Rothmuller et al. | |
| 2003/0067497 A1 | 4/2003 | Pichon | |
| 2003/0074647 A1 | 4/2003 | Andrew | |
| 2003/0164847 A1 | 9/2003 | Zaima et al. | |
| 2003/0214885 A1 | 11/2003 | Powell et al. | |
| 2003/0229900 A1 | 12/2003 | Reisman | |
| 2004/0001105 A1 | 1/2004 | Chew et al. | |
| 2004/0019640 A1 | 1/2004 | Bartram et al. | |
| 2004/0021699 A1 | 2/2004 | Fildebrandt | |
| 2004/0047244 A1 | 3/2004 | Iino et al. | |
| 2004/0066710 A1 | 4/2004 | Yuen et al. | |
| 2004/0125150 A1 | 7/2004 | Adcock et al. | |
| 2004/0167898 A1 | 8/2004 | Margolus et al. | |
| 2004/0168107 A1 | 8/2004 | Sharp et al. | |
| 2004/0192332 A1 | 9/2004 | Samn | |
| 2004/0218472 A1 | 11/2004 | Narayanaswami et al. | |
| 2004/0243547 A1 | 12/2004 | Chhatrapati et al. | |
| 2004/0266491 A1 | 12/2004 | Howard et al. | |
| 2005/0041667 A1 | 2/2005 | Miller et al. | |
| 2005/0044066 A1 | 2/2005 | Hooper et al. | |
| 2005/0076056 A1 | 4/2005 | Paalasmaa et al. | |
| 2005/0094492 A1 | 5/2005 | Rosevear | |
| 2005/0125744 A1 | 6/2005 | Hubbard et al. | |
| 2005/0128305 A1 | 6/2005 | Hamasaki et al. | |
| 2005/0134945 A1 | 6/2005 | Gallagher | |
| 2005/0139852 A1 | 6/2005 | Chen et al. | |
| 2005/0156873 A1 | 7/2005 | Walter et al. | |
| 2005/0195221 A1 | 9/2005 | Berger et al. | |
| 2005/0200611 A1 | 9/2005 | Goto et al. | |
| 2005/0278757 A1 | 12/2005 | Grossman et al. | |
| 2006/0035628 A1 | 2/2006 | Miller et al. | |
| 2006/0035632 A1 | 2/2006 | Sorvari et al. | |
| 2006/0036960 A1 | 2/2006 | Loui | |
| 2006/0085765 A1 | 4/2006 | Peterson et al. | |
| 2006/0090141 A1 | 4/2006 | Loui et al. | |
| 2006/0092770 A1 | 5/2006 | Demas | |
| 2006/0155757 A1 | 7/2006 | Williams et al. | |
| 2006/0156237 A1 | 7/2006 | Williams et al. | |
| 2006/0156245 A1 | 7/2006 | Williams et al. | |
| 2006/0156246 A1 | 7/2006 | Williams et al. | |
| 2006/0214935 A1 | 9/2006 | Boyd et al. | |
| 2007/0004451 A1 | 1/2007 | Anderson | |
| 2007/0006096 A1 | 1/2007 | Kim et al. | |

(56) References Cited

U.S. PATENT DOCUMENTS

| | | |
|---|---|---|
| 2007/0008321 A1 | 1/2007 | Gallagher et al. |
| 2007/0055947 A1 | 3/2007 | Ostojic et al. |
| 2007/0057775 A1 | 3/2007 | O'Reilly et al. |
| 2007/0082707 A1 | 4/2007 | Flynt et al. |
| 2007/0094330 A1 | 4/2007 | Russell |
| 2007/0101279 A1 | 5/2007 | Chaudhri et al. |
| 2007/0115373 A1 | 5/2007 | Gallagher et al. |
| 2007/0162872 A1 | 7/2007 | Hong et al. |
| 2007/0211042 A1 | 9/2007 | Kim et al. |
| 2007/0236475 A1 | 10/2007 | Wherry |
| 2007/0239754 A1 | 10/2007 | Schnitman |
| 2007/0245236 A1 | 10/2007 | Lee |
| 2007/0261537 A1 | 11/2007 | Eronen et al. |
| 2007/0279190 A1 | 12/2007 | Lugt et al. |
| 2008/0046839 A1 | 2/2008 | Mehra et al. |
| 2008/0082930 A1 | 4/2008 | Omernick et al. |
| 2008/0091637 A1 | 4/2008 | Escamilla et al. |
| 2008/0127268 A1 | 5/2008 | Bergeron et al. |
| 2008/0150959 A1 | 6/2008 | Marui |
| 2008/0152201 A1 | 6/2008 | Zhang et al. |
| 2008/0155428 A1 | 6/2008 | Lee |
| 2008/0168396 A1 | 7/2008 | Matas et al. |
| 2008/0186808 A1 | 8/2008 | Lee |
| 2008/0192021 A1 | 8/2008 | Lim et al. |
| 2008/0215240 A1 | 9/2008 | Howard et al. |
| 2008/0246778 A1 | 10/2008 | Ham et al. |
| 2008/0256577 A1 | 10/2008 | Funaki et al. |
| 2008/0270934 A1 | 10/2008 | Firebaugh et al. |
| 2009/0006965 A1 | 1/2009 | Bodin et al. |
| 2009/0012988 A1 | 1/2009 | Brown |
| 2009/0051327 A1 | 2/2009 | Bohne |
| 2009/0058821 A1 | 3/2009 | Chaudhri et al. |
| 2009/0059730 A1 | 3/2009 | Lyons et al. |
| 2009/0063542 A1 | 3/2009 | Bull et al. |
| 2009/0100342 A1 | 4/2009 | Jakobson |
| 2009/0113350 A1 | 4/2009 | Hibino et al. |
| 2009/0143114 A1 | 6/2009 | Vargas et al. |
| 2009/0146962 A1 | 6/2009 | Ahonen et al. |
| 2009/0158173 A1 | 6/2009 | Palahnuk et al. |
| 2009/0161962 A1 | 6/2009 | Gallagher et al. |
| 2009/0164923 A1 | 6/2009 | Ovi |
| 2009/0178007 A1 | 7/2009 | Matas et al. |
| 2009/0178008 A1 | 7/2009 | Herz et al. |
| 2009/0199130 A1 | 8/2009 | Tsern et al. |
| 2009/0210793 A1 | 8/2009 | Yee et al. |
| 2009/0216806 A1 | 8/2009 | Feuerstein et al. |
| 2009/0231356 A1 | 9/2009 | Barnes et al. |
| 2009/0254624 A1 | 10/2009 | Baudin et al. |
| 2009/0259958 A1 | 10/2009 | Ban |
| 2009/0264116 A1 | 10/2009 | Thompson |
| 2009/0279392 A1 | 11/2009 | Scott et al. |
| 2009/0287470 A1* | 11/2009 | Farnsworth ............ G06F 17/27 704/3 |
| 2009/0300146 A1 | 12/2009 | Park et al. |
| 2009/0305732 A1 | 12/2009 | Marcellino et al. |
| 2009/0319467 A1 | 12/2009 | Berg et al. |
| 2009/0319472 A1 | 12/2009 | Jain et al. |
| 2009/0327886 A1 | 12/2009 | Whytock et al. |
| 2010/0026640 A1 | 2/2010 | Kim et al. |
| 2010/0045828 A1 | 2/2010 | Gallagher |
| 2010/0046842 A1 | 2/2010 | Conwell et al. |
| 2010/0060586 A1 | 3/2010 | Pisula et al. |
| 2010/0064255 A1 | 3/2010 | Rottler et al. |
| 2010/0076976 A1 | 3/2010 | Sotirov et al. |
| 2010/0081473 A1 | 4/2010 | Chatterjee et al. |
| 2010/0085203 A1 | 4/2010 | Kahn et al. |
| 2010/0110082 A1 | 5/2010 | Myrick et al. |
| 2010/0114891 A1 | 5/2010 | Oami |
| 2010/0123724 A1 | 5/2010 | Moore et al. |
| 2010/0141606 A1 | 6/2010 | Bae et al. |
| 2010/0150456 A1 | 6/2010 | Tanaka |
| 2010/0156833 A1 | 6/2010 | Kim et al. |
| 2010/0157742 A1 | 6/2010 | Relyea et al. |
| 2010/0167712 A1 | 7/2010 | Stallings et al. |
| 2010/0217657 A1 | 8/2010 | Gazdzinski |
| 2010/0225495 A1 | 9/2010 | Marui |
| 2010/0226213 A1 | 9/2010 | Drugge |
| 2010/0235726 A1 | 9/2010 | Ording et al. |
| 2010/0243516 A1 | 9/2010 | Martin et al. |
| 2010/0251176 A1 | 9/2010 | Fong et al. |
| 2010/0281374 A1 | 11/2010 | Schulz et al. |
| 2010/0287053 A1 | 11/2010 | Ganong et al. |
| 2011/0003665 A1 | 1/2011 | Burton et al. |
| 2011/0016425 A1 | 1/2011 | Homburg et al. |
| 2011/0018695 A1 | 1/2011 | Bells et al. |
| 2011/0025719 A1* | 2/2011 | Yanase ................. G06F 3/0481 345/667 |
| 2011/0029870 A1 | 2/2011 | May et al. |
| 2011/0050564 A1 | 3/2011 | Alberth et al. |
| 2011/0070924 A1 | 3/2011 | Kim |
| 2011/0076992 A1 | 3/2011 | Chou et al. |
| 2011/0078624 A1 | 3/2011 | Missig et al. |
| 2011/0083111 A1 | 4/2011 | Forutanpour et al. |
| 2011/0099199 A1 | 4/2011 | Stalenhoef et al. |
| 2011/0099478 A1 | 4/2011 | Gallagher et al. |
| 2011/0109540 A1 | 5/2011 | Milne et al. |
| 2011/0126148 A1 | 5/2011 | Krishnaraj et al. |
| 2011/0138329 A1 | 6/2011 | Wells et al. |
| 2011/0145275 A1 | 6/2011 | Stewart |
| 2011/0145327 A1 | 6/2011 | Stewart |
| 2011/0151415 A1 | 6/2011 | Darling |
| 2011/0157046 A1 | 6/2011 | Lee et al. |
| 2011/0166777 A1 | 7/2011 | Chavakula |
| 2011/0179372 A1 | 7/2011 | Moore et al. |
| 2011/0191661 A1 | 8/2011 | Phillips et al. |
| 2011/0193878 A1 | 8/2011 | Seo et al. |
| 2011/0197165 A1 | 8/2011 | Filippov et al. |
| 2011/0202883 A1 | 8/2011 | Oh et al. |
| 2011/0205851 A1 | 8/2011 | Harris |
| 2011/0218765 A1 | 9/2011 | Rogers |
| 2011/0230986 A1 | 9/2011 | Lafortune et al. |
| 2011/0234152 A1 | 9/2011 | Frossen et al. |
| 2011/0246463 A1 | 10/2011 | Carson, Jr. et al. |
| 2011/0261079 A1 | 10/2011 | Ingrassia et al. |
| 2011/0265002 A1 | 10/2011 | Hong et al. |
| 2011/0267368 A1 | 11/2011 | Casillas et al. |
| 2011/0282867 A1 | 11/2011 | Palermiti, II et al. |
| 2011/0296324 A1 | 12/2011 | Goossens et al. |
| 2011/0306421 A1 | 12/2011 | Nishimoto et al. |
| 2011/0316858 A1 | 12/2011 | Shen et al. |
| 2011/0320938 A1 | 12/2011 | Schorsch |
| 2012/0001922 A1 | 1/2012 | Escher et al. |
| 2012/0026110 A1 | 2/2012 | Yamano |
| 2012/0028707 A1 | 2/2012 | Raitt et al. |
| 2012/0059787 A1 | 3/2012 | Brown et al. |
| 2012/0062470 A1 | 3/2012 | Chang |
| 2012/0084729 A1 | 4/2012 | Lin |
| 2012/0092383 A1 | 4/2012 | Hysek et al. |
| 2012/0110438 A1 | 5/2012 | Peraza et al. |
| 2012/0116550 A1 | 5/2012 | Hoffman et al. |
| 2012/0117507 A1 | 5/2012 | Tseng et al. |
| 2012/0124499 A1 | 5/2012 | Tsai |
| 2012/0154156 A1 | 6/2012 | Kuntzel |
| 2012/0154293 A1 | 6/2012 | Hinckley et al. |
| 2012/0159380 A1 | 6/2012 | Kocienda et al. |
| 2012/0167008 A1 | 6/2012 | Zaman et al. |
| 2012/0197523 A1 | 8/2012 | Kirsch |
| 2012/0223935 A1 | 9/2012 | Renwick |
| 2012/0231849 A1 | 9/2012 | Yamashita |
| 2012/0243735 A1 | 9/2012 | Wu |
| 2012/0254804 A1 | 10/2012 | Sheha et al. |
| 2012/0254810 A1 | 10/2012 | Heck et al. |
| 2012/0304084 A1 | 11/2012 | Kim et al. |
| 2012/0324390 A1 | 12/2012 | Tao |
| 2013/0007665 A1 | 1/2013 | Chaudhri et al. |
| 2013/0014019 A1 | 1/2013 | Kim et al. |
| 2013/0021236 A1 | 1/2013 | Bender |
| 2013/0022282 A1 | 1/2013 | Cooper |
| 2013/0024781 A1 | 1/2013 | Douillet et al. |
| 2013/0024802 A1 | 1/2013 | Zeng |
| 2013/0030892 A1 | 1/2013 | Liu et al. |
| 2013/0040660 A1 | 2/2013 | Fisher et al. |
| 2013/0044072 A1 | 2/2013 | Kobayashi et al. |
| 2013/0050263 A1 | 2/2013 | Khoe et al. |

(56) References Cited

U.S. PATENT DOCUMENTS

| | | |
|---|---|---|
| 2013/0055147 A1 | 2/2013 | Vasudev et al. |
| 2013/0057566 A1 | 3/2013 | Kriese et al. |
| 2013/0063084 A1 | 3/2013 | Tilvis et al. |
| 2013/0063383 A1 | 3/2013 | Anderssonreimer et al. |
| 2013/0069893 A1 | 3/2013 | Brinda et al. |
| 2013/0076757 A1 | 3/2013 | Pritting |
| 2013/0082965 A1 | 4/2013 | Wada et al. |
| 2013/0107674 A1 | 5/2013 | Gossweiler, III et al. |
| 2013/0111579 A1 | 5/2013 | Newman et al. |
| 2013/0116967 A1 | 5/2013 | Akcasu et al. |
| 2013/0117383 A1 | 5/2013 | Hymel |
| 2013/0141365 A1 | 6/2013 | Lynn et al. |
| 2013/0141371 A1 | 6/2013 | Hallford et al. |
| 2013/0145292 A1 | 6/2013 | Cohen et al. |
| 2013/0156275 A1 | 6/2013 | Amacker et al. |
| 2013/0169870 A1 | 7/2013 | Lee et al. |
| 2013/0185813 A1 | 7/2013 | Shim et al. |
| 2013/0191785 A1 | 7/2013 | Rampson et al. |
| 2013/0198176 A1 | 8/2013 | Kim |
| 2013/0205194 A1 | 8/2013 | Decker et al. |
| 2013/0215044 A1 | 8/2013 | Ahn et al. |
| 2013/0222271 A1 | 8/2013 | Alberth et al. |
| 2013/0232443 A1 | 9/2013 | Ryu et al. |
| 2013/0234929 A1 | 9/2013 | Libin |
| 2013/0234969 A1 | 9/2013 | Yeh et al. |
| 2013/0239060 A1 | 9/2013 | Kang et al. |
| 2013/0254705 A1 | 9/2013 | Mooring et al. |
| 2013/0263043 A1 | 10/2013 | Sarbin |
| 2013/0275875 A1 | 10/2013 | Gruber et al. |
| 2013/0316763 A1 | 11/2013 | Kader |
| 2013/0318466 A1 | 11/2013 | Estrada et al. |
| 2013/0326418 A1 | 12/2013 | Utsuki et al. |
| 2014/0013414 A1 | 1/2014 | Bruck |
| 2014/0022183 A1 | 1/2014 | Ayoub et al. |
| 2014/0037109 A1 | 2/2014 | Ban |
| 2014/0046914 A1 | 2/2014 | Das et al. |
| 2014/0047525 A1 | 2/2014 | Bonhoff |
| 2014/0055495 A1 | 2/2014 | Kim et al. |
| 2014/0059493 A1 | 2/2014 | Kim |
| 2014/0064572 A1 | 3/2014 | Panzer et al. |
| 2014/0074570 A1 | 3/2014 | Hope et al. |
| 2014/0082533 A1 | 3/2014 | Kelley |
| 2014/0089330 A1 | 3/2014 | Cui et al. |
| 2014/0094224 A1 | 4/2014 | Lozovoy |
| 2014/0126336 A1 | 5/2014 | Goeller et al. |
| 2014/0129959 A1 | 5/2014 | Battles et al. |
| 2014/0139454 A1 | 5/2014 | Mistry et al. |
| 2014/0143678 A1 | 5/2014 | Mistry et al. |
| 2014/0143682 A1 | 5/2014 | Druck |
| 2014/0143737 A1 | 5/2014 | Mistry et al. |
| 2014/0149878 A1 | 5/2014 | Mischari et al. |
| 2014/0157321 A1 | 6/2014 | Kurita |
| 2014/0164955 A1 | 6/2014 | Thiruvidam et al. |
| 2014/0173439 A1 | 6/2014 | Gutierrez et al. |
| 2014/0181089 A1 | 6/2014 | Desmond et al. |
| 2014/0181219 A1 | 6/2014 | Wang et al. |
| 2014/0189577 A1 | 7/2014 | Shuttleworth et al. |
| 2014/0189584 A1* | 7/2014 | Weng ............. G06F 1/163 715/808 |
| 2014/0195972 A1 | 7/2014 | Lee et al. |
| 2014/0198234 A1 | 7/2014 | Kobayashi et al. |
| 2014/0200691 A1 | 7/2014 | Lee et al. |
| 2014/0222809 A1 | 8/2014 | Hochmuth et al. |
| 2014/0229752 A1 | 8/2014 | Lee |
| 2014/0236882 A1 | 8/2014 | Rishe |
| 2014/0244165 A1 | 8/2014 | Bells |
| 2014/0245161 A1 | 8/2014 | Yuen et al. |
| 2014/0245177 A1 | 8/2014 | Maklouf |
| 2014/0250126 A1 | 9/2014 | Baldwin et al. |
| 2014/0250374 A1 | 9/2014 | Ohki et al. |
| 2014/0250391 A1 | 9/2014 | Jong et al. |
| 2014/0253487 A1 | 9/2014 | Bezinge et al. |
| 2014/0258935 A1 | 9/2014 | Nishida et al. |
| 2014/0267303 A1 | 9/2014 | Larkin et al. |
| 2014/0276244 A1 | 9/2014 | Kamyar |
| 2014/0282011 A1 | 9/2014 | Dellinger et al. |
| 2014/0282103 A1 | 9/2014 | Crandall |
| 2014/0282153 A1 | 9/2014 | Christiansen et al. |
| 2014/0282254 A1 | 9/2014 | Feiereisen et al. |
| 2014/0289222 A1 | 9/2014 | Sharpe et al. |
| 2014/0289660 A1 | 9/2014 | Min |
| 2014/0293755 A1 | 10/2014 | Geiser et al. |
| 2014/0304664 A1 | 10/2014 | Lee et al. |
| 2014/0310618 A1 | 10/2014 | Venkatesh |
| 2014/0317543 A1 | 10/2014 | Kim |
| 2014/0325384 A1 | 10/2014 | Kobayashi |
| 2014/0325408 A1 | 10/2014 | Leppanen et al. |
| 2014/0337324 A1 | 11/2014 | Chao et al. |
| 2014/0337791 A1 | 11/2014 | Agnetta et al. |
| 2014/0341476 A1 | 11/2014 | Kulick et al. |
| 2014/0344723 A1 | 11/2014 | Malik et al. |
| 2014/0347275 A1 | 11/2014 | Kim et al. |
| 2014/0347289 A1 | 11/2014 | Suh et al. |
| 2014/0380229 A1 | 12/2014 | Volodin et al. |
| 2015/0005013 A1 | 1/2015 | Cao et al. |
| 2015/0022438 A1 | 1/2015 | Hong |
| 2015/0058651 A1 | 2/2015 | Choi et al. |
| 2015/0078680 A1 | 3/2015 | Shakib et al. |
| 2015/0083970 A1 | 3/2015 | Koh et al. |
| 2015/0100537 A1 | 4/2015 | Grieves et al. |
| 2015/0100621 A1 | 4/2015 | Pan |
| 2015/0106752 A1 | 4/2015 | Yang |
| 2015/0111558 A1 | 4/2015 | Yang |
| 2015/0113468 A1 | 4/2015 | Clark |
| 2015/0117162 A1 | 4/2015 | Tsai |
| 2015/0143234 A1 | 5/2015 | Norris, III |
| 2015/0160806 A1 | 6/2015 | Fey et al. |
| 2015/0160856 A1 | 6/2015 | Jang et al. |
| 2015/0172438 A1 | 6/2015 | Yang |
| 2015/0185703 A1 | 7/2015 | Tanaka |
| 2015/0195179 A1 | 7/2015 | Skare et al. |
| 2015/0227611 A1 | 8/2015 | Bao et al. |
| 2015/0244794 A1 | 8/2015 | Poletto et al. |
| 2015/0248235 A1 | 9/2015 | Offenberg et al. |
| 2015/0262062 A1 | 9/2015 | Burger et al. |
| 2015/0286372 A1 | 10/2015 | Swindell et al. |
| 2015/0287162 A1 | 10/2015 | Canan et al. |
| 2015/0301506 A1 | 10/2015 | Koumaiha |
| 2015/0301608 A1 | 10/2015 | Nagaraju et al. |
| 2015/0363409 A1 | 12/2015 | Wood et al. |
| 2015/0379476 A1 | 12/2015 | Chaudhri et al. |
| 2016/0019388 A1 | 1/2016 | Singla et al. |
| 2016/0022202 A1 | 1/2016 | Peterson et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034166 A1 | 2/2016 | Wilson et al. |
| 2016/0034167 A1 | 2/2016 | Wilson et al. |
| 2016/0048283 A1 | 2/2016 | Yang et al. |
| 2016/0062540 A1 | 3/2016 | Yang et al. |
| 2016/0062570 A1 | 3/2016 | Dascola et al. |
| 2016/0062589 A1 | 3/2016 | Wan et al. |
| 2016/0085397 A1 | 3/2016 | Jain |
| 2016/0098137 A1* | 4/2016 | Kim ............. G06F 1/1643 345/173 |
| 2016/0117147 A1 | 4/2016 | Zambetti et al. |
| 2016/0140146 A1 | 5/2016 | Wexler et al. |
| 2016/0188181 A1 | 6/2016 | Smith |
| 2016/0193502 A1 | 7/2016 | Kim et al. |
| 2016/0234184 A1 | 8/2016 | Liu et al. |
| 2016/0259542 A1 | 9/2016 | Chaudhri et al. |
| 2016/0261675 A1 | 9/2016 | Block et al. |
| 2016/0327911 A1 | 11/2016 | Eim et al. |
| 2016/0327915 A1 | 11/2016 | Katzer et al. |
| 2016/0357354 A1 | 12/2016 | Chen et al. |
| 2016/0358311 A1 | 12/2016 | Chen et al. |
| 2017/0010677 A1 | 1/2017 | Roh et al. |
| 2017/0053542 A1 | 2/2017 | Wilson et al. |
| 2017/0068407 A1 | 3/2017 | Wilson et al. |
| 2017/0068439 A1 | 3/2017 | Mohseni |
| 2017/0123640 A1 | 5/2017 | Wilson et al. |
| 2017/0134321 A1 | 5/2017 | Ushio et al. |
| 2017/0244959 A1 | 8/2017 | Ranjeet et al. |
| 2017/0269792 A1 | 9/2017 | Xu et al. |

(56) References Cited

U.S. PATENT DOCUMENTS

| | | |
|---|---|---|
| 2017/0287312 A1 | 10/2017 | Schofield et al. |
| 2017/0357382 A1 | 12/2017 | Miura et al. |
| 2017/0357427 A1 | 12/2017 | Wilson et al. |
| 2018/0067633 A1 | 3/2018 | Wilson et al. |
| 2018/0081515 A1 | 3/2018 | Block et al. |
| 2018/0181668 A1 | 6/2018 | Zhang et al. |
| 2018/0329587 A1 | 11/2018 | Ko et al. |
| 2018/0364872 A1 | 12/2018 | Miura et al. |
| 2019/0250813 A1 | 8/2019 | Block et al. |
| 2019/0279520 A1 | 9/2019 | Wilson et al. |

FOREIGN PATENT DOCUMENTS

| | | |
|---|---|---|
| CA | 2781636 A1 | 7/2010 |
| CA | 2792987 A1 | 10/2011 |
| CH | 707412 A2 | 6/2014 |
| CN | 1337638 A | 2/2002 |
| CN | 1397904 A | 2/2003 |
| CN | 1536511 A | 10/2004 |
| CN | 1997957 A | 7/2007 |
| CN | 101196786 A | 6/2008 |
| CN | 101291409 A | 10/2008 |
| CN | 101382438 A | 3/2009 |
| CN | 101627349 A | 1/2010 |
| CN | 101702112 A | 5/2010 |
| CN | 101819486 A | 9/2010 |
| CN | 101854278 A | 10/2010 |
| CN | 101981987 A | 2/2011 |
| CN | 102483758 A | 5/2012 |
| CN | 102687176 A | 9/2012 |
| CN | 102693311 A | 9/2012 |
| CN | 102790826 A | 11/2012 |
| CN | 103399480 A | 11/2013 |
| CN | 103562832 A | 2/2014 |
| CN | 103607660 A | 2/2014 |
| CN | 103902165 A | 7/2014 |
| CN | 104501043 A | 4/2015 |
| CN | 105103154 A | 11/2015 |
| CN | 105260049 A | 1/2016 |
| CN | 105388966 A | 3/2016 |
| CN | 105389107 A | 3/2016 |
| CN | 205608658 U | 9/2016 |
| EP | 0831629 A2 | 3/1998 |
| EP | 1659504 A2 | 5/2006 |
| EP | 1674889 A1 | 6/2006 |
| EP | 1674977 A2 | 6/2006 |
| EP | 1777611 A1 | 4/2007 |
| EP | 1832969 A2 | 9/2007 |
| EP | 1855170 A2 | 11/2007 |
| EP | 2040146 A2 | 3/2009 |
| EP | 2120115 A2 | 11/2009 |
| EP | 2194508 A1 | 6/2010 |
| EP | 2204702 A1 | 7/2010 |
| EP | 2290922 A1 | 3/2011 |
| EP | 2302493 A2 | 3/2011 |
| EP | 2312512 A1 | 4/2011 |
| EP | 2413577 A2 | 2/2012 |
| EP | 2423810 A1 | 2/2012 |
| EP | 2426902 A | 3/2012 |
| EP | 2437148 A2 | 4/2012 |
| EP | 2602759 A2 | 6/2013 |
| EP | 2615607 A2 | 7/2013 |
| EP | 2653961 A1 | 10/2013 |
| EP | 2677775 A1 | 12/2013 |
| EP | 2720126 A1 | 4/2014 |
| EP | 2738640 A2 | 6/2014 |
| EP | 2821912 A1 | 1/2015 |
| EP | 2942932 A1 | 11/2015 |
| GB | 2370208 A | 6/2002 |
| GB | 2475669 A | 6/2011 |
| JP | 8-110955 A | 4/1996 |
| JP | 9-251084 A | 9/1997 |
| JP | 11-232013 A | 8/1999 |
| JP | 2000-112997 A | 4/2000 |
| JP | 2002-507718 A | 3/2002 |
| JP | 2002-271451 A | 9/2002 |
| JP | 2003-296246 A | 10/2003 |
| JP | 2005-339017 A | 12/2005 |
| JP | 2008-059614 A | 3/2008 |
| JP | 2008-236794 A | 10/2008 |
| JP | 2009-147889 A | 7/2009 |
| JP | 2010-118056 A | 5/2010 |
| JP | 2010-124181 A | 6/2010 |
| JP | 2010-257051 A | 11/2010 |
| JP | 3168099 U | 6/2011 |
| JP | 2012-53642 A | 3/2012 |
| JP | 2012-505478 A | 3/2012 |
| JP | 2012-147432 A | 8/2012 |
| JP | 2012-517630 A | 8/2012 |
| JP | 2012-203832 A | 10/2012 |
| JP | 2012-531607 A | 12/2012 |
| JP | 2014-123197 A | 7/2014 |
| JP | 2014-519126 A | 8/2014 |
| JP | 2014-216868 A | 11/2014 |
| JP | 2015-210587 A | 11/2015 |
| KR | 10-2012-0092644 A | 8/2012 |
| KR | 10-2014-0064687 A | 5/2014 |
| KR | 10-2014-0067965 A | 6/2014 |
| KR | 10-2015-0001287 A | 1/2015 |
| KR | 10-2015-0038711 A | 4/2015 |
| KR | 10-2015-0081140 A | 7/2015 |
| KR | 10-2015-0131262 A | 11/2015 |
| KR | 10-2017-0076452 A | 7/2017 |
| TW | 498240 B | 8/2002 |
| TW | 546942 B | 8/2003 |
| TW | 200512616 A | 4/2005 |
| TW | 200850058 A | 12/2008 |
| TW | 200915698 A | 4/2009 |
| TW | I348803 B | 9/2011 |
| TW | 201232486 A | 8/2012 |
| TW | M435665 U | 8/2012 |
| TW | 201419115 A | 5/2014 |
| WO | 1999/66394 A1 | 12/1999 |
| WO | 1999/66395 A2 | 12/1999 |
| WO | 2001/71433 A1 | 9/2001 |
| WO | 2002/054157 A1 | 7/2002 |
| WO | 2004/056107 A1 | 7/2004 |
| WO | 2006/112641 A1 | 10/2006 |
| WO | 2007/018881 A2 | 2/2007 |
| WO | 2009/082814 A1 | 7/2009 |
| WO | 2009/146925 A2 | 12/2009 |
| WO | 2009/150425 A2 | 12/2009 |
| WO | 2009/155991 A1 | 12/2009 |
| WO | 2010/017627 A1 | 2/2010 |
| WO | 2010/059188 A2 | 5/2010 |
| WO | 2011/000893 A1 | 1/2011 |
| WO | 2011/051091 A1 | 5/2011 |
| WO | 2012/021507 A2 | 2/2012 |
| WO | 2011/130849 A8 | 5/2012 |
| WO | 2012/097385 A2 | 7/2012 |
| WO | 2012/161434 A2 | 11/2012 |
| WO | 2012/170446 A2 | 12/2012 |
| WO | 2013/051048 A1 | 4/2013 |
| WO | 2013/093558 A1 | 6/2013 |
| WO | 2013/136548 A1 | 9/2013 |
| WO | 2013/169842 A2 | 11/2013 |
| WO | 2013/169849 A2 | 11/2013 |
| WO | 2013/169851 A2 | 11/2013 |
| WO | 2013/169870 A1 | 11/2013 |
| WO | 2013/169875 A2 | 11/2013 |
| WO | 2013/169877 A2 | 11/2013 |
| WO | 2013/169882 A2 | 11/2013 |
| WO | 2014/024000 A1 | 2/2014 |
| WO | 2014/078114 A1 | 5/2014 |
| WO | 2014/105276 A1 | 7/2014 |
| WO | 2014/105278 A1 | 7/2014 |
| WO | 2014/105279 A1 | 7/2014 |
| WO | 2014/149473 A1 | 9/2014 |
| WO | 2014/189197 A1 | 11/2014 |
| WO | 2015/163536 A1 | 10/2015 |
| WO | 2016/022203 A1 | 2/2016 |
| WO | 2016/022205 A1 | 2/2016 |

(56) References Cited

FOREIGN PATENT DOCUMENTS

| WO | 2016/036522 A2 | 3/2016 |
|---|---|---|
| WO | 2016/099097 A1 | 6/2016 |
| WO | 2016/144563 A1 | 9/2016 |

OTHER PUBLICATIONS

Office Action received for Danish Patent Application No. PA201670609, dated May 7, 2018, 4 pages.
Final Office Action received for U.S. Appl. No. 14/821,667, dated Apr. 26, 2018, 13 pages.
Office Action received for Chinese Patent Application No. 201510479088.4, dated Mar. 12, 2018, 20 pages (6 pages of English Translation and 14 pages of Official Copy).
Office Action received for Taiwanese Patent Application No. 104126627, dated Oct. 16, 2017, 7 pages (3 pages of English Translation and 4 pages of Official Copy).
"AdyClock—Night Alarm Clock", App for android, Google play store page: https://web.archive.org/web/20130924223153/https://play.google.com/store/apps/details?id=com.adyclock&hl=en, Sep. 24, 2013, 2 pages.
Corrected Notice of Allowance received for U.S. Appl. No. 14/815,879, dated Sep. 21, 2017, 2 pages.
"Digital alarm clock app for Android", Goggle play store digital alarm clock description page, Mar. 25, 2015, 3 pages.
"Fitbit surge Fitness Watch", Manual version 1.0, May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
International Preliminary Report on Patentability received for PCT Patent Application No. PCT/US2015/053353, dated Sep. 21, 2017, 15 pages.
International Preliminary Report on Patentability received for PCT Patent Application No. PCT/US2015/054223, dated Dec. 14, 2017, 18 pages.
International Preliminary Report on Patentability received for PCT Patent Application No. PCT/US2016/021403, dated Sep. 21, 2017, 21 pages.
International Search Report and Written Opinion received for PCT Patent Application No. PCT/US2015/054223, dated Jul. 6, 2016, 25 pages.
International Search Report and Written Opinion received for PCT Patent Application No. PCT/US2016/037686, dated Sep. 9, 2016, 19 pages.
International Search Report and Written Opinion received for PCT Patent Application No. PCT/US2017/034834, dated Aug. 23, 2017, 10 pages.
International Search Report and Written Opinion Received for PCT Patent Application No. PCT/US2017/035322, dated Oct. 5, 2017, 18 pages.
Invitation to Pay additional fees received for PCT Patent Application No. PCT/US2015/054223, dated Mar. 9, 2016, 9 pages.
Invitation to Pay Additional Fees received for PCT Patent Application No. PCT/US2017/035322, dated Aug. 7, 2017, 4 pages.
"Night Display (Alarm Clock) App", Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.
Non-Final Office Action received for U.S. Appl. No. 14/841,606, dated Dec. 7, 2017, 30 pages.
Non-Final Office Action received for U.S. Appl. No. 14/846,511 dated Oct. 27, 2017, 15 pages.
Non-Final Office Action received for U.S. Appl. No. 15/275,294, dated Dec. 23, 2016, 18 pages.
Non-Final Office Action received for U.S. Appl. No. 15/275,294, dated Nov. 3, 2017, 29 pages.
Notice of Allowance received for Taiwanese Patent Application No. 104124963, dated Sep. 28, 2017, 5 pages (1 page of English Translation of Search report and 4 pages of Official Copy) (see attached 37 CFR § 1.98(a) (3)).
Notice of Allowance received for Taiwanese Patent Application No. 104134740, dated Dec. 8, 2016, 5 pages (1 page of English Translation of Search Report and 4 pages of Official Copy) (see attached 37 CFR § 1.98(a) (3)).
Notice of Allowance received for U.S. Appl. No. 15/275,294, dated Jun. 30, 2017, 8 pages.
Office Action received for Danish Patent Application No. PA201570499, dated Nov. 1, 2017, 6 pages.
Office Action received for European Patent Application No. 15730924.6, dated Dec. 12, 2017, 8 pages.
Office Action received for Danish Patent Application No. PA201570497, dated Oct. 24, 2017, 2 pages.
Office Action received for Danish Patent Application No. PA201570498, dated Oct. 26, 2017, 5 pages.
Office Action received for Danish Patent Application No. PA201570768, dated Sep. 13, 2016, 8 pages.
Office Action received for Danish Patent Application No. PA201570770, dated Apr. 7, 2017, 7 pages.
Office Action received for Danish Patent Application No. PA201570770, dated Mar. 17, 2016, 9 pages.
Office Action received for Danish Patent Application No. PA201570770, dated Sep. 12, 2016, 6 pages.
Office Action received for Danish Patent Application No. PA201670608, dated Jan. 23, 2018, 10 pages.
Office Action received for Danish Patent Application No. PA201670609, dated Jan. 26, 2018, 8 pages.
Office Action received for Taiwanese Patent Application No. 104132636, dated Oct. 31, 2017, 10 pages (4 pages of English Translation and 6 pages of Official Copy).
"Online Alarm Clock", Available online at:- https://web.archive.org/web/20150505081746/http://www.online-stopwatch.com/online-alarm-clock, May 5, 2015, 2 pages.
Search Report and opinion received for Danish Patent Application No. PA201670608, dated Jan. 3, 2017, 15 pages.
Search Report and Opinion received for Danish Patent Application No. PA201670609, dated Feb. 1, 2017, 11 pages.
Search Report received for Danish Patent Application No. 201570768, dated Mar. 17, 2016, 11 pages.
Talkandroid, "Android Wear walkthrough", Available online at: https://www.youtube.com/watch?v=4xntpZac4sw, Jun. 30, 2014, 1 page.
"The Simply Alarm app for Pebble", available online at <https://web.archive.org/web/20150517070400>/http://www.rebootsramblings.ca/n/sahhelp/https://www.youtube.com/watch?v=IVp1scQPw08, May 17, 2015, 1 page.
Tweedie, Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
U.S. Appl. No. 15/554,204 entitled "Sharing User-Configurable Graphical Constructs ", filed Aug. 28, 2017, 247 pages.
Whitwam, Ryan, "Facer is Fast Becoming the De Facto Custom Watch Face Maker for Android Wear", Available online at: http://www.androidpolice.com/2014/09/19/facer-is-fast-becoming-the-defacto-custom-watch-face-maker-for-android-wear, Sep. 19, 2014, 11 pages.
Notice of Allowance received for Korean Patent Application No. 10-2017-7005939, dated Mar. 30, 2018, 5 pages (2 pages of English Translation and 3 pages of Official Copy).
Office Action received for European Patent Application No. 15730925.3, dated Apr. 12, 2018, 8 pages.
Office Action received for German Patent Application No. 112015003083.2, dated Mar. 9, 2018, 12 pages (5 pages of English Translation and 7 pages of Official Copy).
Office action received for Chinese Patent Application No. 201510483305.7, dated Dec. 1, 2017, 13 pages (5 pages English Translation and 8 pages of Official Copy).

(56) References Cited

OTHER PUBLICATIONS

Advisory Action received for U.S. Appl. No. 14/815,898, dated Aug. 30, 2016, 3 pages.
Advisory Action received for U.S. Appl. No. 14/833,014, dated Jan. 27, 2017, 3 pages.
Airshow, "Airshow App for Mobile Devices", 2012, 4 pages.
APK Root, "Butterfly 3D Live Wallpaper 1.0 APK", Available at <http://net-suckga-ilauncher2.apk-dl.com/butterfly-3d-live-wallpaper>, Feb. 26, 2013, 7 pages.
Avdonin, Nikita, "Astroviewer 3D", Available at:- <https:jjwww.youtube.comjwatch?v=zY0tslx3JHY/>, Nov. 5, 2013, 2 pages.
Bogdanov, Alexei, "SKMEI 1016", XP054977588, Available online at <URL:https://www.youtube.com/watch?v=E4q4Fug05Fw>, Jun. 21, 2014, 2 pages.
Castellini, Rick, "Google Earth", Retrieved from <https://www.youtube.com/watch?v=bgjMSBXsFZQ>, Feb. 12, 2013, 3 pages.
Corrected Notice of Allowance received for U.S. Appl. No. 14/815,879, dated Jul. 13, 2017, 3 pages.
Corrected Notice of Allowance received for U.S. Appl. No. 14/815,879, dated Jul. 28, 2017, 3 pages.
Cyr, Jim, "Apple Watch—Customize Modular Watch Face", available online at: https://www.youtube.com/watch?v=02W93HbKIK8, May 13, 2015, 2 pages.
"Deluxe Moon—Guide", available online at: https://web.archive.org/web/20130520161057/http://www.lifewaresolutions.com/deluxe_moon_guide_ip.html, May 20, 2013, 5 pages.
Evgenyevich, "Sergey, Earth & Moon in HD Gyro 3D", Available at <https://www.youtube.com/watch?v=IRwNcaSYrIs/>, Dec. 1, 2013, 2 pages.
Final Office Action received for U.S. Appl. No. 14/815,890, dated Nov. 21, 2016, 18 pages.
Final Office Action received for U.S. Appl. No. 14/815,898, dated Jun. 9, 2016, 19 pages.
Final Office Action received for U.S. Appl. No. 14/833,014, dated Oct. 26, 2016, 32 pages.
Final Office Action received for U.S. Appl. No. 14/841,402, dated Aug. 25, 2017, 17 pages.
Final Office Action received for U.S. Appl. No. 14/815,879, dated Mar. 24, 2016, 46 pages.
Final Office Action received for U.S. Appl. No. 14/822,769, dated Nov. 9, 2016, 18 pages.
First Action Interview received for U.S. Appl. No. 14/815,890, dated Aug. 12, 2016, 3 pages.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
"Google Earth 7.0.1.8244", retrieved from the Internet: http://dl.google.com/dl/earth/client/ge7/release_7_0_1/googleearth-win-bundle-7.0.1.8244.exe, Oct. 29, 2012, 1 page.
"Google Earth on Android—AndroidCentral.com", Available online at:- https://www.youtube.com/watch?v=1WxN1RunrE4, Feb. 22, 2010, 1 page.
Gottabemobile, "How to Change Watch Faces on Android Wear", available online at URL:https://www.youtube.com/watch?v=B8iRGkGq6a8, Jul. 9, 2014, 4 pages.
Horowitz, Paul, Always Show Scroll Bars in Mac OS X, OS X Daily, available online at: URL:http:jjosxdaily.com/2011/08/03/show-scroll-bars-mac-os-x-lion/, Aug. 3, 2011, 7 pages.
Intention to Grant received for Danish Patent Application No. PA201570496, dated Feb. 17, 2016, 6 pages.
Intention to Grant received for Danish Patent Application No. PA201570563, dated Mar. 17, 2016, 7 pages.
International Preliminary Report on Patentability received for PCT Patent Application No. PCT/US2015/034604, dated Feb. 16, 2017, 21 pages.
International Preliminary Report on Patentability received for PCT Patent Application No. PCT/US2015/034606, dated Feb. 16, 2017, 11 pages.
International Preliminary Report on Patentability received for PCT Patent Application No. PCT/US2015/034607, dated Feb. 16, 2017, 18 pages.
International Preliminary Report on Patentability received for PCT Patent Application No. PCT/US2015/044473, dated Mar. 2, 2017, 20 pages.
International Preliminary Report on Patentability received for PCT Patent Application No. PCT/US2015/044485, dated Mar. 2, 2017, 20 pages.
International Preliminary Report on Patentability received for PCT Patent Application No. PCT/US2015/044517, dated Mar. 16, 2017, 10 pages.
International Preliminary Report on Patentability received for PCT Patent Application No. PCT/US2015/046262, dated Mar. 16, 2017, 26 pages.
International Preliminary Report on Patentability received for PCT Patent Application No. PCT/US2016/035090, dated Dec. 14, 2017, 14 pages.
International Search Report and Written Opinion received for PCT Patent Application No. PCT/US2015/034604, dated Nov. 9, 2015, 30 pages.
International Search Report and Written Opinion received for PCT Patent Application No. PCT/US2015/034606, dated Dec. 2, 2015, 17 pages.
International Search Report and Written Opinion received for PCT Patent Application No. PCT/US2015/044473, dated Feb. 12, 2016, 24 pages.
International Search Report and Written Opinion received for PCT Patent Application No. PCT/US2015/044485, dated Feb. 9, 2016, 27 pages.
International Search Report and Written Opinion received for PCT Patent Application No. PCT/US2015/044517, dated Oct. 28, 2015, 13 pages.
International Search Report and Written Opinion received for PCT Patent Application No. PCT/US2015/046262, dated Mar. 15, 2016, 34 pages.
International Search Report and Written Opinion received for PCT Patent Application No. PCT/US2015/053353, dated May 9, 2016, 21 pages.
International Search Report and Written Opinion received for PCT Patent Application No. PCT/US2016/017271, dated Sep. 1, 2016, 18 pages.
International Search Report and Written Opinion received for PCT Patent Application No. PCT/US2016/021403, dated May 12, 2016, 23 pages.
International Search Report and Written Opinion received for PCT Patent Application No. PCT/US2016/035090, dated Oct. 4, 2016, 17 pages.
International Search Report and Written Opinion received for PCT Patent Application no. PCT/US2015/034607, dated Dec. 1, 2015, 23 pages.
Invitation to Additional Fees and Partial International Search Report received for PCT Patent Application No. PCT/US2015/034604 dated Sep. 4, 2015, 6 pages.
Invitation to Additional Fees and Partial International Search Report received for PCT Patent Application No. PCT/US2015/034606 dated Sep. 9, 2015, 6 pages.
Invitation to Pay Additional Fees received for PCT Patent Application No. PCT/US2015/034607, dated Sep. 30, 2015, 4 pages.
Invitation to Pay Additional Fees received for PCT Patent Application No. PCT/US2015/044473, dated Nov. 3, 2015, 5 pages.
Invitation to Pay Additional Fees received for PCT Patent Application No. PCT/US2015/044485, dated Nov. 3, 2015, 7 pages.
Invitation to Pay Additional Fees received for PCT Patent Application No. PCT/US2015/046262, dated Nov. 23, 2015, 7 pages.
Invitation to Pay Additional fees received for PCT Patent Application No. PCT/US2015/053353, dated Jan. 21, 2016, 7 pages.
Invitation to Pay Additional Fees received for PCT Patent Application No. PCT/US2016/017271, dated May 25, 2016, 7 pages.
Invitation to Pay Additional Fees received for PCT Patent Application No. PCT/US2016/035090, dated Jul. 15, 2016, 2 pages.

(56) References Cited

OTHER PUBLICATIONS

ISO 9241-13:1998, "Ergonomic requirements for office work with visual display terminals (VDTs)", Part 13: User guidance, International Standard ISO, Zuerich, CH, vol. 9241-13 Jul. 15, 1998, 40 pages.
"Kidizoom Smartwatch", Available online at <URL:https://www.vtechnl.com/media/downloads/Kidizoom-Smart-Watch.pdf>, Jun. 24, 2014, 23 pages.
"Link to Wayback Machine with link to Google Play showing different layouts of complications associated with a clock face", available online at <https://play.google.com/store/apps/details?id=com.levelup.beautifulwidgets.free&hl=da >, Sep. 9, 2013, 6 pages.
"Living Earth", available at : http;//www.livingcarthapp.com/, 2014, 6 pages.
"MS Excel 2013", Jan. 29, 2013, 2 pages.
Nerdtalk, "The Best Android Clock Widgets", available at: https://www.youtube.com/watch?v=E1bAprWByfU, Apr. 25, 2011, 1 page.
"New, but unsigned—Easy StopWatch for Symbian", XP55393563, Available online at <http://www.allaboutsymbian.com/flow/item/19490_New_but_unsigned-Easy_StopWatc.php>, Mar. 15, 2014, 15 pages.
Non Final Office Action received for U.S. Appl. No. 14/815,890, dated Jun. 6, 2017, 19 pages.
Non Final Office Action received for U.S. Appl. No. 14/815,890, dated Oct. 19, 2015, 5 pages.
Non Final Office Action received for U.S. Appl. No. 14/822,769, dated Feb. 5, 2016, 14 pages.
Non Final Office Action received for U.S. Appl. No. 14/833,014, dated Mar. 21, 2016, 26 pages.
Non-Final Office Action received for U.S. Appl. No. 14/815,879, dated Dec. 15, 2016, 33 pages.
Non-Final Office Action received for U.S. Appl. No. 14/821,667, dated Jul. 14, 2017, 12 pages.
Non-Final Office Action received for U.S. Appl. No. 14/822,769, dated Jun. 29, 2016, 14 pages.
Non-Final Office Action received for U.S. Appl. No. 14/822,769, dated May 4, 2017, 21 pages.
Non-Final Office Action received for U.S. Appl. No. 14/839,889, dated Mar. 7, 2017, 26 pages.
Non-Final Office Action received for U.S. Appl. No. 14/841,402, dated Jan. 25, 2017, 18 pages.
Non-Final Office Action received for U.S. Appl. No. 14/815,879, dated Nov. 6, 2015, 35 pages.
Non-Final Office Action received for U.S. Appl. No. 14/815,898, dated Dec. 1, 2015, 22 pages.
Non-Final Office Action received for U.S. Appl. No. 14/815,907, dated Jan. 12, 2016, 22 pages.
Non-Final Office Action received for U.S. Appl. No. 14/815,909, dated Nov. 27, 2015, 12 pages.
Notice of Allowance received for Chinese Patent Application No. 201520594249.X, dated Jul. 12, 2016, 4 pages.
Notice of Allowance received for Danish Patent Application No. PA201570495, dated Feb. 22, 2017, 1 page.
Notice of Allowance received for Danish Patent Application No. PA201570496, dated Apr. 18, 2016, 2 pages.
Notice of Allowance received for Danish Patent Application No. PA201570563, dated May 24, 2016, 2 pages.
Notice of Allowance received for Danish Patent Application No. PA201570667, dated Nov. 11, 2016, 2 pages.
Notice of Allowance received for Taiwanese Patent Application No. 104124962, dated Jul. 27, 2017, 3 pages.
Notice of Allowance received for Taiwanese Patent Application No. 104124995, dated Jul. 27, 2017, 3 pages.
Notice of Allowance received for Taiwanese Patent Application No. 104124997, dated Jun. 16, 2017, 5 pages.
Notice of Allowance received for Taiwanese Patent Application No. 104124998, dated Mar. 31, 2017, 3 pages.
Notice of Allowance received for Taiwanese Patent Application No. 104128684, dated Feb. 23, 2017, 3 pages.
Notice of Allowance received for U.S. Appl. No. 14/815,879, dated Jun. 26, 2017, 8 pages.
Notice of Allowance received for U.S. Appl. No. 14/815,898, dated Dec. 5, 2016, 3 pages.
Notice of Allowance received for U.S. Appl. No. 14/815,898, dated Oct. 24, 2016, 14 pages.
Notice of Allowance received for U.S. Appl. No. 14/815,907, dated Jul. 28, 2016, 9 pages.
Notice of Allowance received for U.S. Appl. No. 14/815,907, dated Nov. 30, 2016, 2 pages.
Notice of Allowance received for U.S. Appl. No. 14/815,909, dated Jun. 9, 2016, 3 pages.
Notice of Allowance received for U.S. Appl. No. 14/815,909, dated May 3, 2016, 12 pages.
Notice of Allowance received for U.S. Appl. No. 14/815,909, dated May 20, 2016, 2 pages.
Notice of Allowance received for U.S. Appl. No. 14/815,909, dated Sep. 6, 2016, 2 pages.
Notice of Allowance received for U.S. Appl. No. 14/839,889, dated Oct. 30, 2017, 16 pages.
Nova, "Tour of the Solar System", Retrieved from <http://www.pbs.org/wgbh/nova/space/tour-solar-system.html>, May 24, 2013, 14 pages.
Office Action received for Australian Patent Application No. 2015101020, dated Oct. 26, 2015, 8 pages.
Office Action received for Australian Patent Application No. 2015101019, dated Oct. 14, 2015, 3 pages.
Office Action received for Australian Patent Application No. 2015101019, dated Apr. 7, 2016, 4 pages.
Office Action received for Australian Patent Application No. 2015101021, dated Apr. 26, 2016, 4 pages.
Office Action received for Australian Patent Application No. 2015101021, dated Oct. 28, 2015, 10 pages.
Office Action received for Australian Patent Application No. 2015298710, dated Apr. 13, 2017, 3 pages.
Office Action received for Australian Patent Application No. 2015298710, dated Feb. 15, 2017, 2 pages.
Office Action received for Australian Patent Application No. 2016100411, dated Jun. 10, 2016, 3 pages.
Office Action received for Australian Patent Application No. 2016100476, dated Jun. 9, 2016, 4 pages.
Office Action received for Australian Patent Application No. 2016100765, dated Aug. 5, 2016, 2 pages.
Office Action received for Australian Patent Application No. 2016100765, dated Dec. 16, 2016, 3 pages.
Office Action received for Australian Patent Application No. 2015101019, dated Feb. 12, 2016, 4 pages.
Office Action received for Chinese Patent Application No. 201520595384.6, dated Mar. 25, 2016, 3 pages.
Office Action received for Chinese Patent Application No. 201520594249.X, dated Mar. 25, 2016, 3 pages.
Office Action received for Chinese Patent Application No. 201520595384.6, dated Dec. 30, 2016, 2 pages.
Office Action received for Chinese Patent Application No. 201520595384.6, dated Jul. 22, 2016, 3 pages.
Office Action received for Chinese Patent Application No. 201520595385.0, dated Dec. 30, 2016, 2 pages.
Office Action received for Chinese Patent Application No. 201520595385.0, dated Jul. 22, 2016, 3 pages.
Office Action received for Chinese Patent Application No. 201520595385.0, dated Mar. 25, 2016, 3 pages.
Office Action Received for Chinese Patent Application No. 201520595408.8, dated Dec. 9, 2015, 4 pages.
Office Action Received for Chinese Patent Application No. 201520595408.8, dated Dec. 30, 2016, 2 pages.
Office Action received for Chinese Patent Application No. 201520595408.8, dated Jul. 25, 2016, 3 pages.
Office Action received for Chinese Patent Application No. 201520595408.8, dated Mar. 25, 2016, 3 pages.
Office Action received for Chinese Patent Application No. 201520595538.1, dated Dec. 30, 2016, 2 pages.
Office Action received for Chinese Patent Application No. 201520595538.1, dated Jul. 22, 2016, 3 pages.

(56) References Cited

OTHER PUBLICATIONS

Office Action received for Chinese Patent Application No. 201520595538.1, dated Mar. 25, 2016, 3 pages.
Office Action received for Chinese Patent Application No. 201520679198.0, dated Jun. 24, 2016, 5 pages.
Office Action received for Chinese Patent Application No. 2015206791980, dated Mar. 7, 2016, 6 pages.
Office Action Received for Chinese Patent Application No. 2015206791980, dated Nov. 18, 2015, 4 pages.
Office Action received for Chinese Patent Application No. 201621208900.6, dated Apr. 26, 2017, 2 pages.
Office Action Received for Chinese Patent Application No. 201520594249.X, dated Dec. 9, 2015, 4 pages.
Office Action Received for Chinese Patent Application No. 201520595384.6, dated Dec. 9, 2015, 4 pages.
Office Action Received for Chinese Patent Application No. 201520595385.0, dated Dec. 9, 2015, 4 pages.
Office Action Received for Chinese Patent Application No. 201520595538.1, dated Dec. 9, 2015, 4 pages.
Office Action received for Danish Patent Application No. PA201570495, dated Dec. 9, 2016, 2 pages.
Office action received for Danish Patent Application No. PA201570495, dated May 4, 2016, 8 pages.
Office Action received for Danish Patent Application No. PA201570495, dated Oct. 29, 2015, 7 pages.
Office Action received for Danish Patent Application No. PA201570497, dated Feb. 21, 2017, 3 pages.
Office Action received for Danish Patent Application No. PA201570497, dated May 17, 2016, 6 pages.
Office Action received for Danish Patent Application No. PA201570497, dated Nov. 15, 2016, 2 pages.
Office Action received for Danish Patent Application No. PA201570498, dated Feb. 6, 2017, 2 pages.
Office Action received for Danish Patent Application No. PA201570498, dated Jun. 2, 2016, 8 pages.
Office Action received for Danish Patent Application No. PA201570498, dated Oct. 30, 2015, 7 pages.
Office Action received for Danish Patent Application No. PA201570499, dated Feb. 14, 2017, 2 pages.
Office Action received for Danish Patent Application No. PA201570499, dated Jun. 16, 2016, 8 pages.
Office Action received for Danish Patent Application No. PA201570499, dated Nov. 3, 2015, 7 pages.
Office Action received for Danish Patent Application No. PA201570667, dated Apr. 1, 2016, 7 pages.
Office Action received for Danish Patent Application No. PA201570667, dated Sep. 2, 2016, 2 pages.
Office Action received for Danish Patent Application No. PA201670319, dated Aug. 2, 2016, 6 pages.
Office Action received for Danish Patent Application No. PA201670319, dated Jun. 21, 2017, 6 pages.
Office Action received for Danish Patent Application No. PA201670319, dated Nov. 24, 2016, 7 pages.
Office Action received for Danish Patent Application No. PA201670320, dated Aug. 4, 2016, 9 pages.
Office Action received for Danish Patent Application No. PA201670320, dated Dec. 5, 2016, 4 pages.
Office Action received for Danish Patent Application No. PA201670320, dated Jul. 3, 2017, 4 pages.
Office Action received for Danish Patent Application No. PA201570496, dated Oct. 29, 2015, 6 pages.
Office Action received for Danish Patent Application No. PA201570497, dated Oct. 30, 2015, 6 pages.
Office Action received for Japanese Patent Application No. 2017-505450, dated Jun. 20, 2017, 8 pages.
Office Action received for Korean Patent Application No. 10-2017-7005939, dated Jun. 30, 2017, 6 pages.
Office Action received for Netherland Patent Application No. 2015245, dated Jan. 24, 2017, 11 pages.

Office Action received for Netherlands Patent Application No. 2015239, dated Oct. 28, 2016, 13 pages.
Office Action Received for Taiwanese Patent Application No. 104124962, dated Nov. 29, 2016, 6 pages.
Office Action received for Taiwanese Patent Application No. 104124998, dated Nov. 29, 2016, 6 pages.
Office Action received for Taiwanese Patent Application No. 104124963, dated Jan. 5, 2017, 11 pages.
Office Action received for Taiwanese Patent Application No. 104124995, dated Dec. 1, 2016, 6 pages.
Office Action received for Taiwanese Patent Application No. 104124997, dated Dec. 8, 2016, 12 pages.
Office Action received for Taiwanese Patent Application No. 104126627, dated Nov. 29, 2016, 9 pages.
Office Action received for Taiwanese Patent Application No. 104128684, dated Nov. 8, 2016, 24 pages.
Office Action received for Taiwanese Patent Application No. 104128705, dated Aug. 29, 2016, 18 pages.
Office Action received for Taiwanese Patent Application No. 104128705, dated Mar. 16, 2017, 3 pages.
Office Action received for Taiwanese Patent Application No. 104132636, dated Mar. 23, 2017, 25 pages.
Office Action received for Australian Patent Application No. 2015101183, dated Nov. 6, 2015, 4 pages.
"Pentax K20D Operating Manual", http://www.ricoh-imaging.eu/en/operating- manuals-download.html, 2008, pp. 173-174.
Pre-Interview First Office Action received for U.S. Appl. No. 14/815,890, dated May 26, 2016, 4 pages.
Rehman, A, "Install Android 4.2 Gesture-Based Keyboard & Clock App on Jelly Bean 4.1 or Higher", Available online at <http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, dated Feb. 22, 2016, 5 pages.
Search Report and Opinion Received for Netherland Patent Application No. 2015232, dated Jan. 25, 2017, 9 pages.
Search Report and Opinion received for Netherlands Patent Application No. 2015242, dated Jul. 4, 2017, 20 pages.
Search Report and Opinion received for Netherlands Patent Application No. 2015364, dated Jul. 4, 2017, 12 pages.
Search Report and Opinion received for Netherlands Patent Application No. 2018531, dated Jul. 27, 2017, 14 pages.
Smartwatch, "App Earth Space HD Live Wallpaper APK for Smart Watch", Version 1.7, Android version 2.2, Aug. 27, 2013, 1 page.
"Solar Walk Free", Vito Technology, Jun. 19, 2014, 9 pages.
Sony, "Live View™ micro display", Extended User Guide, Aug. 2010, 27 pages.
Sony, "Sony SmartWatch", User Guide, Dec. 2011, 18 pages.
"Sun Set, Sun Set solar image clock", Available at <https://web.archive.orgjweb/20140719005410/http://www.sunsetclock.com/>, 2013, 5 pages.
"UIKit User Interface Catalog: Page Controls", Available online at https://web.archive.org/web/20140703123442/https://developer.apple.com/library/ios/documentation/userexperience/conceptual/UIKitUICatalog/UIPageControl.html, Dec. 16, 2013, 4 pages.
Viticci, Frederico, "Checking Time Zones with Living Earth—MacStories", Available at <https://www.macstories.net/reviews/checking-time-zones-with-living-earth/>, Dec. 11, 2013, pp. 1-5.
Zukerman, Erez, "6 Beautiful, Interesting & Versatile Timer Apps [Android]", available at:http://www.makeuseof.com/tag/beautiful-interesting-versatile-timer-apps-android/, May 18, 2012, 5 pages.
International Preliminary Report on Patentability received for PCT Patent Application No. PCT/US2017/035322, dated Dec. 27, 2018, 13 pages.
Notice of Allowance received for Korean Patent Application No. 10-2018-7034875, dated Dec. 12, 2018, 4 pages (1 page of English Translation and 3 pages of Official Copy).
Office Action received for Australian Patent Application No. 2017284958, dated Dec. 13, 2018, 3 pages.
Office Action received for Chinese Patent Application No. 201810037665.8, dated Dec. 7, 2018, 10 pages (5 pages of English Translation and 5 pages of Official Copy).

(56) References Cited

OTHER PUBLICATIONS

Apple Explores Merging Cloud Content with Locally Stored Media Library, available at: http://appleinsider.com/articles/11/02/10/apple_explores_merging_cloud_content_with_locally_stored_media_library.html, Feb. 10, 2011, 2 pages.
Extended European Search Report received for European Patent Application No. 16762356.0, dated Nov. 9, 2018, 10 pages.
Office Action received for Australian Patent Application No. 2015298710, dated Nov. 6, 2018, 4 pages.
International Preliminary Report on Patentability received for PCT Patent Application No. PCT/US2017/034834, dated Dec. 20, 2018, 9 pages.
Non-Final Office Action received for U.S. Appl. No. 14/815,890, dated Dec. 18, 2018, 21 pages.
Non-Final Office Action received for U.S. Appl. No. 14/846,511, dated Nov. 30, 2018, 22 pages.
Office Action received for Chinese Patent Application No. 201510483268.X, dated Oct. 19, 2018, 10 pages (5 pages of English Translation and 5 pages of Official Copy).
Office Action received for Australian Patent Application No. 2018206770, dated Jul. 25, 2018, 5 pages.
Final Office Action received for U.S. Appl. No. 15/798,235, dated Oct. 9, 2018, 45 pages.
Office Action received for Australian Patent Application No. 2015298710, dated Sep. 24, 2018, 4 pages.
Office Action received for Taiwanese Patent Application No. 104126627, dated Aug. 30, 2018, 22 pages (9 pages of English Translation and 13 pages of Official Copy).
Chen et al., "Event Detection from Flickr Data through Wavelet-based Spatial Analysis", Proceeding of the 18th ACM Conference on Information and Knowledge Management, CIKM, 2009, pp. 523-532.
Das et al., "Event Classification in Personal Image Collections", IEEE Intl. Workshop on Media Information Analysis for Personal and Social Applications at ICME, 2009, pp. 1660-1663.
Das et al., "Event-based Location Matching for Consumer Image Collections", CIVR, Proc. of the ACM Int. Conf. on Image and Video Retrieval, 2008, 5 pages.
Gallagher et al., "Image Annotation Using Personal Calendars as Context", ACM Intl. Conf. on Multimedia, 2008, 4 pages.
Han et al., "Density-Based Methods", Data Mining: Concepts and Techniques, Elsevier, 2006, pp. 418-420.
International Search Report and Written Opinion received for PCT Patent Application No. PCT/US2011/048169, dated Oct. 21, 2011, 9 pages.
Liao, T. Warren., "Clustering of Time Series Data—a Survey", Pattern Recognition, vol. 38, 2005, pp. 1857-1874.
Marwan et al., "Generalised Recurrence Plot Analysis for Spatial Data", Physics Letters A, vol. 360, 2007, pp. 545-551.
Non-Final Office Action received for U.S. Appl. No. 15/183,663, dated Jul. 9, 2018, 13 pages.
Office Action received for Danish Patent Application No. PA201570499, dated Jun. 19, 2018, 4 pages.
Office Action received for European Patent Application No. 15747595.5, dated Jun. 27, 2018, 8 pages.
Van Wijk et al., "Cluster and Calendar based Visualization of Time Series Data", IEEE Comput. Soc., 1999, 7 pages.
Decision to Grant received for Danish Patent Application No. PA201770397, dated Feb. 6, 2018, 2 pages.
European Search Report received for European Patent Application No. 17206177.2, dated Apr. 30, 2018, 4 pages.
Feldman, Ari, "Excerpts from: Designing Arcade Computer Game Graphics", Available online at: http://www.phatcode.net/res/269/files/dacgg.pdf, Jan. 1, 2001, 35 pages.
Intention to Grant received for Danish Patent Application No. PA201770397, dated Aug. 18, 2017, 7 pages.
Non-Final Office Action received for U.S. Appl. No. 15/798,235, dated Mar. 14, 2018, 58 pages.
Notice of Allowance received for U.S. Appl. No. 15/275,294, dated Jun. 6, 2018, 8 pages.

Office Action received for Chinese Patent Application No. 201510484514.3, dated Apr. 4, 2018, 12 pages (5 pages of English Translation and 7 pages of Official Copy).
Office Action received for Danish Patent Application No. PA201770791, dated Jan. 31, 2018, 8 pages.
Office Action received for European Patent Application No. 17206177.2, dated May 15, 2018, 6 pages.
"Reuse Animations—Synfig Animation Studio", Available online at: https://wiki.synfig.org/index.php?title=Doc:Reuse_Animations&oldid=18173, May 20, 2013, 5 pages.
Summons to Attend Oral Proceedings received for European Patent Application No. 15730924.6, dated Jun. 13, 2018, 10 pages.
"Tropical Fish 14", Available online at: https://www.turbosquid.com/3d-models/tropical-fish-3d-model/388510, Feb. 4, 2008, 2 pages.
Decision on Opposition received for Australian Patent Application No. 2015298710, dated Aug. 20, 2018, 20 pages.
Final Office Action received for U.S. Appl. No. 14/841,606, dated Sep. 7, 2018, 34 pages.
Invitation to Pay Additional Fees received for PCT Patent Application No. PCT/US2018/032164, dated Aug. 21, 2018, 10 pages.
International Search Report and Written Opinion received for PCT Patent Application No. PCT/US2018/032164, dated Oct. 18, 2018, 18 Pages.
Office Action received for Chinese Patent Application No. 201510481525.6, dated Aug. 29, 2018, 10 pages (5 pages of English Translation and 5 pages of Official copy).
Office action received for Chinese Patent Application No. 201510483305.7, dated Aug. 31, 2018, 10 pages (5 pages of English Translation and 5 pages of Official copy).
Office Action received for Japanese Patent Application No. 2017-545918, dated Sep. 14, 2018, 12 pages (7 pages of English Translation and 5 pages of Official copy).
Office Action received for Korean Patent Application No. 10-2017-7024570, dated Sep. 28, 2018, 14 pages (6 pages of English Translation and 8 pages of Official copy).
Advisory Action received for U.S. Appl. No. 14/846,511, dated Sep. 19, 2018, 8 pages.
Notice of Acceptance received for Australian Patent Application No. 2016229847, dated Sep. 12, 2018, 3 pages.
Final Office Action received for U.S. Appl. No. 14/815,890, dated Feb. 26, 2018, 20 pages.
International Preliminary Report on Patentability received for PCT Application No. PCT/US2016/037686, dated Mar. 1, 2018, 12 pages.
Invitation to Pay Additional Fee received for European Patent Application No. 15747595.5, dated Feb. 9, 2018, 6 pages.
Notice of Allowance received for Japanese Patent Application No. 2017-505450, dated Mar. 9, 2018, 10 pages (7 pages of English Translation and 3 pages of Official Copy).
Office Action received for Chinese Patent Application No. 201510481525.6, dated Nov. 29, 2017, 9 pages (3 pages of English Translation and 6 pages of Official Copy).
Office Action received for Chinese Patent Application No. 201510483268.X, dated Dec. 1, 2017, 11 pages (5 pages of English Translation and 6 pages of Official Copy).
Office Action received for Australian Patent Application No. 2016229847, dated Jul. 3, 2018, 4 pages.
Office Action received for Danish Patent Application No. PA201770791, dated Jul. 13, 2018, 2 pages.
Corrected Notice of Allowance received for U.S. Appl. No. 15/798,257, dated Aug. 26, 2019, 2 pages.
Corrected Notice of Allowance received for U.S. Appl. No. 15/798,257, dated Jul. 9, 2019, 2 pages.
Decision on Acceptance received for Australian Patent Application No. 2015298710, dated Jul. 19, 2019, 18 pages.
Decision on Opposition received for Australian Patent Application No. 2015298710, dated Aug. 9, 2019, 4 pages.
Notice of Acceptance received for Australian Patent Application No. 2017284958, dated Sep. 3, 2019, 3 pages.
Notice of Allowance received for Chinese Patent Application No. 201510484514.3, dated Jun. 6, 2019, 2 pages (1 page of English Translation and 1 page Of Official Copy).

(56) References Cited

OTHER PUBLICATIONS

Notice of Allowance received for Japanese Patent Application No. 2017-545918, dated Jul. 22, 2019, 4 pp. (1 p. Of English Translation and 3 pp. Of Official Copy).
Notice of Allowance received for Chinese Patent Application No. 201810037665.8, dated Jul. 9, 2019, 4 pages (1 page of English Translation and 3 pages Of Official Copy).
Office Action received for Australian Patent Application No. 2018206770, dated Jul. 16, 2019, 5 pages.
Office Action received for Australian Patent Application No. 2018279037, dated Jun. 18, 2019, 5 pages.
Office Action received for Chinese Patent Application No. 201811616429.8, dated Sep. 4, 2019, 26 pages (15 pages of English Translation and 11 pages of Official Copy).
Office Action received for Japanese Patent Application No. 2018-537840, dated Jul. 8, 2019, 15 pages (8 pages of English Translation and 7 pages of Official copy).
Office Action received for Korean Patent Application No. 10-2017-7024570, dated Jul. 10, 2019, 6 pages (3 pages of English Translation and 3 pages of Official Copy).
Office Action received for Korean Patent Application No. 10-2018-7018904, dated Aug. 20, 2019, 8 pages (3 pages of English Translation and 5 pages Of Official Copy).
Office Action received for Korean Patent Application No. 10-2018-7022101, dated Jul. 9, 2019, 10 pages (5 pages of English Translation and 5 pages of Official Copy).
Non-Final Office Action received for U.S. Appl. No. 15/391,269, dated Aug. 22, 2019, 44 pages.
Summons to Attend Oral Proceedings received for European Patent Application No. 5730925.3, dated Oct. 2, 2019, 8 pages.
Advisory Action received for U.S. Appl. No. 14/841,606, dated Feb. 28, 2019, 3 pages.
Corrected Notice of Allowance received for U.S. Appl. No. 15/183,663, dated Feb. 25, 2019, 3 pages.
Corrected Notice of Allowance received for U.S. Appl. No. 15/183,663, dated Mar. 27, 2019, 2 pages.
Corrected Notice of Allowance received for U.S. Appl. No. 15/798,257, dated Jun. 12, 2019, 2 pages.
Decision to Refuse received for European Patent Application No. 15730924.6, dated Mar. 15, 2019, 12 pages.
Extended European Search Report received for European Patent Application No. 16837432.0, dated Mar. 11, 2019, 10 pages.
Final Office Action received for U.S. Appl. No. 14/815,890, dated May 14, 2019, 22 pages.
Final Office Action received for U.S. Appl. No. 14/846,511, dated Jun. 5, 2019, 24 pages.
Minutes of Oral Proceedings received for European Patent Application No. 15730924.6, dated Mar. 13, 2019, 4 pages.
Non-Final Office Action received for U.S. Appl. No. 15/421,865, dated Mar. 21, 2019, 18 pages.
Non-Final Office Action received for U.S. Appl. No. 15/554,204, dated Apr. 17, 2019, 19 pages.
Non-Final Office Action received for U.S. Appl. No. 14/821,667, dated Feb. 4, 2019, 13 pages.
Non-Final Office Action received for U.S. Appl. No. 14/841,606, dated May 8, 2019, 28 pages.
Non-Final Office Action received for U.S. Appl. No. 15/355,956, dated May 31, 2019, 32 pages.
Non-Final Office Action received for U.S. Appl. No. 15/405,122, dated May 31, 2019, 43 pages.
Non-Final Office Action received for U.S. Appl. No. 15/798,235, dated Apr. 24, 2019, 25 pages.
Notice of Allowance received for Chinese Patent Application No. 201510481525.6, dated May 27, 2019, 2 pages. (1 page of English Translation and 1 page of Official Copy).
Notice of Allowance received for Chinese Patent Application No. 201510483305.7, dated Jan. 8, 2019, 3 pages (1 page of English Translation and 2 pages of Official Copy).
Notice of Allowance received for Japanese Patent Application No. 2017-505847, dated May 20, 2019, 4 pages (1 page of English Translation and 3 pages of Official Copy).
Notice of Allowance received for Japanese Patent Application No. 2018-074971, dated Apr. 23, 2019, 4 pages (1 page of English Translation and 3 pages of Official Copy).
Notice of Allowance received for U.S. Appl. No. 14/821,667, dated Jun. 12, 2019, 9 pages.
Notice of Allowance received for U.S. Appl. No. 15/183,663, dated Jan. 17, 2019, 6 pages.
Notice of Allowance received for U.S. Appl. No. 15/798,257, dated May 22, 2019, 14 pages.
Office Action received for Australian Patent Application No. 2018206770, dated Apr. 30, 2019, 4 pages.
Office Action received for Australian Patent Application No. 2018206770, dated Mar. 5, 2019, 3 pages.
Office Action received for Chinese Patent Application No. 201510479088.4, dated May 7, 2019, 6 pages (3 pages Of English Translation and 3 pages of Official Copy).
Office Action received for Chinese Patent Application No. 201510483268.X, dated Apr. 16, 2019, 6 pages (3 pages Of English Translation and 3 pages of Official Copy).
Office Action received for Chinese Patent Application No. 201510484514.3, dated Dec. 24, 2018, 13 pages (6 pages of English Translation and 7 pages of Official Copy).
Office Action received for Chinese Patent Application No. 201680047983.1, dated Mar. 18, 2019, 18 pages (6 pages of English Translation and 12 pages of Official Copy).
Office Action received for Danish Patent Application No. PA201670608, dated Jan. 14, 2019, 7 pages.
Office Action received for Danish Patent Application No. PA201670609, dated Mar. 1, 2019, 9 pages.
Office Action received for Danish Patent Application No. PA201770791, dated Jun. 11, 2019, 3 pages.
Office Action received for European Patent Application No. 15747595.5, dated Apr. 15, 2019, 4 pages.
Office Action received for European Patent Application No. 15730925.3, dated Feb. 27, 2019, 5 pages.
Office Action received for Japanese Patent Application No. 2017-505842, dated Feb. 22, 2019, 11 pages (6 pages of English Translation and 5 pages of Official Copy).
Office Action received for Japanese Patent Application No. 2017-505847, dated Feb. 12, 2019, 13 pages (6 pages of English Translation and 7 pages of Official Copy).
Office Action received for Japanese Patent Application No. 2018-074971, dated Jan. 28, 2019, 6 pages (3 pages Of English Translation and 3 pages of Official Copy).
Office Action received for Korean Patent Application No. 10-2018-7022101, dated Feb. 14, 2019, 15 pages (6 pages of English Translation and 9 pages of Official Copy).
Office Action received for Korean Patent Application No. 10-2019-7007053, dated Mar. 18, 2019, 12 pages (5 pages of English Translation and 7 pages of Official Copy).
Office Action received for Taiwanese Patent Application No. 104126627, dated Dec. 20, 2018, 4 pages (2 pages of English Translation and 2 pages of Official Copy).
Office Action received for Taiwanese Patent Application No. 104132636, dated Dec. 13, 2018, 26 pages (9 pages of English Translation and 17 pages of Official Copy).
Summons to Attend Oral Proceedings received for European Patent Application No. 17206177.2, dated Jun. 3, 2019, 8 pages.
Android Central, "Be Weather weather app for Android", Available online at: https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_gil, Jul. 2, 2014, 4 pages.
Clark, Josh, "Designing Great iPhone Apps", O'Reilly Japan Co., O'Reilly Tim, vol. 1, May 24, 2012, 5 pages. (Official Copy only) 37 CFR § 1.98(a) (3).
Ebpman Tech Reviews, "LG G3 Tips: How to customize the clock face", Available online at: https://www.youtube.com/watch?v=evraMWFblfY, Jul. 25, 2014, 1 page.

(56) References Cited

OTHER PUBLICATIONS

Feist, Jonathan, "Android customization—how to create a custom clock widget using Zooper Widget", Available Online at: https://www.androidauthority.com/zooper-widget-clock-366476/, May 15, 2014, 10 pages.

Fukuda, Kazuhiro, "Xperia Z1 Perfect Manual", Sotec Co., Ltd., No. 1, Nov. 15, 2013, pp. 217-218 (Official Copy only) 37 CFR § 1.98(a) (3).

Gazer, "iPhone 4S Super Manual", Shuwa System Co., Saito Kazukuni, vol. 1, Jun. 6, 2013, 7 pages (Official Copy only) 37 CFR § 1.98(a) (3).

Geary, David, "Programming HTML5 Canvas", Okapis; Reilly Japan, Inc., No. 1, Jul. 23, 2014, pp. 327-330 (Official Copy only) 37 CFR § 1.98(a) (3).

Kenney, Briley, "How to Customize a Smartwatch and other Personalization Questions", Available online at: https://smartwatches.org/learn/customize-smartwatch/>, Jan. 23, 2014, 3 pages.

Obara, Yuuta, "iPhone Application Selection for University Students", Shuwa System Co., Saito Kazukuni, vol. 1, May 16, 2013, 4 pages. (Official Copy only) 37 CFR § 1.98(a) (3).

Octoba, "Just Install It—Utilizing Method for Android Application Business", ASCII Media Works Co. Takano Kiyoshi, vol. 1, Apr. 25, 2013, 6 pages (Official Copy only) 37 CFR § 1.98(a) (3).

Omar Romero, "Sony Smartwatch 2 Custom Watchfaces Tutorial", Retrieved From: https://www.youtube.com/watch?v=8odbxgwSQR8>, May 1, 2014, 2 pages.

Shiota, Shinji, "Windows 7 Dojo", Weekly ASCII, ASCII Mediaworks Inc., vol. 798 Aug. 31 , 2010, 3 pages (Official Copy only) 37 CFR § 1.98(a) (3).

Stateoftech, "Samsung Galaxy Gear Tips—Change the Clock Face", Retrieved from: https://www.youtube.com/watch?v=GOom7AZUAjY, Dec. 11, 2013, 2 pages.

Watchophilia, "Mickey Mouse Watches", Online Available at: https://web.archive.org/web/20130929065422/https://www.watchophilia.com/photogallery/mickey-mouse/, Sep. 29, 2013, 16 pages.

Watchuseek, "The watch every father needs: M-I-C-K-E-Y, M-O-U-S-E. Mickey Mouse . . .?" Online Available at: https://forums.watchuseek.com/f2/watch-every-father-needs-m-i-c-k-e-y-m-o-u-s-e-mickey-mouse-855069.html, 2013, 3 pages.

Xperia ZL2 SOL25, "Instruction Manual", Detailed version, KDDI Corporation, No. 1, vol. 1, Jun. 2014, 4 pages. (Official Copy only) 37 CFR § 1.98(a) (3).

\* cited by examiner

10 hours 42 minutes 31 seconds 10 hrs 42 mins 31 secs 10h 42m 31s 10h 42m

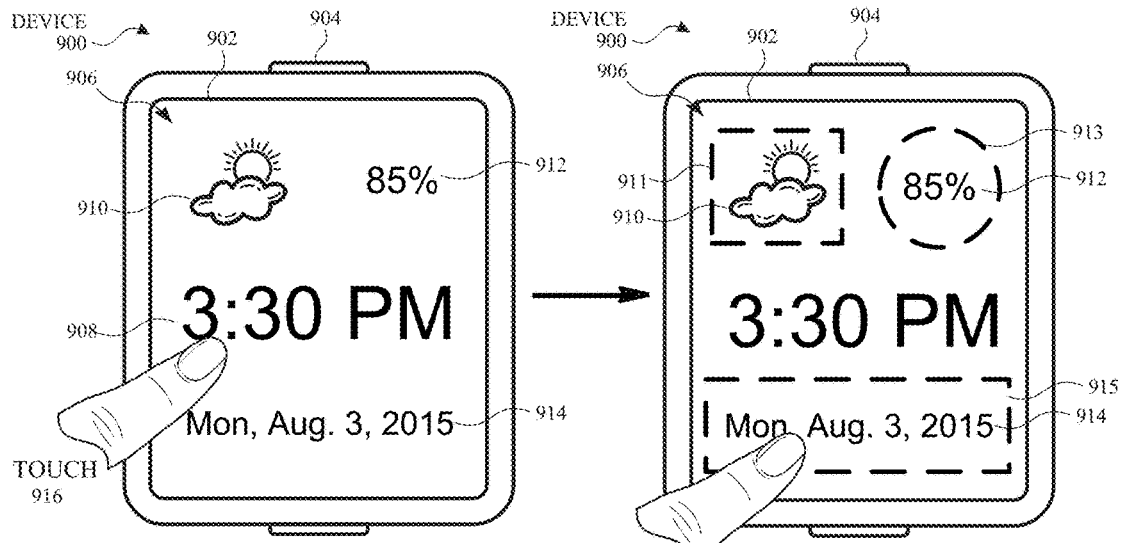
*FIG. 9A*    *FIG. 9B*
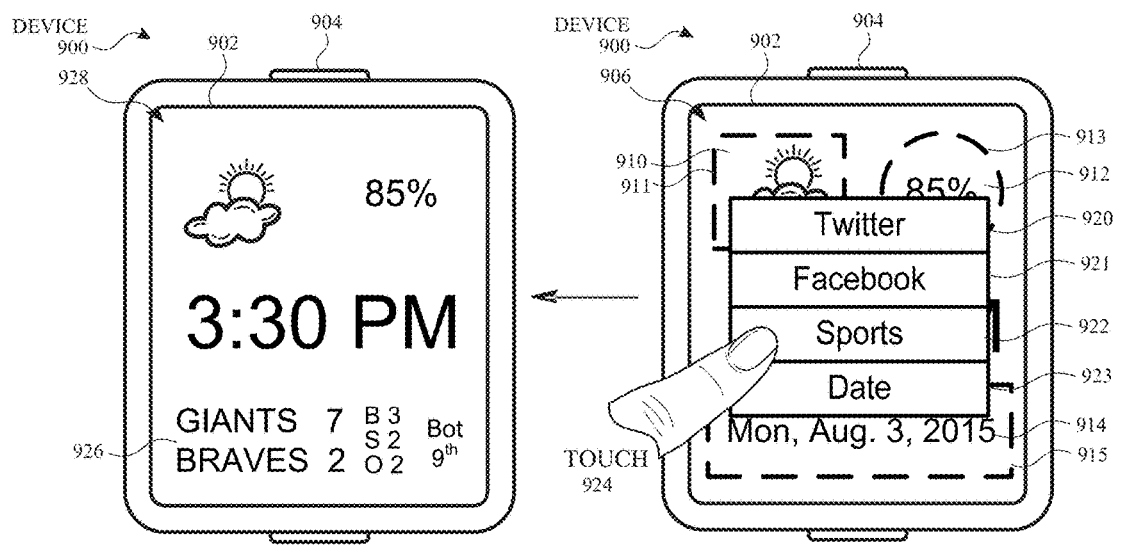
*FIG. 9D*    *FIG. 9C*

FORMATTING CONTENT FOR A REDUCED-SIZE USER INTERFACE

CROSS-REFERENCE TO RELATED APPLICATIONS

This application is a continuation of U.S. patent application Ser. No. 14/839,889, filed Aug. 28, 2015, which claims priority to U.S. Provisional Patent Application Ser. No. 62/172,033, filed Jun. 5, 2015. The contents of which are hereby incorporated by reference in their entirety.

FIELD

The present disclosure relates generally to computer user interfaces, and more specifically to techniques for formatting content for display on a reduced-size user interface.

BACKGROUND

Many modern electronic devices, such as smartphones, tablet computers, watches, and the like, include a display that serves as the primary user interface for the device. The size of the display on such devices is often small, which makes it difficult to display significant amounts of content in a discernable, comprehensible, and aesthetically pleasing manner.

Some techniques for displaying content on a reduced-size user interface using electronic devices, however, are generally inefficient. For example, some existing techniques do not accommodate different interface sizes. Existing techniques may fail to display key information (e.g., if the size of the content exceeds the size of the display area) or display content in a manner that is difficult to view, making it challenging for a user to interact with the device.

In addition, modern devices may accommodate simultaneous display of content from multiple different sources (e.g., different applications), each with a different style, format, color, etc. The lack of a consistent general appearance can result in an interface that is distracting and makes it difficult for a user to process the displayed information.

BRIEF SUMMARY

In view of the issues discussed above, the present disclosure provides, inter alia, the benefit of electronic devices with more efficient methods and interfaces for displaying content on a reduced-size user interface. Such methods and interfaces optionally complement or replace other methods for displaying content on a reduced-size user interface. Such methods and interfaces may reduce the cognitive burden on a user and produce a more efficient human-machine interface. Such methods and interfaces may also reduce the number of unnecessary, extraneous, repetitive, and/or redundant inputs, and may create a faster and more efficient user interface arrangement, which may reduce the number of required inputs, reduce processing power, and reduce the amount of time for which user interfaces need to be displayed in order for desired functions to be accessed and carried out. For battery-operated computing devices, such methods and interfaces conserve power and increase the time between battery charges.

The above deficiencies and other problems are reduced or eliminated by the disclosed devices, methods, and computer-readable media. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has hardware input mechanisms such as depressible buttons and/or rotatable input mechanisms. In some embodiments, the device has a graphical user interface (GUI), one or more processors, memory, and one or more modules, programs, or sets of instructions stored in the memory for performing multiple functions. In some embodiments, the user interacts with the GUI through finger contacts and gestures on the touch-sensitive surface and/or through rotating the rotatable input mechanism and/or through depressing hardware buttons. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer-readable storage medium or other computer program product configured for execution by one or more processors. Executable instructions for performing these functions are, optionally, included in a transitory computer-readable medium or other computer program product configured for execution by one or more processors.

In some embodiments, a method is performed at an electronic device with one or more processors, memory, and a display. The method includes: receiving content associated with a designated area of the display, where the content is associated with a plurality of available display formats stored in the memory; determining a size of the designated area; determining a first display format for the content from the plurality of available display formats based on at least the content and the size of the designated area; and displaying a representation of the content according to the first display format.

In some embodiments, an electronic device includes a display, one or more processors, a memory, and one or more programs, where the one or more programs are stored in the memory and configured to be executed by the one or more processors. The one or more programs include instructions for: receiving content associated with a designated area of the display, where the content is associated with a plurality of available display formats stored in the memory; determining a size of the designated area; determining a first display format for the content from the plurality of available display formats based on at least the content and the size of the designated area; and displaying a representation of the content according to the first display format.

In some embodiments, a non-transitory computer-readable storage medium stores one or more programs, where the one or more programs include instructions, which when executed by one or more processors of an electronic device with a display, cause the device to: receive content associated with a designated area of the display, where the content is associated with a plurality of available display formats stored in the memory; determine a size of the designated area; determine a first display format for the content from the plurality of available display formats based on at least the content and the size of the designated area; and display a representation of the content according to the first display format.

In some embodiments, a transitory computer-readable medium comprises instructions, which when executed by one or more processors of an electronic device with a display, cause the device to: receive content associated with a designated area of the display, where the content is associated with a plurality of available display formats stored in the memory; determine a size of the designated area; determine a first display format for the content from the plurality of available display formats based on at least the content and the size of the designated area; and display a representation of the content according to the first display format.

In some embodiments, an electronic device includes: a display; means for receiving content associated with a designated area of the display, where the content is associated with a plurality of available display formats stored in the memory; means for determining a size of the designated area; means for determining a first display format for the content from the plurality of available display formats based on at least the content and the size of the designated area; and means for displaying a representation of the content according to the first display format.

In some embodiments, an electronic device includes a display unit configured to display a graphic user interface; and a processing unit coupled to the display unit. The processing unit is configured to: receive content associated with a designated area of the display, where the content is associated with a plurality of available display formats stored in the memory; determine a size of the designated area; determine a first display format for the content from the plurality of available display formats based on at least the content and the size of the designated area; and enable display of a representation of the content according to the first display format.

In some embodiments, a method is performed at an electronic device with one or more processors, memory, and a display. The method includes receiving data representing an application and, in response to receiving the data representing the application, loading the application into the memory, where loading the application into the memory includes storing data representing one or more complications associated with the application. A first user interface screen including a clock face is displayed, where the clock face includes one or more complication areas. A first user input is received and, in response to receiving the first user input, a clock face edit mode of the electronic device is entered. While in the clock face edit mode, a second user input is received corresponding to selection of a first complication area of the one or more complication areas and, in response to receiving the second user input corresponding to selection of the first complication area, one or more representations of at least one of the one or more complications associated with the application is displayed, where the one or more representations includes a first representation of a first complication from the at least one of the one or more complications associated with the application and the first complication includes content associated with the first complication. A first display format for the content associated with the first complication is determined. A third user input corresponding to selection of the first representation of the first complication is received and, in response to receiving the third user input, the first complication is associated with the first complication area of the clock face. While in the clock face edit mode, a fourth user input is received and, in response to receiving the fourth user input: the clock face edit mode is exited; and a second user interface screen including the clock face is displayed, where the clock face on the second user interface screen includes the first complication in the first complication area and the first complication includes a representation of the content formatted according to the first display format.

In some embodiments, an electronic device includes: a display; one or more processors; a memory; and one or more programs, where the one or more programs are stored in the memory and configured to be executed by the one or more processors, the one or more programs including instructions for: receiving data representing an application; in response to receiving the data representing the application, loading the application into the memory, where loading the application into the memory includes storing data representing one or more complications associated with the application; displaying a first user interface screen including a clock face, where the clock face includes one or more complication areas; receiving a first user input; in response to receiving the first user input, entering a clock face edit mode of the electronic device; while in the clock face edit mode, receiving a second user input corresponding to selection of a first complication area of the one or more complication areas; in response to receiving the second user input corresponding to selection of the first complication area, displaying one or more representations of at least one of the one or more complications associated with the application where the one or more representations includes a first representation of a first complication from the at least one of the one or more complications associated with the application, and where the first complication includes content associated with the first complication; determining a first display format for the content associated with the first complication; receiving a third user input corresponding to selection of the first representation of the first complication; in response to receiving the third user input, associating the first complication with the first complication area of the clock face; while in the clock face edit mode, receiving a fourth user input; and in response to receiving the fourth user input: exiting the clock face edit mode; and displaying a second user interface screen including the clock face, where the clock face on the second user interface screen includes the first complication in the first complication area, and where the first complication includes a representation of the content formatted according to the first display format.

In some embodiments, a non-transitory computer-readable storage medium stores one or more programs, the one or more programs comprising instructions, which when executed by one or more processors of an electronic device with a display, cause the device to: receive data representing an application; in response to receiving the data representing the application, load the application into the memory, where loading the application into the memory includes storing data representing one or more complications associated with the application; display a first user interface screen including a clock face, where the clock face includes one or more complication areas; receive a first user input; in response to receiving the first user input, enter a clock face edit mode of the electronic device; while in the clock face edit mode, receive a second user input corresponding to selection of a first complication area of the one or more complication areas; in response to receiving the second user input corresponding to selection of the first complication area, display one or more representations of at least one of the one or more complications associated with the application, where the one or more representations includes a first representation of a first complication from the at least one of the one or more complications associated with the application, and where the first complication includes content associated with the first complication; determine a first display format for the content associated with the first complication; receive a third user input corresponding to selection of the first representation of the first complication; in response to receiving the third user input, associate the first complication with the first complication area of the clock face; while in the clock face edit mode, receiving a fourth user input; and in response to receiving the fourth user input: exit the clock face edit mode; and display a second user interface screen including the clock face, where the clock face on the second user interface screen includes the first complication in the first complication area, and where the first complication includes a representation of the content formatted according to the first display format.

In some embodiments, a transitory computer-readable medium comprises instructions, which when executed by one or more processors of an electronic device with a display, cause the device to: receive data representing an application; in response to receiving the data representing the application, load the application into the memory, where loading the application into the memory includes storing data representing one or more complications associated with the application; display a first user interface screen including a clock face, where the clock face includes one or more complication areas; receive a first user input; in response to receiving the first user input, enter a clock face edit mode of the electronic device; while in the clock face edit mode, receive a second user input corresponding to selection of a first complication area of the one or more complication areas; in response to receiving the second user input corresponding to selection of the first complication area, display one or more representations of at least one of the one or more complications associated with the application, where the one or more representations includes a first representation of a first complication from the at least one of the one or more complications associated with the application, and where the first complication includes content associated with the first complication; determine a first display format for the content associated with the first complication; receive a third user input corresponding to selection of the first representation of the first complication; in response to receiving the third user input, associate the first complication with the first complication area of the clock face; while in the clock face edit mode, receiving a fourth user input; and in response to receiving the fourth user input: exit the clock face edit mode; and display a second user interface screen including the clock face, where the clock face on the second user interface screen includes the first complication in the first complication area, and where the first complication includes a representation of the content formatted according to the first display format.

In some embodiments, an electronic device includes: a display; means for receiving data representing an application; means for, in response to receiving the data representing the application, loading the application into the memory, where loading the application into the memory includes storing data representing one or more complications associated with the application; means for displaying a first user interface screen including a clock face, where the clock face includes one or more complication areas; means for receiving a first user input; means for, in response to receiving the first user input, entering a clock face edit mode of the electronic device; means for, while in the clock face edit mode, receiving a second user input corresponding to selection of a first complication area of the one or more complication areas; means for, in response to receiving the second user input corresponding to selection of the first complication area, displaying one or more representations of at least one of the one or more complications associated with the application, where the one or more representations includes a first representation of a first complication from the at least one of the one or more complications associated with the application, and where the first complication includes content associated with the first complication; means for determining a first display format for the content associated with the first complication; means for receiving a third user input corresponding to selection of the first representation of the first complication; means for, in response to receiving the third user input, associating the first complication with the first complication area of the clock face; means for, while in the clock face edit mode, receiving a fourth user input; and means for, in response to receiving the fourth user input: exiting the clock face edit mode; and displaying a second user interface screen including the clock face, where the clock face on the second user interface screen includes the first complication in the first complication area, and where the first complication includes a representation of the content formatted according to the first display format.

In some embodiments, an electronic device includes: a display unit configured to display a graphic user interface; and a processing unit coupled to the display unit, the processing unit configured to: receive data representing an application; in response to receiving the data representing the application, load the application into the memory, where loading the application into the memory includes storing data representing one or more complications associated with the application; enable display of a first user interface screen including a clock face, where the clock face includes one or more complication areas; receive a first user input; in response to receiving the first user input, enter a clock face edit mode of the electronic device; while in the clock face edit mode, receive a second user input corresponding to selection of a first complication area of the one or more complication areas; in response to receiving the second user input corresponding to selection of the first complication area, enable display of one or more representations of at least one of the one or more complications associated with the application, where the one or more representations includes a first representation of a first complication from the at least one of the one or more complications associated with the application, and where the first complication includes content associated with the first complication; determine a first display format for the content associated with the first complication; receive a third user input corresponding to selection of the first representation of the first complication; in response to receiving the third user input, associate the first complication with the first complication area of the clock face; while in the clock face edit mode, receiving a fourth user input; and in response to receiving the fourth user input: exit the clock face edit mode; and enable display of a second user interface screen including the clock face, where the clock face on the second user interface screen includes the first complication in the first complication area, and where the first complication includes a representation of the content formatted according to the first display format.

Thus, devices are provided with faster, more efficient methods and interfaces for displaying content on a reduced-size display, thereby increasing the effectiveness, efficiency, and user satisfaction with such devices. Such methods and interfaces may complement or replace other methods for displaying content on a reduced-size display.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 6B-6E illustrate exemplary display formats in accordance with some embodiments.

FIGS. 9A-9G illustrate exemplary user interfaces in accordance with some embodiments.

DESCRIPTION OF EMBODIMENTS

Figure 1A:
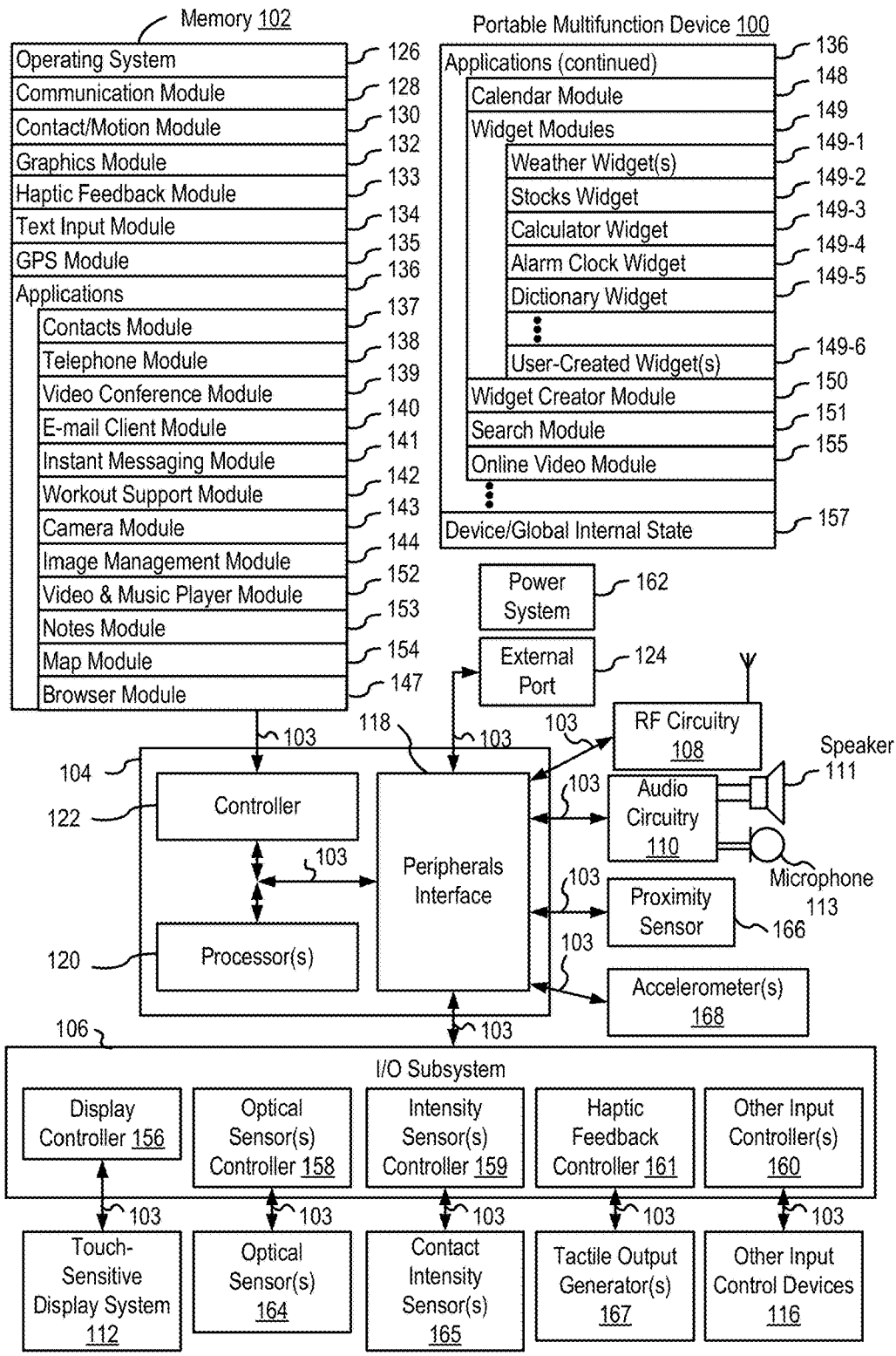
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

The present disclosure provides, inter alia, the benefit of electronic devices with efficient methods and techniques for displaying content on a reduced-size user interface. For example, a method may automatically adjust the format of content in a designated area of a display according to one of several established formats. Such a technique can thereby create a more efficient user interface that provides information in a more consistent and comprehensible manner. Also, for content provided by third parties, the methods described below may display, in a consistent and comprehensible format, content that has not been specifically designed for a particular display.

Below, FIGS. 1A-1B, 2, 3, 4A-4B, and 5A-5B provide a description of exemplary devices for displaying content on a reduced-size user interface. Exemplary user interfaces for displaying content on a reduced-size display are described with reference to FIGS. 6A-6I and 9A-8G. FIGS. 7 and 10 are flow diagrams illustrating methods of displaying content on a reduced-size user interface in accordance with some embodiments. The user interfaces and display formats in FIGS. 6A-6I and 9A-8G are used to illustrate the processes described below, including the processes in FIGS. 7 and 10.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device may support a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 may include one or more computer-readable storage mediums. The computer-readable storage mediums may be tangible and non-transitory. Memory 102 may include high-speed random access memory and may also include non-volatile memory, such as one or more magnetic disk storage devices, flash memory devices, or other non-volatile solid-state memory devices. Memory controller 122 may control access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device so that the touch screen display may be used as a viewfinder for still and/or video image acquisition. In some embodiments, an optical sensor is located on the front of the device so that the user's image may be obtained for video conferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 may also include one or more accelerometers 168. FIG. 1A shows accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
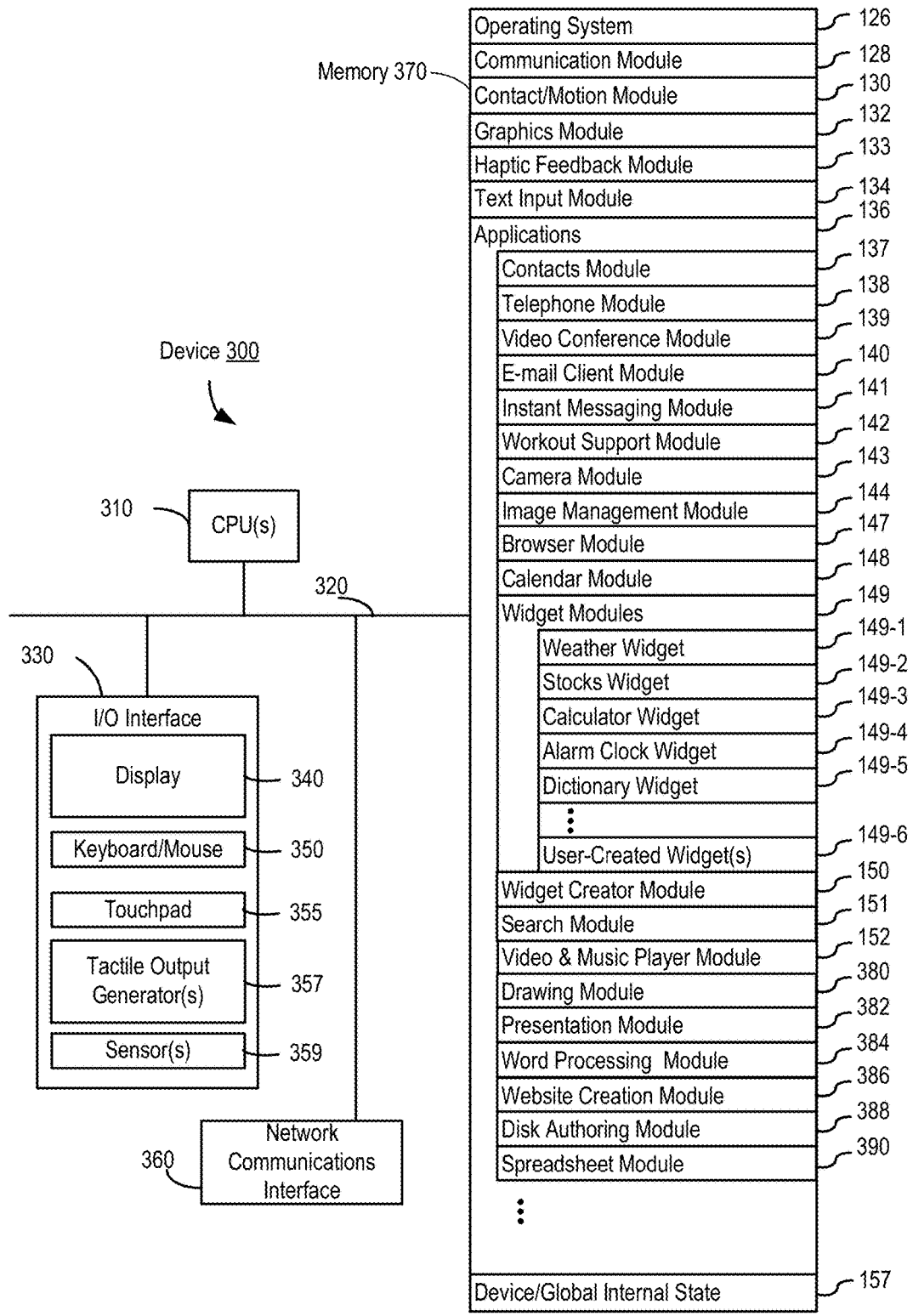
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 may include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 may be used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication may use any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XIVIPP, SIMPLE, or IMPS for Internet-based instant messages), to receive instant messages, and to view received instant messages. In some embodiments, transmitted and/or received instant messages may include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 may be used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 may be used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules may be combined or otherwise rearranged in various embodiments. For example, video player module may be combined with music player module into a single module (e.g., video and music player module 152, FIG. 1A). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
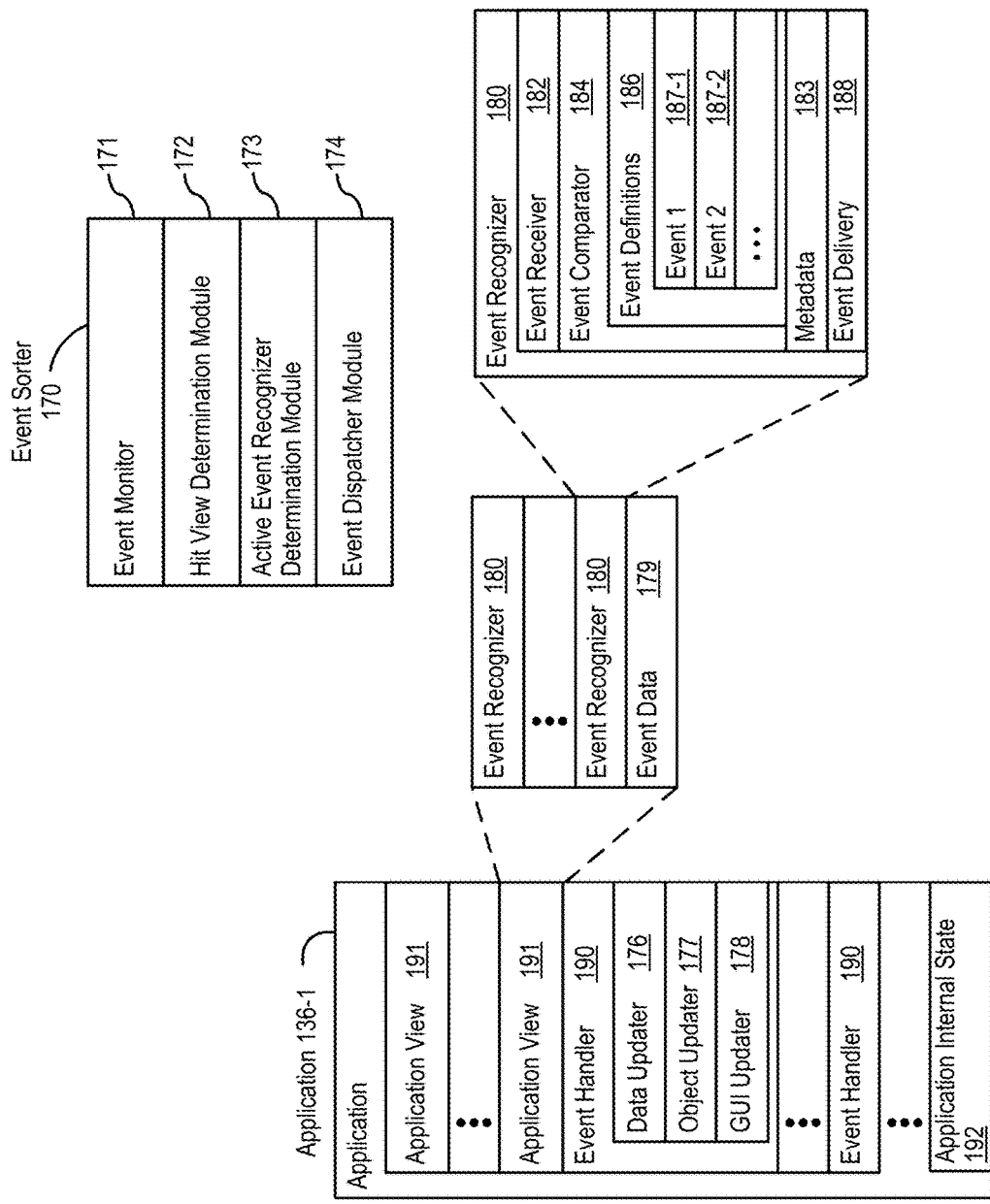
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
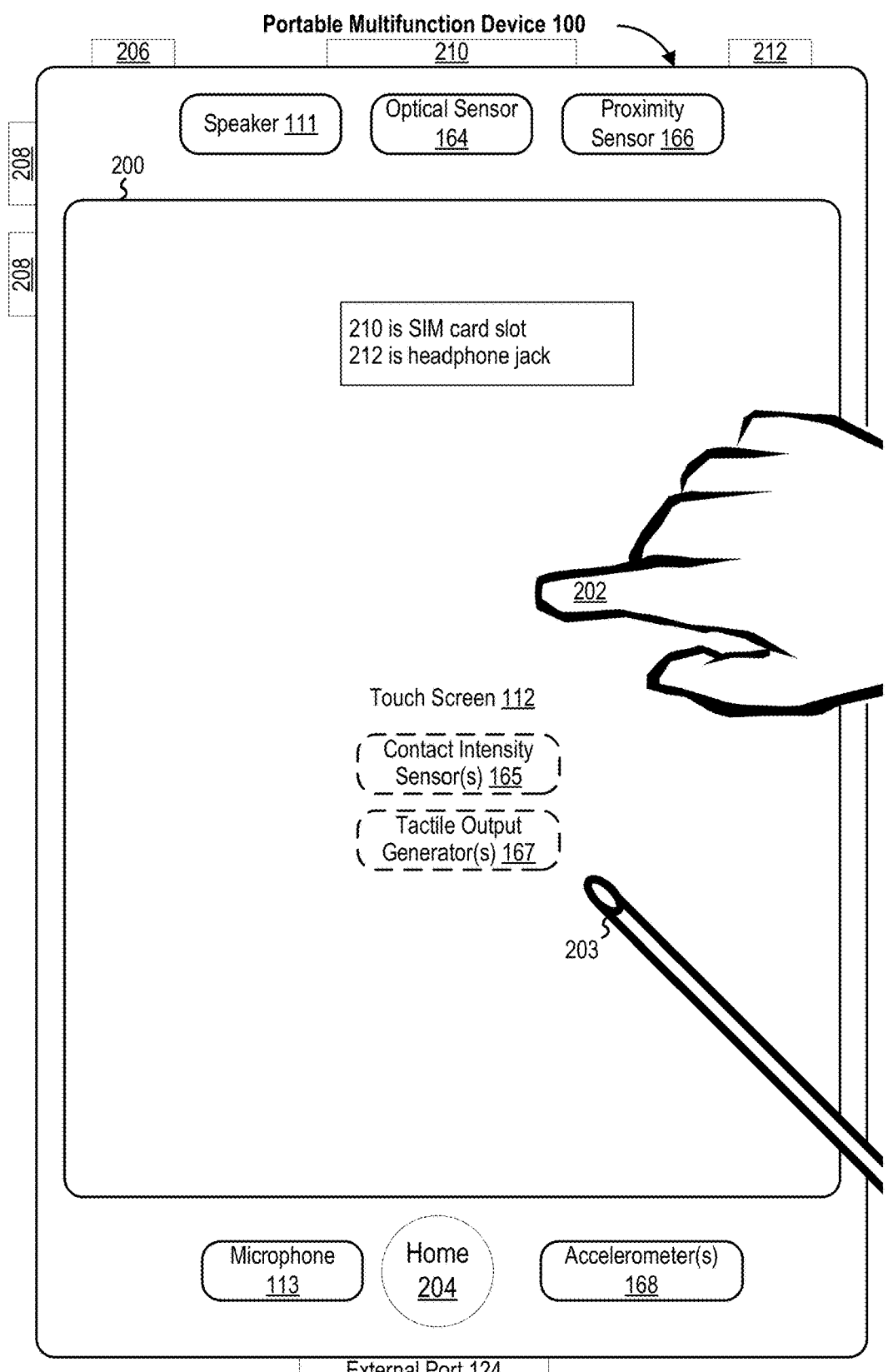
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 may be stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules may be combined or otherwise rearranged in various embodiments. In some embodiments, memory 370 may store a subset of the modules and data structures identified above. Furthermore, memory 370 may store additional modules and data structures not described above.

Attention is now directed towards embodiments of user interfaces that may be implemented on, for example, portable multifunction device 100.

Figure 4A:
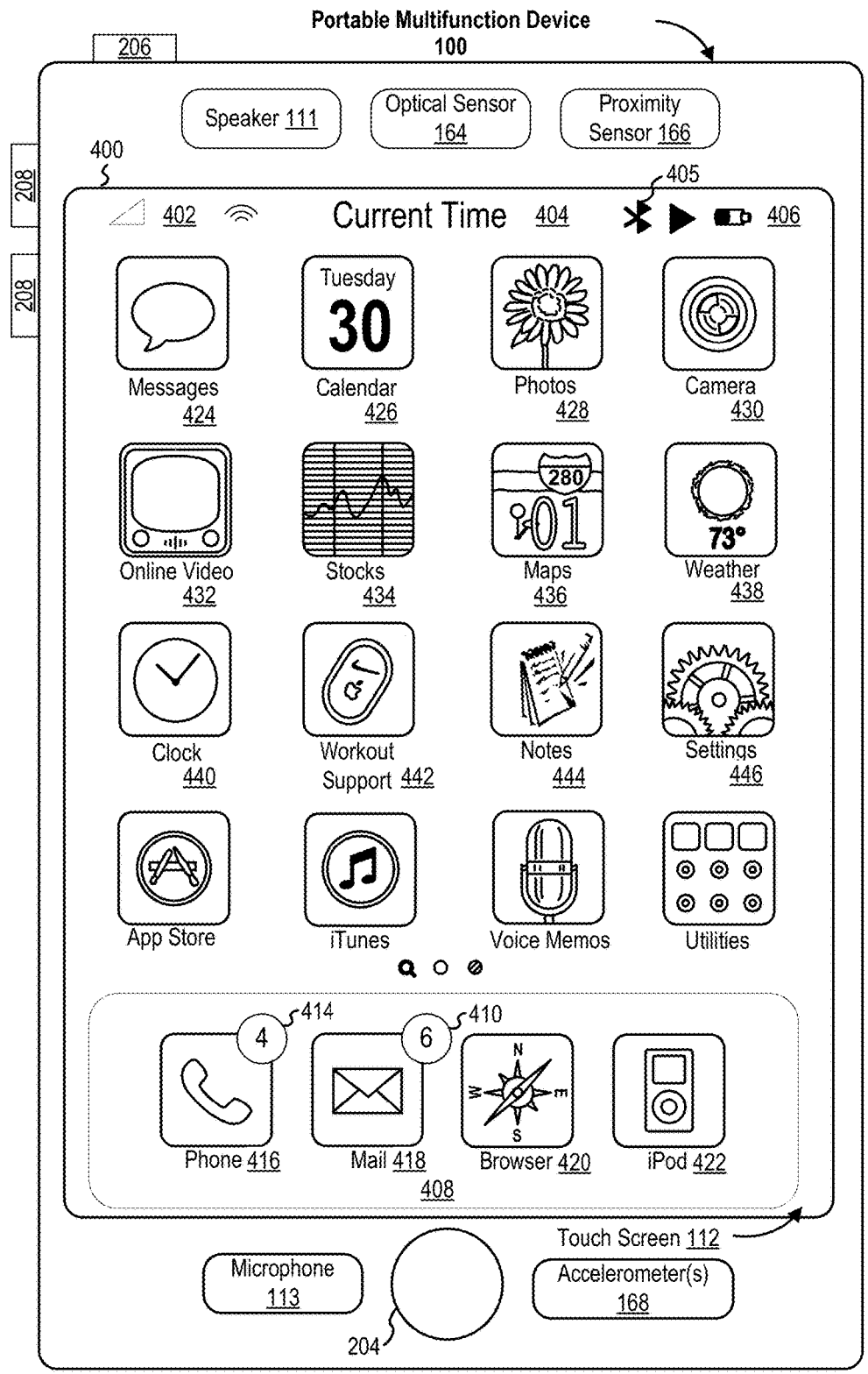
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 may optionally be labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
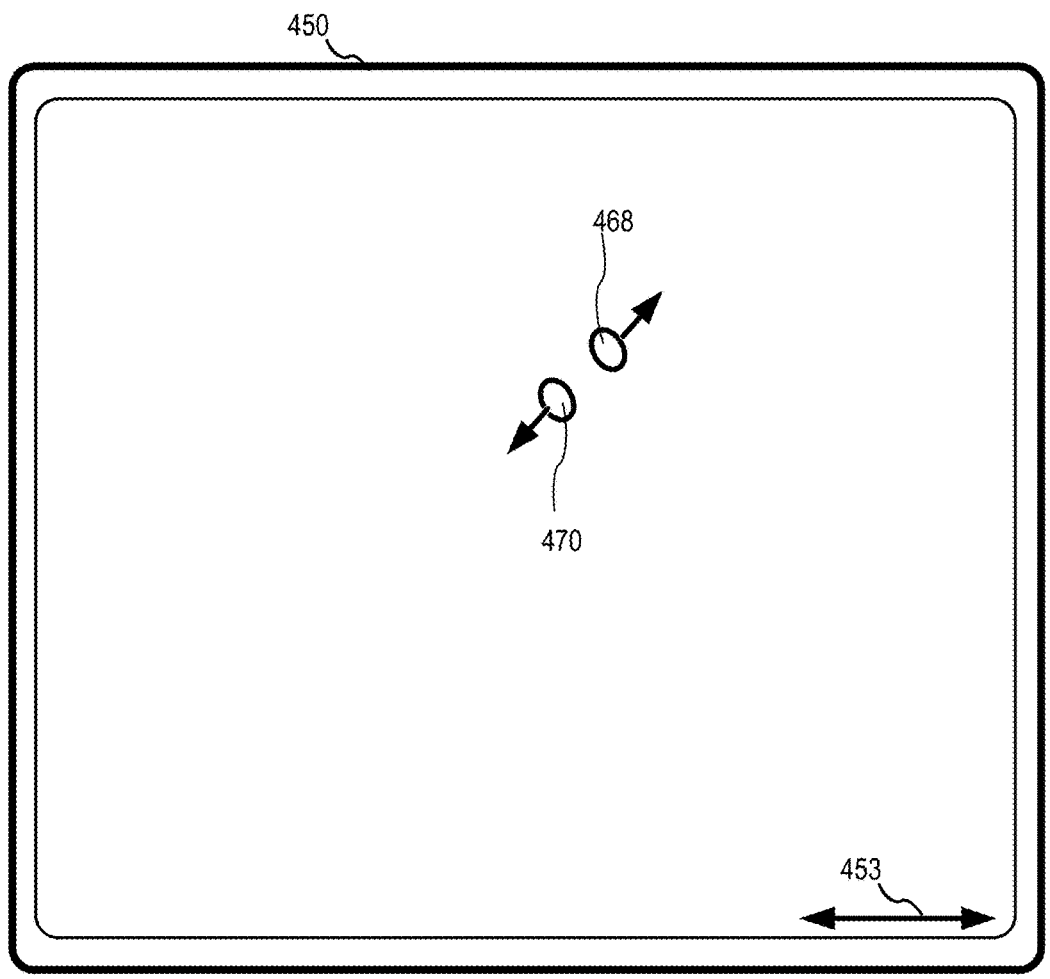
FIG. 4B illustrates an exemplary user interface for a multifunction device with a touch-sensitive surface that is separate from the display in accordance with some embodiments.
Figure 4B:
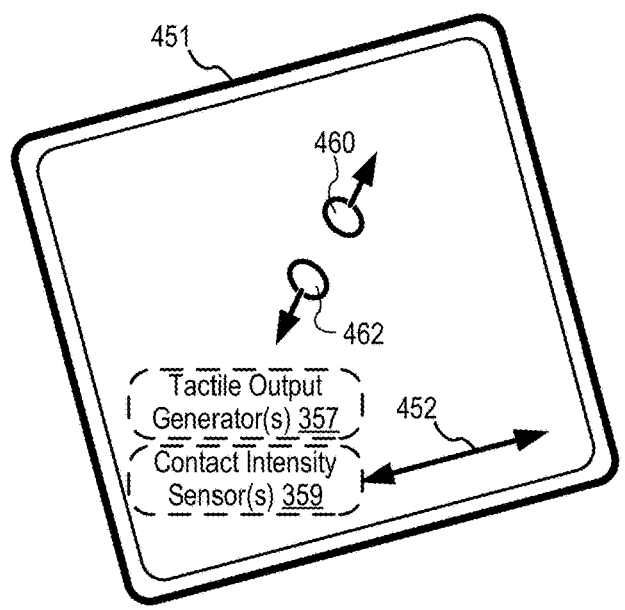

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
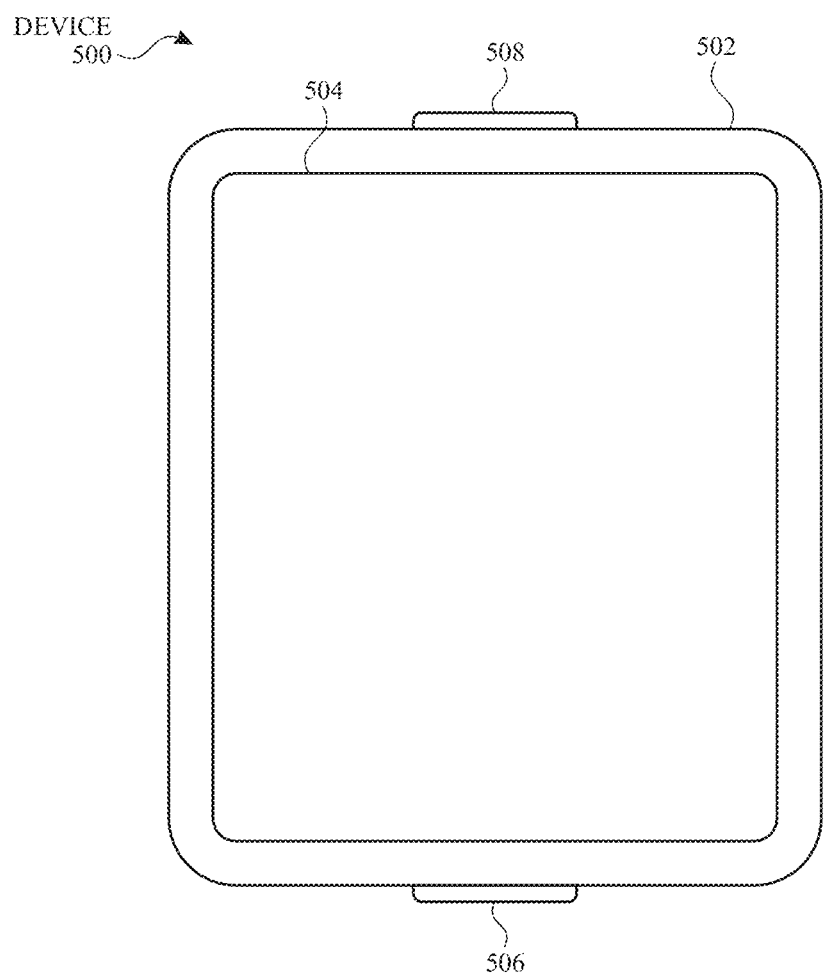
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) may have one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Techniques for detecting and processing touch intensity may be found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms may permit device 500 to be worn by a user.

Figure 5B:
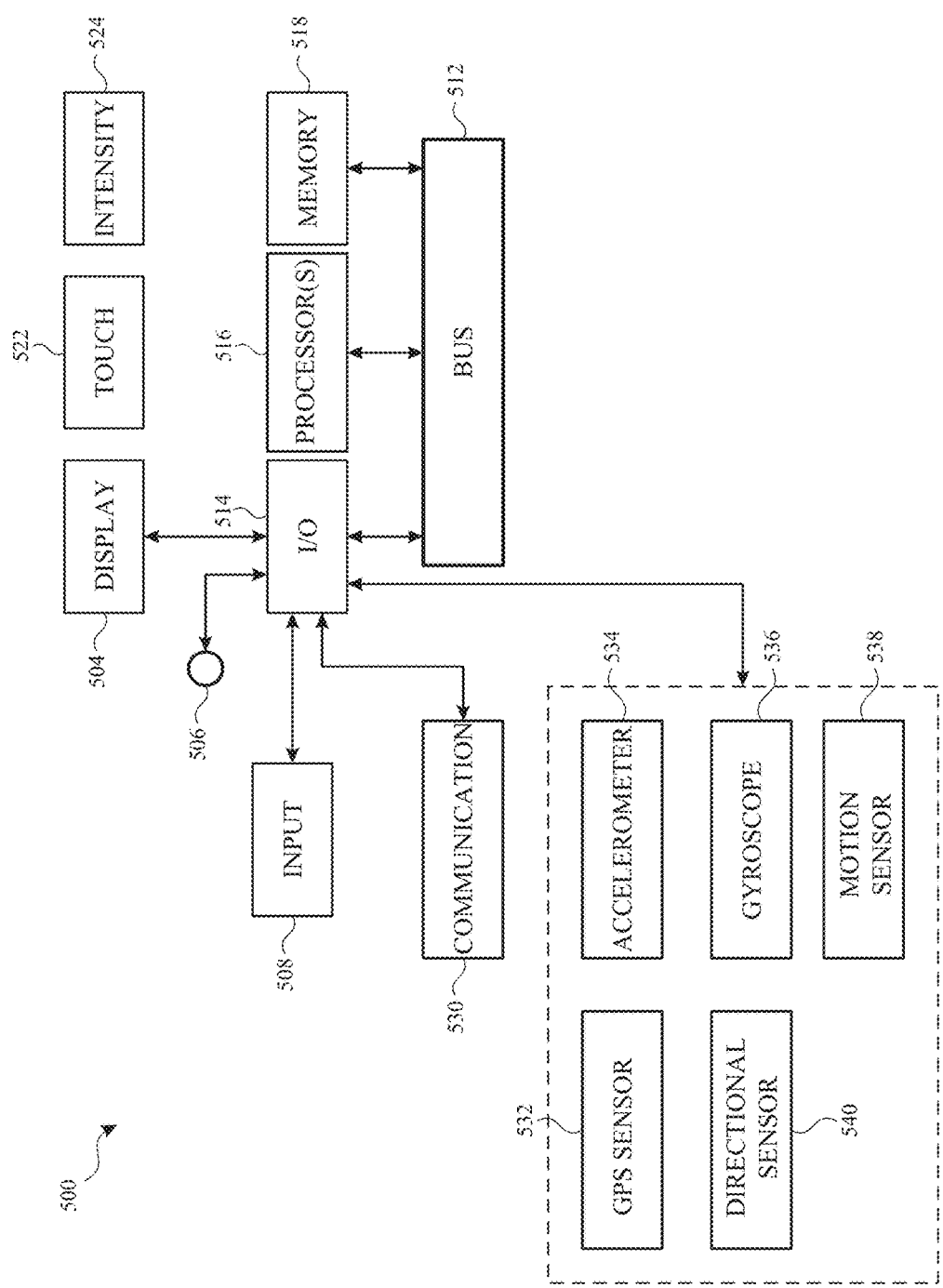
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, touch-intensity sensitive component 524. In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 may be a rotatable input device or a depressible and rotatable input device, for example. Input mechanism 508 may be a button, in some examples.

Input mechanism 508 may be a microphone, in some examples. Personal electronic device 500 can include various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can be a non-transitory computer-readable storage medium, for storing computer-executable instructions, which, when executed by one or more computer processors 516, for example, can cause the computer processors to perform the techniques described above, including processes 700 and 1000 (FIGS. 7 and 10A-10B). The computer-executable instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. For purposes of this document, a "non-transitory computer-readable storage medium" can be any medium that can tangibly contain or store computer-executable instructions for use by or in connection with the instruction execution system, apparatus, or device. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that may be displayed on the display screen of devices 100, 300, and/or 500 (FIGS. 1, 3, and 5). For example, an image (e.g., icon), a button, and text (e.g., hyperlink) may each constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location, at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface may be characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

Attention is now directed towards embodiments of user interfaces and associated processes that may be implemented on an electronic device, such as portable multifunction device 100, device 300, or device 500.

FIGS. 6A-6I illustrate exemplary user interfaces and techniques for displaying content on a reduced-size user interface, in accordance with some embodiments. The user interfaces in these figures are used to illustrate the processes described below, including the processes in FIG. 7.

Figure 6A:
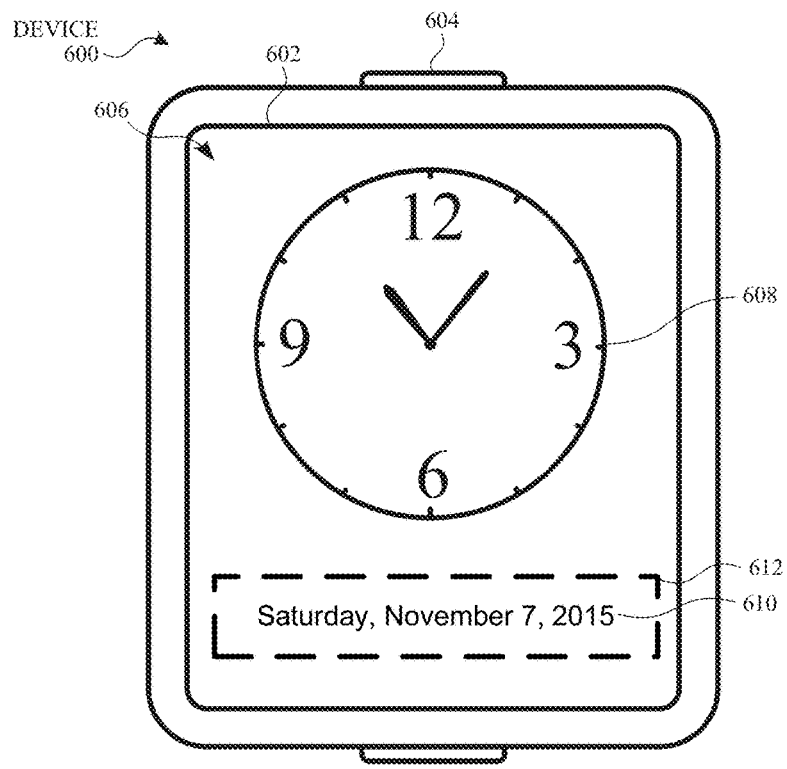
FIGS. 6A and 6F-6I illustrate exemplary user interfaces in accordance with some embodiments.
Figure 7:
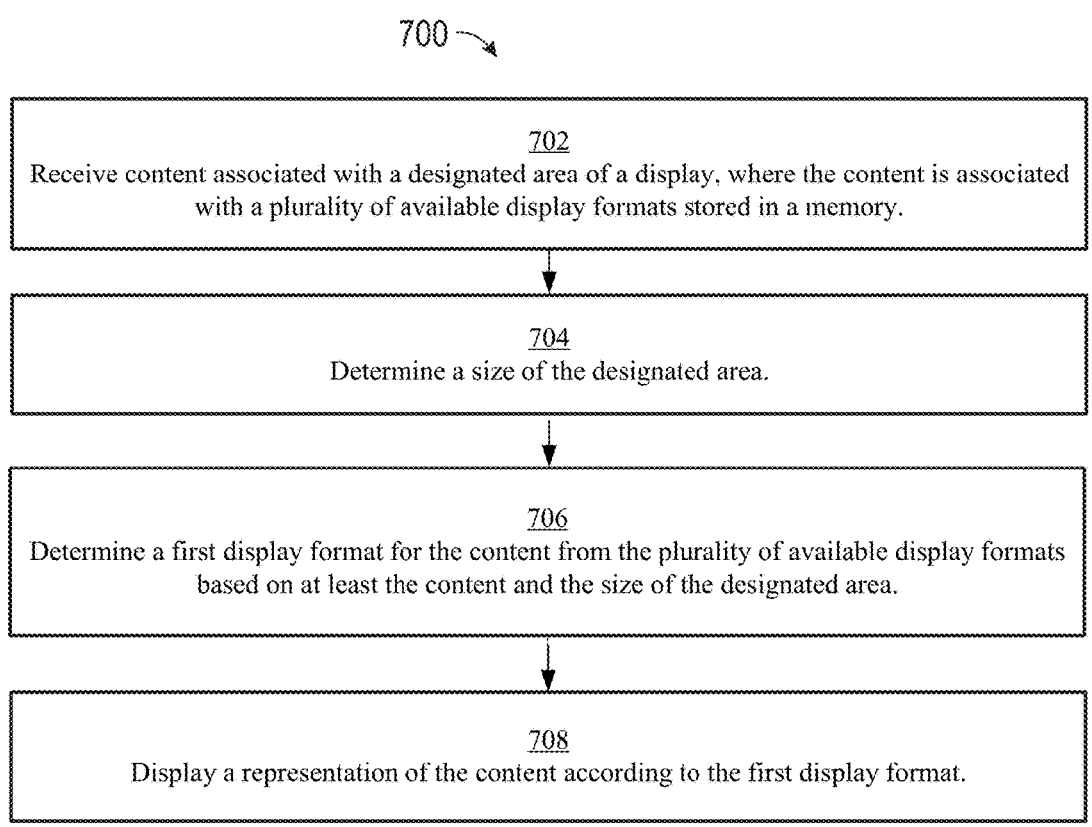
FIG. 7 is a flow diagram illustrating a method for operating an electronic device in accordance with some embodiments.

FIG. 6A illustrates an exemplary electronic device 600 including a display 602 and rotatable input mechanism 604. In some embodiments, device 600 is portable multifunction device 100, device 300, or device 500. In FIG. 6A, graphical interface 606 is displayed on display 602. Graphical user interface 606 represents a watch face that includes a graphical interface object 608 indicating the time and a representation of content 610. In some embodiments, content 610 is at least part of data representing a watch face complication. As used here, consistent with its accepted meaning in the art, a complication refers to any watch or clock face feature other than those used to indicate the hours and minutes of a time (e.g., clock hands or hour/minute indications). In the embodiment depicted in FIG. 6A, content 610 includes date information, including the day of the week, month, day of the month, and year.

Although the following examples are described with reference to a watch face 602 of electronic device 600, it should be recognized, that the techniques for displaying content described herein may be applied to various other graphical display interfaces and applications provided on an electronic device (e.g., in a graphical user interface of an application or a home screen for an operating system).

In some embodiments, device 600 receives content 610 from local memory or an application running on device 600. In some embodiments, device 600 receives content 610 from an application running on a remote device (e.g., an Internet server or a companion device connected to device 600 via, for example, a short-range communication link such as near-field communication (NFC) or Bluetooth).

Content 610 is associated with a designated area 612 on graphical interface 602 indicated by the dashed outline. In some embodiments, designated area 612 is at least a portion of a "style window". A "style window" can correspond to a part of a watch face that is designated to display a complication. In some embodiments, a user can configure a watch face by determining which data (e.g., by selecting a watch application) is to be displayed in a particular style window. Optionally, the content 610 associated with an area is designated by a user, as described in exemplary embodiments later on. In FIG. 6A, content 610 is displayed in a format in which the day of the week (Saturday) and the month (November) are completely spelled out without abbreviation.

Figure 6B:
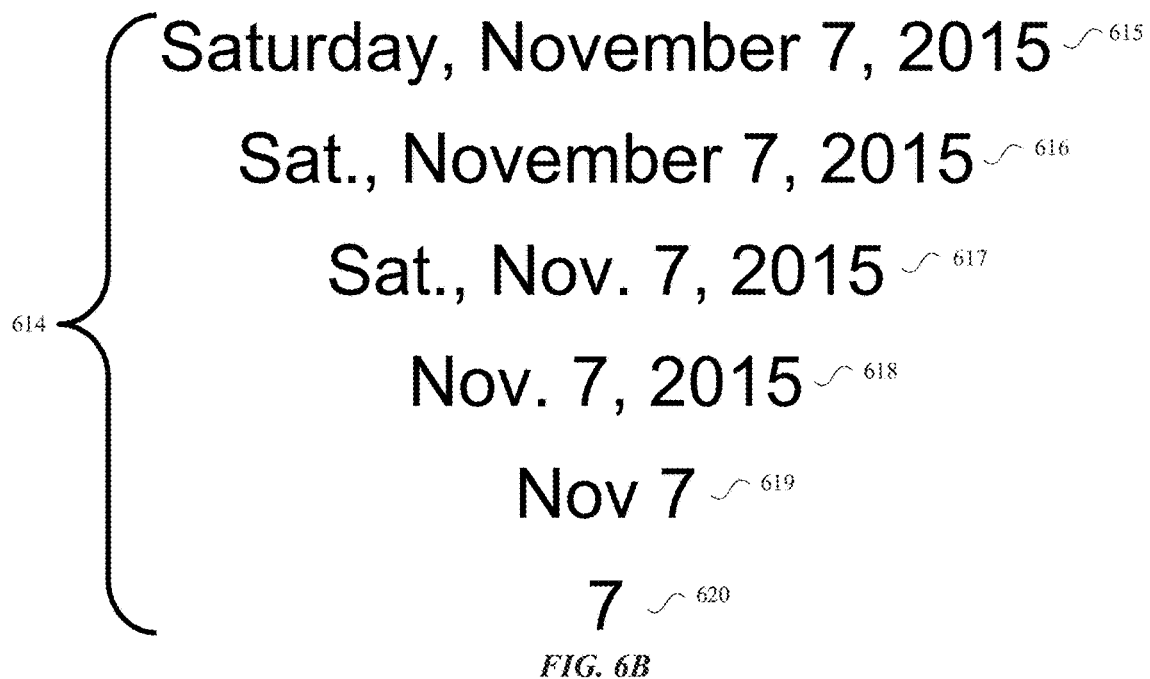

In some embodiments, content 610 is associated with a plurality of available display formats. In some embodiments, the plurality of available display formats is pre-defined and stored in the memory of device 600. FIG. 6B illustrates an exemplary set 614 of available display formats 615-620 for content 610. As can be seen, set 614 includes six available display formats that include various amounts of content 610 with various amounts of abbreviation. For example, display format 619 indicates the month and day of the month, whereas display format 620 only indicated the day of the month. In some embodiments, the available display formats associated with content 610 is a defined set.

In some embodiments, device 600 determines the type of data ("data type") represented by content 610, determines a set of available display formats based on the data type, and associates content 610 with the determined set. For example, device 600 optionally determines that content 610 includes date information, determines a set of available display formats for date information (e.g., set 614 including date display formats 615-620), and associates the set with content 610. In some embodiments, a data type and/or set of available display formats associated with content 610 are pre-determined, pre-loaded, and simply received from memory. Exemplary data types include, but are not limited to, a point in time (e.g., a date, a time, or a date and time (a "date/time")), a duration (e.g., a start date/time and an end date/time), an offset (e.g., a countdown to a point in time expressed in, for example, years, months, weeks, days, hours, minutes, seconds, or some combination thereof), and a decimal number. Set 614 is an exemplary set of available display formats for a point in time; FIG. 6C depicts an exemplary set of available display formats for a duration; FIG. 6D depicts an exemplary set of available display formats for an offset; and FIG. 6E depicts an exemplary set of available display formats for a decimal number.

Device 600 determines a particular display format from the set of display formats 615-620 to use for displaying content 610. In some embodiments, device 600 determines or selects the particular display format based at least in part on content 610 itself (e.g., the information represented by content 610) and/or the size of the area in which content 610 is to be displayed (e.g., designated area 612). In some embodiments, aspects of content 610, including the data type represented by content 610 or the information represented by content 610 (e.g., the specific date), are used to determine the particular display format. In some embodiments, device 600 either determines the size of designated area 612 or receives the size from local or remote memory. Optionally, device 600 determines the size of designated area 612 based on the physical dimensions of display 602. The size of designated area 612 may be represented in terms of, for example, an absolute size (e.g., 2 cm), a number of pixels on display 602, or a fraction of a physical dimension of display 602 (e.g., one half the width of display 602). Once the particular display format is determined, device 600 displays a representation of content 610 according to the determined display format.

In some embodiments, device 600 determines the display format with the least amount of abbreviation that does not exceed the size of designated area 612. That is, device determines the largest display format that will completely fit in designated area 612. In this way, device 600 may automatically maximize the amount of content 610 that is displayed.

In some embodiments, display formats 615-620 correspond to display sizes of content 610 formatted according to the respective display format. That is, the display size of a particular display format is the amount of space occupied by content 610 when displayed according to the particular display format.

In FIG. 6B, for example, the horizontal extents of display formats 615-620 decrease from the top of the list to the bottom of the list. It should be recognized, however, that in some embodiments the size is measured in the vertical direction, horizontal direction, diagonal direction, or some combination thereof.

It should also be recognized that the display size of a display format can depend on the information represented by content 610. Date information of a point in time, for example, can include the specific date. Accordingly, a single display format including the day of the week, month, day of the month, and year can have different display sizes depending on the actual date. For example, Saturday, Nov. 7, 2015 is larger than Friday, May 1, 2015.

In some embodiments, the display size of a display format can depend on a display style associated with content 610. Exemplary aspects of a display style for text include font (e.g., Times New Roman) and font size (e.g., 12 pt.). A display style can be associated directly with content 610 or with a display format (e.g., display formats 615-620) associated with content 610. Accordingly, a display format can have different display sizes depending on the style associated with content 610 or the display format in which it is displayed. For the purposes of this disclosure, display style includes aspects affecting aesthetic appearance, but does not include the amount of abbreviation or structure of displayed content, which are considered aspects of the display format.

In some embodiments, device 600 may determine the display size for each display format 615-620 based on the information represented by content 610 and a display style associated with content 610. Similar to the size of designated area 612, in some embodiments, device 600 determines the display size of a display format based on the physical dimensions of display 602. A display size may be represented in terms of, for example, an absolute size (e.g., 2 cm), a number of pixels on display 602, or a fraction of a physical dimension of display 602 (e.g., one half the width of display 602).

In some embodiments, determining the particular display format of content 610 includes determining an optimized display format. As used here, the optimized display format is the display format of set 614 having the largest display size that does not exceed the size of the designated area 612. The particular display format is then determined to be the optimized display format such that the content is displayed according to the optimized display format.

Figure 6F:
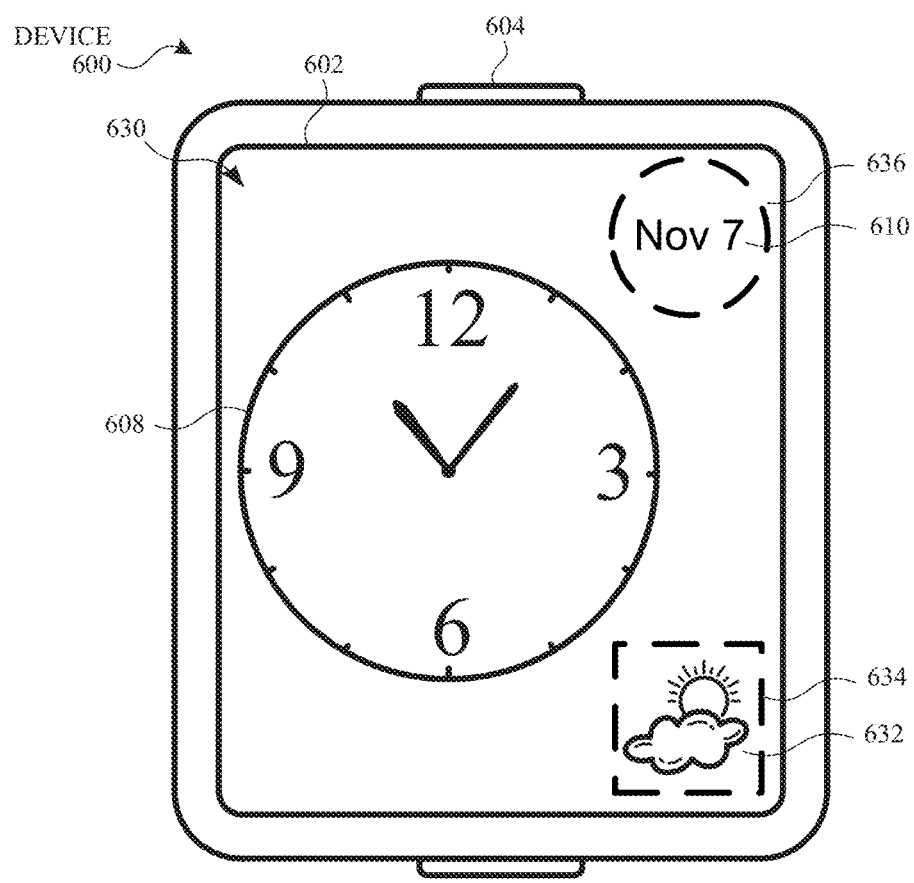

FIG. 6F illustrates an exemplary graphical interface in which content 610 is displayed according to an optimal display format. In FIG. 6F, device 600 displays graphical interface 630 representing a watch face that includes graphical interface object 608 indicating the time, a representation 632 indicating the current weather in a designated area 634, and a designated area 636 for content 610. Compared to designated area 612 in graphical interface 604 depicted in FIG. 6A, designated area 636 is circular and has a smaller horizontal extent. Based on the characteristics of content 610 and the size of designated area 636, device 600 determines the optimal display format from set 614. Notably, display formats 615-618 are too big to fit in designated area 636. Display format 619, November 7, is the largest format that will completely fit. Display format 620, which only includes the day of the month, 7, also completely fits in designated area 636 but does not maximize the amount of information displayed (e.g., it does not include an indication of the month, November).

In some embodiments, the display format is determined based on the information represented by content 610. As noted above, the information of date data, for example, can include the specific date, which can affect the size of a display format.

Figure 6G:
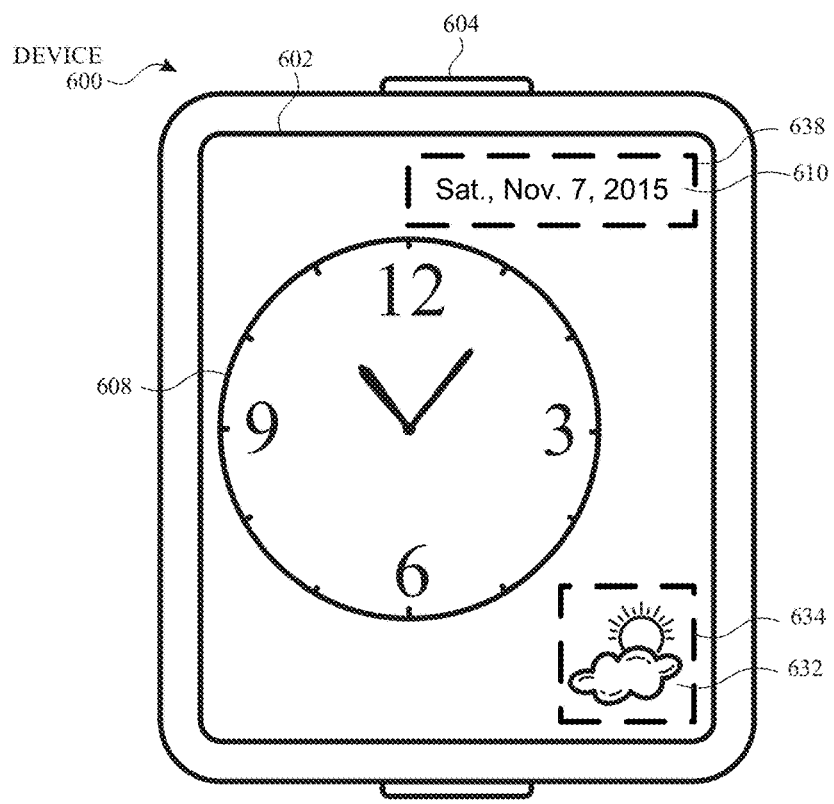
Figure 6H:
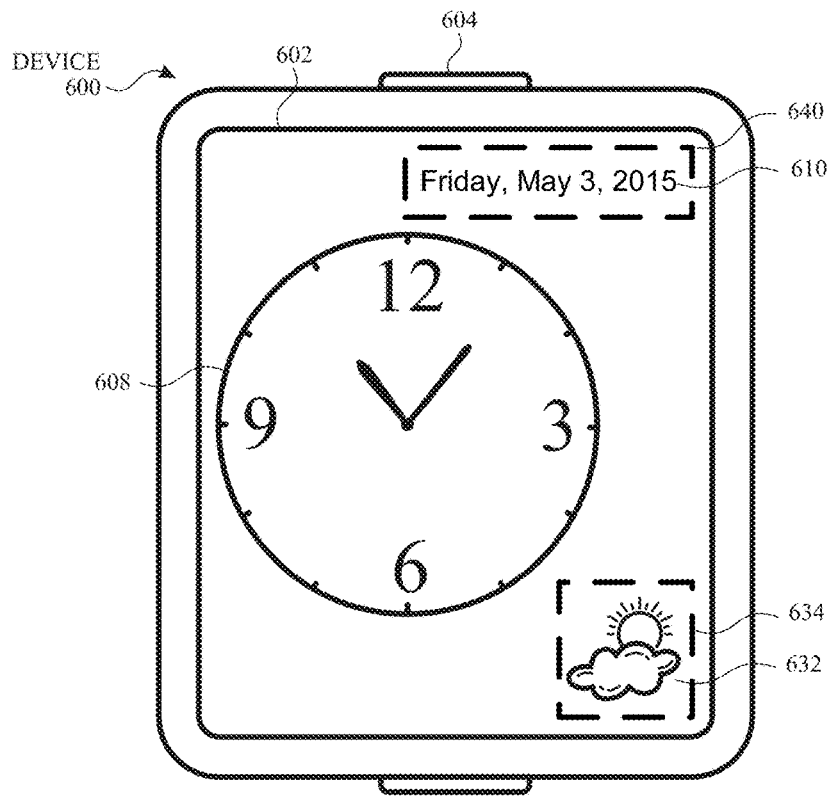

FIGS. 6G-6H illustrate an example in which different dates result in use of different display formats. FIG. 6G depicts an exemplary graphical interface in which content 610 is displayed in designated area 638. As shown, display format 617 (abbreviated day, abbreviated month, day of the month, and year) is the largest format that completely fits in designated area 638. In FIG. 6G, content 610 includes the same amount of information as content 610 (i.e., day of the week, month, day of the month, and year) but because of the particular date, a different display format (e.g., display format 615, without any abbreviation) is used.

As noted above, a display style associated with the content can affect the size of a display format. Accordingly, in some embodiments, the display format is determined based at least in part on the display style associated with the content. For example, content associated with larger font may result in use of a display format with more abbreviation (e.g., Sat. instead of Saturday) or less content (e.g., "November 7" instead of "Nov. 7, 2015").

In some embodiments, a plurality of available display formats forms a hierarchy ranked according to display size. Set 614 of available display formats 615-620 for content 610, for example, forms a hierarch ranked in descending order from top to bottom according to display size. The largest display format 615 (e.g., most amount of information and least amount of abbreviation) is at the top of the hierarchy, and the smallest display format 620 (e.g., least amount of information and greatest amount of abbreviation) is at the bottom.

In some embodiments, only a portion of the display formats in set 614 are available. Optionally, only the display formats at or above a predetermined lowest threshold level of the hierarchy are available. In set 614, for example, the lowest threshold level sets a minimum amount of content included in the display format and/or the greatest amount of abbreviation that is permitted. Optionally, only the display formats at or below a predetermined highest threshold level of the hierarchy are available. In set 614, for example, the highest threshold level sets a maximum amount of content included in the display format and/or the least amount of abbreviation that is permitted. Optionally, only the display formats at or between a predetermined highest threshold level and a predetermined lowest threshold level of the hierarchy are available.

In some embodiments, the display format corresponding to a predetermined highest threshold level (e.g., maximum amount of content and/or least amount of abbreviation) is selected even though a display format higher in the hierarchy (e.g., a longer format) fits in the designated area for the content. In some embodiments, device 600 determines whether the optimized display format (e.g., the largest format that fits in a designated area) is above a predetermined highest allowable display format in the hierarchy (e.g., a predetermined highest threshold level). In accordance with a determination that the optimized display format is above the highest allowable display format in the hierarchy, device 600 determines the particular display format to be the highest allowable display format.

In some embodiments, the display format corresponding to a predetermined lowest threshold level (e.g., minimum amount of content and/or greatest amount of abbreviation) is selected even though it does not completely fit in the designated area (e.g., a display format lower in the hierarchy fits is required for the content to fit in the designated area). In some embodiments, device 600 determines whether the optimized display format (e.g., the largest format that fits in the designated area) is below a predetermined lowest allowable display format in the hierarchy (e.g., a predetermined lowest threshold level). In accordance with a determination that the optimized display format is below the lowest allowable display format in the hierarchy, device 600 determines the particular display format to be the lowest allowable display format.

Accordingly, in some embodiments, it is possible that the lowest allowable display format does not fit in the designated area. One potential option for dealing with this issue is to truncate the display of content 610 to the size of the designated area. In some embodiments, device 600 determines whether the display size corresponding to the determined display format exceeds the size of the designated area. In accordance with a determination that the display size corresponding to the selected display format exceeds the size of the designated area, the displayed representation of the content is truncated to the size of the designated area (e.g., the portion on the right side of the displayed format that does not fit in the designated area is not displayed).

In some embodiments, the designated area is included as part of a layout of a complication, which may include more than one area designated for the display of content. For example, in some embodiments, a watch face complication includes a layout with one or more designated areas for content. Optionally, the complication includes at least two designated areas, where the first designated areas is associated with first content and the second designated area is associated with different content. In some embodiments, the layout is defined by a "template". "Templates" can be defined for "style windows." A style window can have one or more templates, with each template specifying data to be displayed in a different manner. Different data can also be displayed, or the same data, but displayed in a different manner.

Figure 6I:
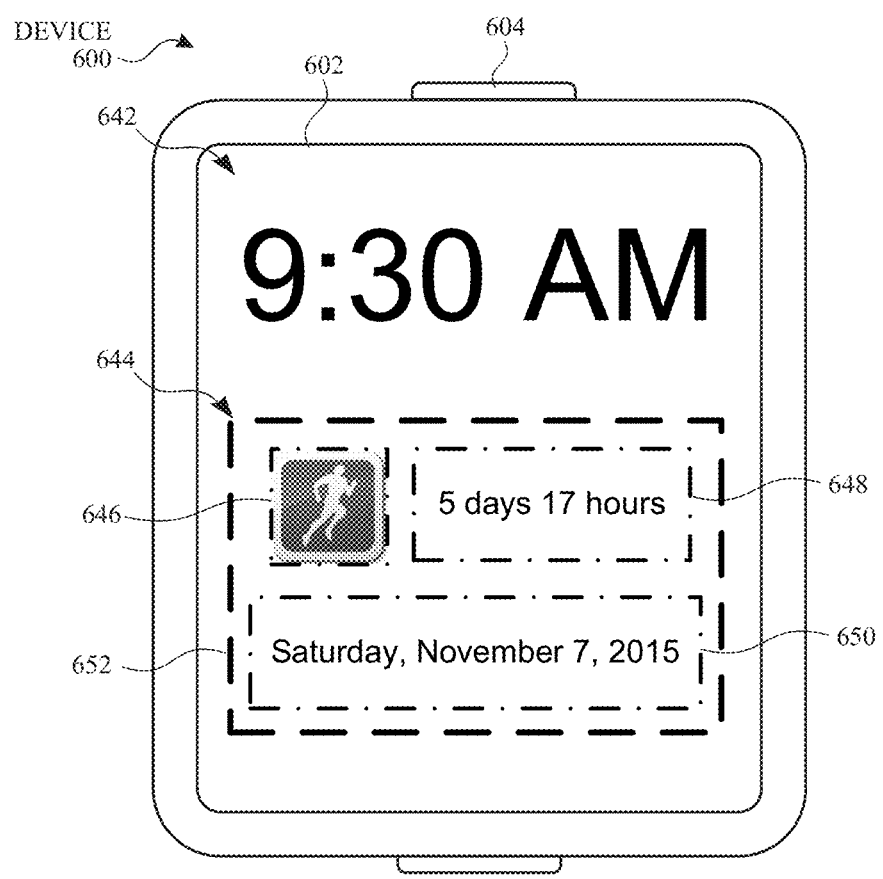

FIG. 6I illustrates an exemplary watch face 642 including complication 644 associated generally with an upcoming event (e.g., a marathon or other running event). Complication 644 is located at complication area 652 and has a layout with three distinct designated areas: area 646 includes an image representative of the upcoming event, area 648 includes a countdown until the event, and area 650 includes the date of the event. In some embodiments, the display format for the content in one or more of the designated areas is determined in accordance with the techniques described above.

FIG. 7 is a flow diagram illustrating a method for displaying content on a reduced-size user interface using an electronic device in accordance with some embodiments. Method 700 is performed at a device (e.g., 100, 300, 500, 600) with a display. Some operations in method 700 may be combined, the order of some operations may be changed, and some operations may be omitted.

As described below, method 700 provides an efficient way for displaying content on a reduced-size user interface. The method automatically adjusts the format of content in a designated area of a display according to an established format, thereby creating a more efficient user interface that provides information in a more consistent and comprehensible manner. Accordingly, method 700 may reduce the cognitive burden on a user and produce a more efficient human-machine interface. For battery-operated computing devices, the method may conserve power and increase the time between battery charges.

At block 702, the device receives content (e.g., content 610) associated with a designated area (e.g., designated area 612) of the display, where the content is associated with a plurality of available display formats (e.g., display formats 615-620) stored in the memory. At block 704, the device determines a size of the designated area. At block 706, the device determines a first display format for the content from the plurality of available display formats based on at least the content and the size of the designated area. At block 708, the device displays a representation of the content according to the first display format.

Note that details of the processes described below with respect to method 1000 (e.g., FIGS. 10A-10B) are also applicable in an analogous manner to method 700. For example, method 700 may include one or more of the characteristics of the various methods described below with reference to method 10000.

Figure 8:
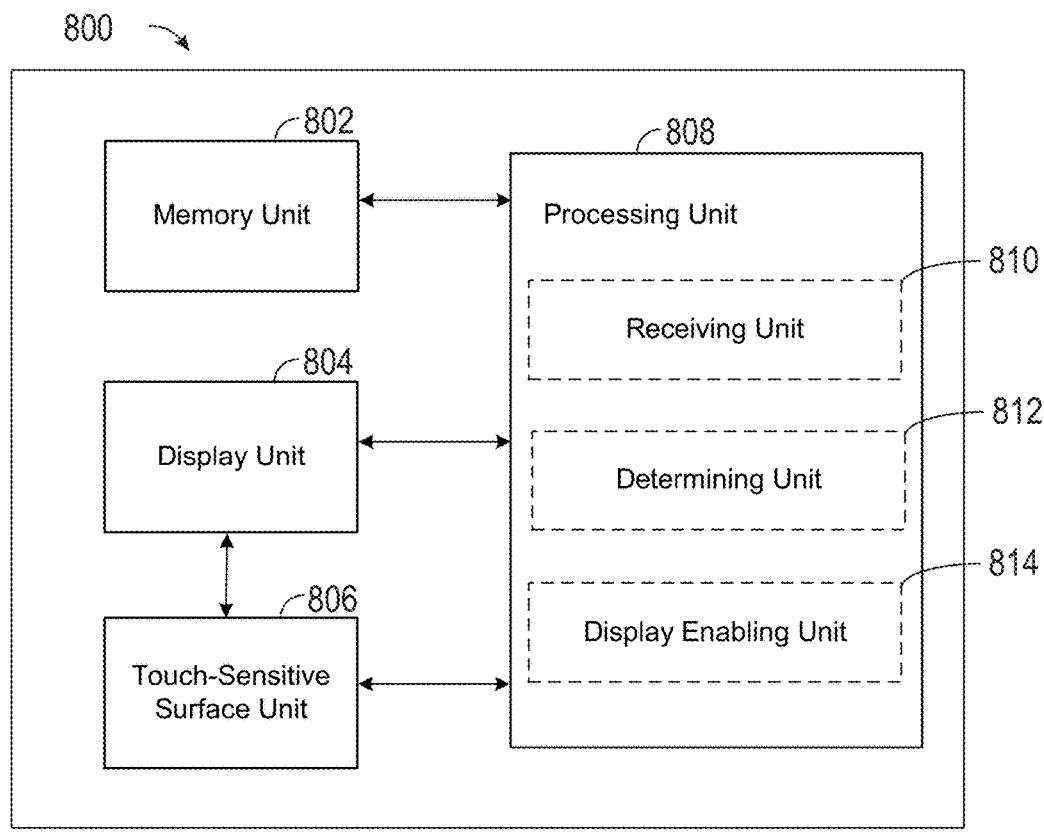
FIG. 8 shows an exemplary functional block diagram of an electronic device in accordance with some embodiments.

In accordance with some embodiments, FIG. 8 shows an exemplary functional block diagram of an electronic device 800 configured in accordance with the principles of the various described embodiments. In accordance with some embodiments, the functional blocks of electronic device 800 are configured to perform the techniques described above. The functional blocks of the device 800 are, optionally, implemented by hardware, software, or a combination of hardware and software to carry out the principles of the various described examples. It is understood by persons of skill in the art that the functional blocks described in FIG. 8 are, optionally, combined or separated into sub-blocks to implement the principles of the various described examples. Therefore, the description herein optionally supports any possible combination or separation or further definition of the functional blocks described herein.

As shown in FIG. 8, an electronic device 800 includes a memory unit 802, a display unit 804 configured to display a graphic user interface, optionally, a touch-sensitive surface unit 806 configured to receive contacts, and a processing unit 808 coupled to the memory unit 802, display unit 804, and, optionally, the touch-sensitive surface unit 806. In some embodiments, the processing unit 808 includes a receiving unit 810, a determining unit 812, and a display enabling unit 814.

The processing unit 808 is configured to receive (e.g., with receiving unit 810) content associated with a designated area of the display, where the content is associated with a plurality of available display formats stored in memory unit 802. Processing unit 808 is further configured to determine (e.g., with determining unit 812) a size of the designated area, determine (e.g., with determining unit 812) a first display format for the content from the plurality of available display formats based on at least the content and the size of the designated area, and enable (e.g., with display enabling unit 814) display of a representation of the content according to the first display format.

In some embodiments, the content is associated with a display style and determining the first display format is further based on the display style associated with the content. In some embodiments, the display style includes a font associated with the content.

In some embodiments, each display format of the plurality of available display formats corresponds to a display size of the content formatted according to the respective display format and determining the first display format of the content from the plurality of available display formats comprises: determining (e.g., with determining unit 812) an optimized display format, where the optimized display format is determined to be the display format of the plurality of available display formats that corresponds to the largest display size of the display sizes corresponding to the plurality of available display formats that does not exceed the size of the designated area; and determining (e.g., with determining unit 812) the first display format to be the optimized display format.

In some embodiments, the plurality of available display formats forms a hierarchy ranked according to the display sizes corresponding to the display formats of the plurality of available display formats and determining the first display format of the content from the plurality of available display formats further comprises: determining (e.g., with determining unit 812) whether the optimized display format is below a predetermined lowest allowable display format in the hierarchy; and in accordance with a determination that the optimized display format is below the lowest allowable display format in the hierarchy, determining (e.g., with determining unit 812) the first display format to be the lowest allowable display format.

In some embodiments, determining the first display format of the content from the plurality of available display formats further comprises: determining (e.g., with determining unit 812) whether the optimized display format is above a predetermined highest allowable display format in the hierarchy; and in accordance with a determination that the optimized display format is above the highest allowable display format in the hierarchy, determining (e.g., with determining unit 812) the first display format to be the lowest allowable display format.

In some embodiments, the processing unit 808 is further configured to determine (e.g., with determining unit 812) whether the display size corresponding to the first display format exceeds the size of the designated area and, in accordance with a determination that the display size corresponding to the first display format exceeds the size of the designated area, truncate (e.g., with display enabling unit 814) the representation of the content to the size of the designated area.

In some embodiments, the plurality of available display formats associated with the content is a defined set. In some embodiments, the content represents a point in time, a duration, an offset, or a decimal number.

In some embodiments, the content is at least part of data representing a watch face complication. In some embodiments, the complication includes a layout with one or more designated areas including the designated area associated with the content. In some embodiments, the data representing the complication includes second content associated with a second designated area of the one or more designated areas, where the second designated area is distinct from the designated area associated with the content.

The operations described above with reference to FIG. 7 are, optionally, implemented by components depicted in FIGS. 1A-1B or FIG. 8. For example, receiving operation 702, determining operations 704 and 706, and displaying operation 708 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 9E:
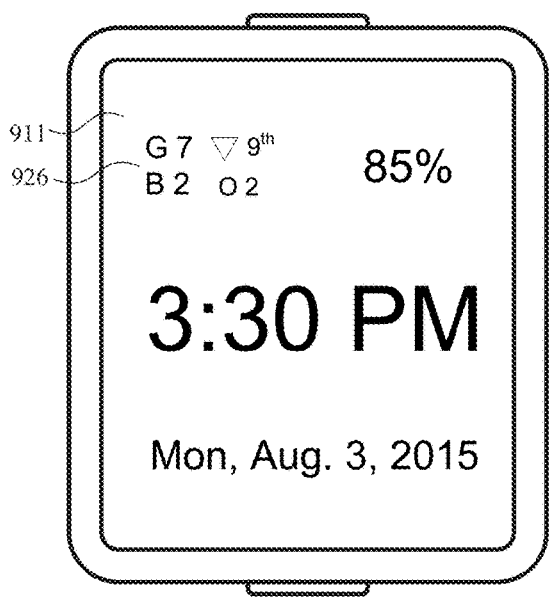

FIGS. 9A-9G illustrate exemplary techniques for displaying a complication provided by an application. FIG. 9A depicts electronic device 900 with display 902 and rotatable input mechanism 904. User interface 906 representing a clock face is displayed on display 902. The face includes an indication of the current time 908 and three complications: weather complication 910 displaying weather information, battery life complication 912 displaying the amount of battery life remaining for electronic device 900, and complication 914 displaying date information. Each complication is associated with an area of the display, referred to as a complication area.

In some embodiments, device 900 receives data representing one or more applications. The received data may include data representing one or more complications associated with the applications. The applications can include applications developed and/or made available by a party other than the manufacturer of device 900 (e.g., a third party). Exemplary applications include applications that provide information from Twitter, Facebook, or a sports information source (e.g., MLB.com or Yahoo Sports). In some embodiments, the data representing the application is received from an Internet server or a companion device connected to device 900 via, for example, a short-range communication link such as NFC or Bluetooth. In some embodiments, the data representing the application, including complications associated with the application, are received when a companion application is downloaded on a companion device in accordance with various techniques.

In response to receiving the data representing the application, device 900 can load the application into local memory and, optionally, store data representing one or more complications associated with the applications.

As indicated in FIG. 9A, device 900 receives an input. Specifically, device 900 receives a contact on the display caused by user touch 916. Although a touch input is shown in the illustrated embodiment, it should be recognized that various other methods or types of input may be possible. In some embodiments, electronic device 900 is configured to detect intensity of contacts and receiving the user input includes detecting a contact on the display 902, where the contact has a characteristic intensity.

In response to receiving input 916, device 900 enters a clock face edit mode. For embodiments in which device 900 is configured to detect intensity of contacts, device 900 optionally determines whether the characteristic intensity of the contact is above an intensity threshold and, in accordance with a determination that the characteristic intensity is above the intensity threshold, enters the clock face edit mode.

In some embodiments, device 900 indicates that it is operating in the clock face edit mode by visually distinguishing the clock face or editable elements of the clock face. FIG. 9B depicts an example of user interface screen 902 when device 900 is in clock face edit mode. In FIG. 9B, device 900 visually distinguishes that the complications 910, 912, and 914 are editable with a dashed outline around their corresponding complication areas 911, 913, and 915, respectively. Other techniques that indicate device 900 is in clock face edit mode include, for example, reducing the size of the displayed clock face, highlighting the clock face or an editable element (e.g., a complication), and changing a color of the clock face or an editable element.

As shown in FIG. 9B, while in the clock face edit mode, device 900 receives another input touch 918 corresponding to selection of complication area 915 at which complication 914 is displayed. In some embodiments, device 900 visually indicates a currently selectable complication area (e.g., by highlighting one of the complication areas) and provides functionality for a user to scroll to a different complication area by rotating the rotatable input mechanism 904. Optionally, the currently selectable complication area is selected by pressing rotatable input mechanism 904.

In response to receiving the input touch 918 corresponding to selection of complication area 915, device 900 displays one or more representations of at least one of the one or more complications associated with the loaded applications. Optionally, device 900 displays only representations of complications that are available for the selected complication area based on, for example, the type of complication, size of the complication, or other factors.

In FIG. 9C, device 900 displays representations 920, 921, and 922 of third party complications (e.g., complications associated with third party applications) that provide content (e.g., complication data) from Twitter, Facebook, and a sports information source, respectively. The list of complications available for the selected complication area may be obtained from the respective applications and displayed on device 900. Device 900 also displays representation 923 representing the date complication illustrated in FIGS. 9A-9B. Optionally, representations of first party complications associated with applications provided by the manufacturer of device 900 are also displayed.

In FIG. 9C, device 900 receives an input, touch input 924, corresponding to selection of representation 922 of the sports complication. In response, device 900 associates the sports complication with the selected complication area of the clock face 915.

After representation 922 is selected, device 900 displays the corresponding complication at the selected complication area 915. In some embodiments, device 900 exits the clock face edit mode in response to selection of the representation of the complication. In other embodiments, in response to selection of the representation of the complication, device 900 removes the display of the representations while remaining in the clock face edit mode, and then exits the clock face edit mode in response to further input (e.g., selection of a "Done" affordance, a contact with a characteristic intensity that exceeds a threshold intensity, or a press of the rotatable input mechanism 904).

FIG. 9D depicts a user interface 928 including content associated with the sports complication 926. Sports complication 926 includes content, at least a portion of which is displayed on device 900. The content associated with sports complication 926 in the illustrated example includes information of a baseball game.

In some embodiments, the content is received from a corresponding sports application loaded on device 900. In some embodiments, the sports application receives content from an Internet source (e.g., MLB.com) and/or the local device. In some embodiments, a companion application executes on a companion device, retrieves data from a server, and provides the data to device 900 for displaying a complication in accordance with various techniques. In some embodiments, device 900 requests an update to complication data from the companion application. In some embodiments, the companion application provides an update to complication data to device 900.

In some embodiments, device 900 determines a display format for the content included in the complication and displays, in the corresponding complication area, a representation of the content formatted according to the display format. It should be recognized that the display format can be determined at various times and is not necessarily determined upon or after selection of a complication. For example, in some embodiments, various display formats for a complication are pre-determined for complication areas of different sizes and layouts.

Returning to FIG. 9D, user interface 928 depicts a clock face including content associated with the sports complication 926 displayed in a first format. In FIG. 9D, the display format for the content of complication 926 includes the names of the teams, score, count on the batter, the inning, and number of outs.

In some embodiments, a display format for at least a portion of the content in a third party complication is determined in accordance with the techniques and methods described above with reference to FIGS. 6A-6I, and 7. In some embodiments, the content of the third party complication includes a point in time, a duration, an offset, and/or a decimal number, and device 900 determines a particular display format (e.g., an optimized display format) from a plurality of available display formats based on the data type, the information represented by the content, a display style, the size of the designated area for the content, or any combination thereof.

Figure 9F:
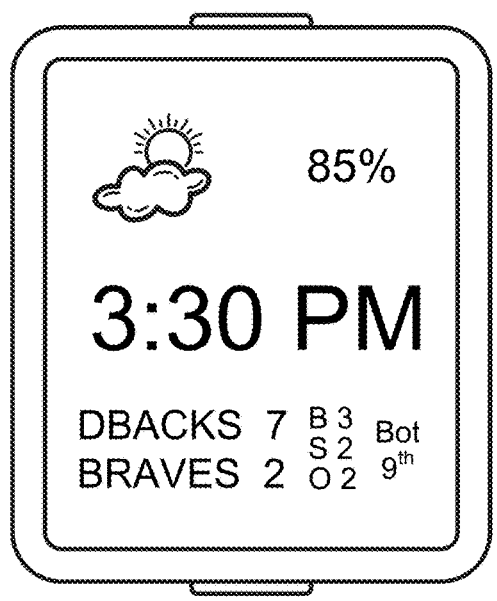
Figure 9G:
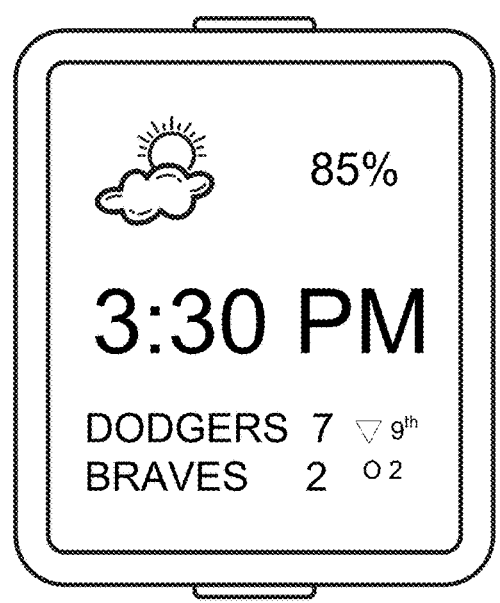

In some embodiments, different display formats are used for different complication areas. Optionally, the display format of the content is determined based at least in part on the size of the complication area. FIG. 9E depicts an example in which sports complication 926 is selected to be displayed at complication area 911. Compared to complication area 915, in complication area 911 sports complication 926 is displayed in a more compact format in which the team names are abbreviated with a single letter, the count on the batter is not included, and the inning indicator is reduced in size. In some embodiments, the display format is determined based on the information or data type of the complication. For example, a different display format may be used to indicate the score of a football game or status of a tennis match. Other examples include abbreviating the name of a team with a long name (e.g., abbreviating Diamondbacks to Dbacks as shown in FIG. 9F) or rearranging information and not including the count on the batter to accommodate a longer team name (as shown in FIG. 9G).

Figure 10A:
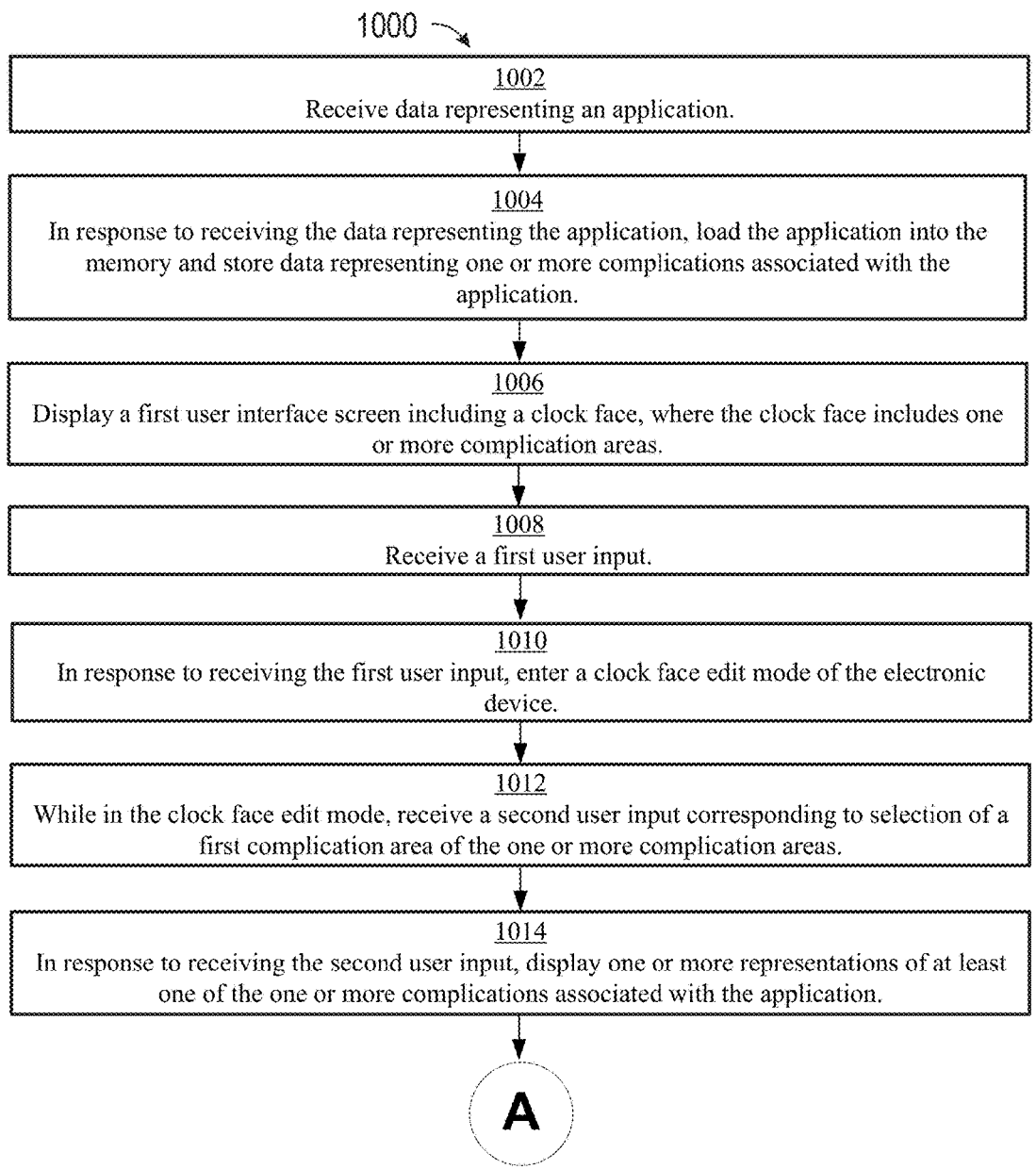
FIGS. 10A-10B are a flow diagram illustrating a method for operating an electronic device in accordance with some embodiments.
Figure 10B:
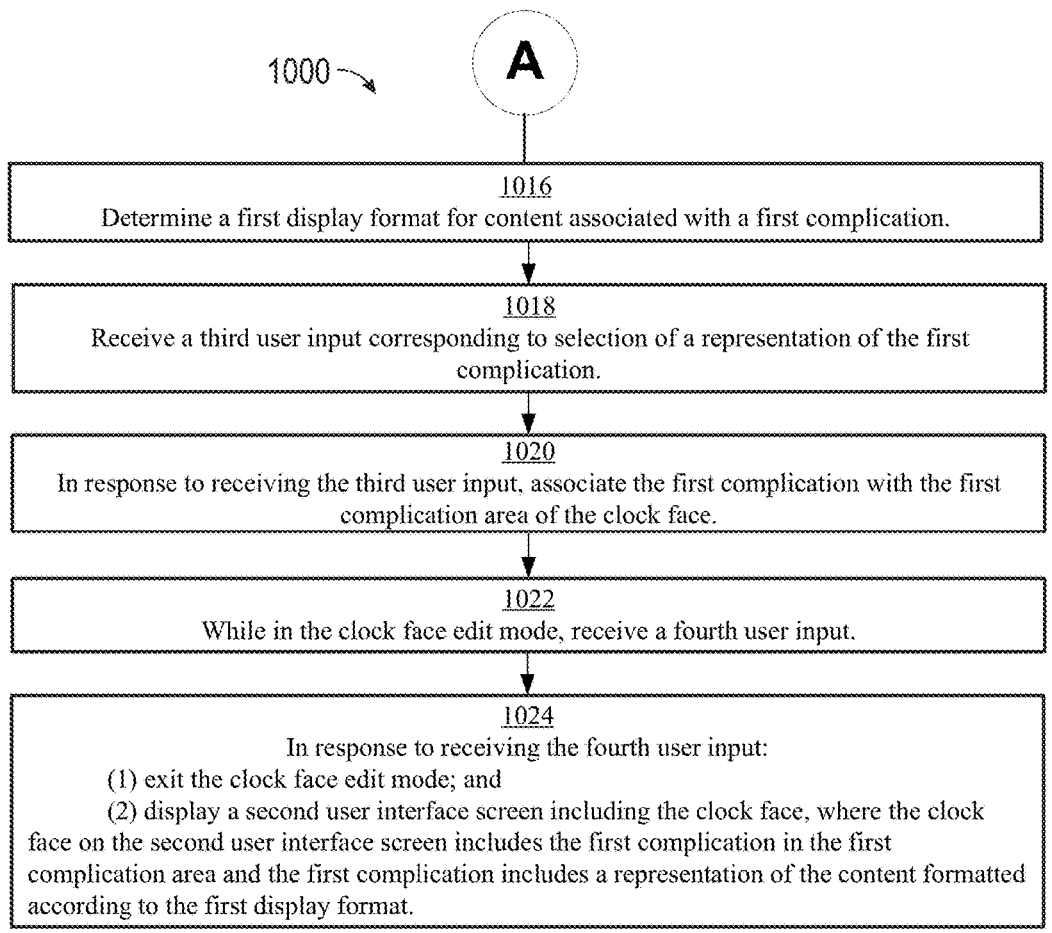

FIGS. 10A-10B depict a flow diagram illustrating a method for displaying a complication using an electronic device in accordance with some embodiments. Method 1000 is performed at a device (e.g., 100, 300, 500, 900) with a display. Some operations in method 1000 may be combined, the order of some operations may be changed, and some operations may be omitted.

As described below, method 1000 provides an efficient way for displaying complication content on a reduced-size user interface. The method automatically adjusts the format in which content is displayed based on the available space, thereby creating a more efficient user interface. For third party complications, method 1000 may display content in a more comprehensible format for complications that have not been specifically designed for a particular display area. Method 100 may also provide a more consistent visual appearance between complications from different sources, making it easier for a user to process the displayed information from each source. Accordingly, method 1000 may reduce the cognitive burden on a user and produce a more efficient human-machine interface. For battery-operated computing devices, the method may conserve power and increase the time between battery charges.

At block 1002, the device receives data representing an application.

At block 1004, in response to receiving the data representing the application, the device loads the application into memory and stores data representing one or more complications (e.g., complication 926) associated with the application.

At block 1006, the device displays a first user interface screen (e.g., user interface 906) including a clock face, where the clock face includes one or more complication areas (e.g., complication areas 911, 913, 915).

At block 1008, the device receives a first user input (e.g., touch 916).

At block 1010, in response to receiving the first user input, the device enters a clock face edit mode (e.g., FIG. 9B).

At block 1012, while in the clock face edit mode, the device receives a second user input (e.g., touch 918) corresponding to selection of a first complication area (e.g., complication area 915) of the one or more complication areas.

At block 1014, in response to receiving the second user input corresponding to selection of the first complication area, the device displays one or more representations of at least one of the one or more complications associated with the application (e.g., representations 920-922).

At block 1016, the device determines a first display format for the content associated with a first complication (e.g., complication 926).

At block 1018, the device receives a third user input (e.g., touch 924) corresponding to selection of a representation of the first complication (e.g., representation 922).

At block 1020, in response to receiving the third user input, the device associates the first complication with the first complication area of the clock face.

At block 1022, while in the clock face edit mode, the device receives a fourth user input (e.g., touch 924).

At block 1024, in response to receiving the fourth user input, the device exits the clock face edit mode and displays a second user interface screen (e.g., user interface 928) including the clock face, where the clock face on the second user interface screen includes the first complication in the first complication area and the first complication includes a representation of the content formatted according to the first display format (e.g., FIG. 9D).

Note that details of the processes described above with respect to method 700 (e.g., FIG. 7) are also applicable in an analogous manner to method 1000. For example, method 1000 may include one or more of the characteristics of the various methods described above with reference to method 700. For example, the device may determine a display format for content of the complication from a plurality of available display formats based on at least the content and the size of the area designated for the content, as described with reference to block 706. For brevity, these details are not repeated below.

Figure 11:
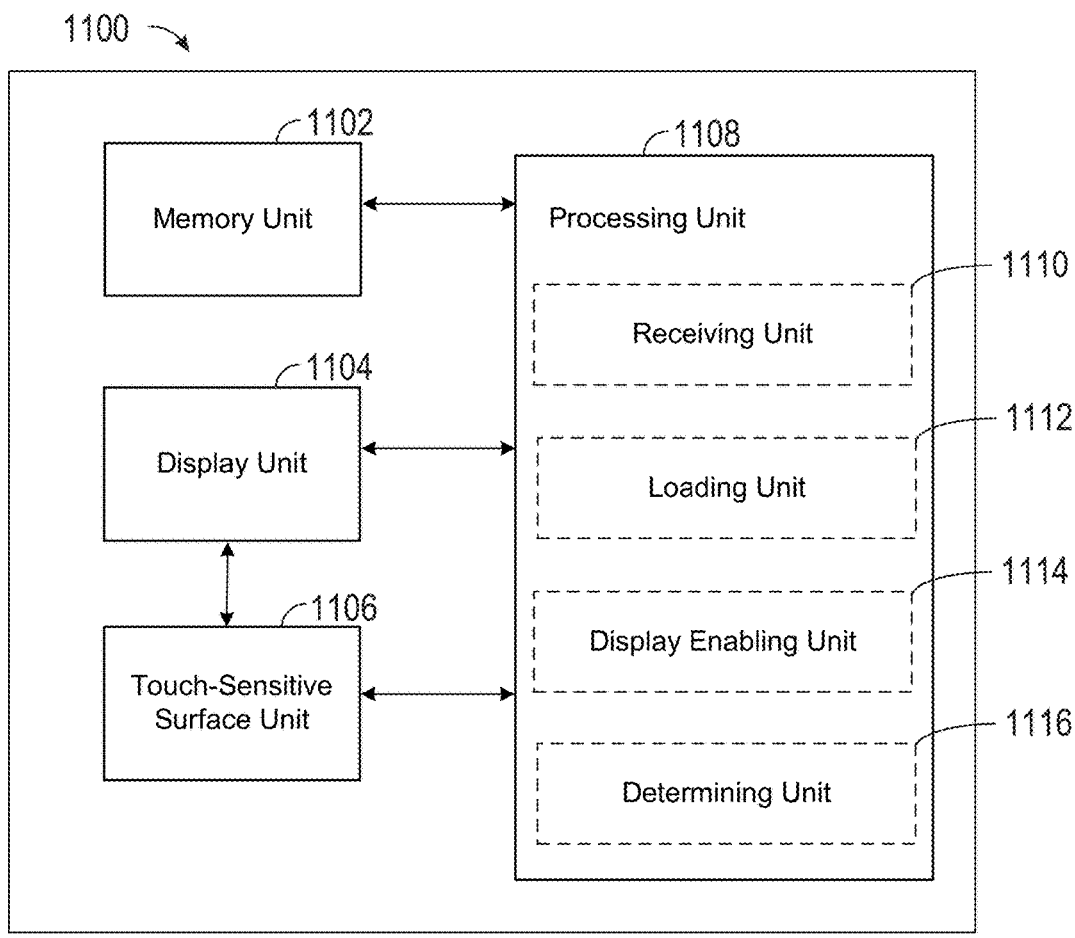
FIG. 11 shows an exemplary functional block diagram of an electronic device in accordance with some embodiments.

In accordance with some embodiments, FIG. 11 shows an exemplary functional block diagram of an electronic device 1100 configured in accordance with the principles of the various described embodiments. In accordance with some embodiments, the functional blocks of electronic device 1100 are configured to perform the techniques described above. The functional blocks of the device 1100 are, optionally, implemented by hardware, software, or a combination of hardware and software to carry out the principles of the various described examples. It is understood by persons of skill in the art that the functional blocks described in FIG. 11 are, optionally, combined or separated into sub-blocks to implement the principles of the various described examples. Therefore, the description herein optionally supports any possible combination or separation or further definition of the functional blocks described herein.

As shown in FIG. 11, an electronic device 1100 includes a memory unit 1102, a display unit 1104 configured to display a graphic user interface, optionally, a touch-sensitive surface unit 1106 configured to receive contacts, and a processing unit 1108 coupled to the memory unit 1102, display unit 1104 and, optionally, the touch-sensitive surface unit 1106. In some embodiments, the processing unit 1108 includes a receiving unit 1110, a loading unit 1112, a display enabling unit 1114, and a determining unit 1116.

The processing unit 1108 is configured to receive (e.g., with receiving unit 1110) data representing an application and, in response to receiving the data representing the application, load (e.g., with loading unit 1112) the application into the memory unit 1102, where loading the application into memory unit 1102 includes storing data representing one or more complications associated with the application. Processing unit 1108 is further configured to enable (e.g., with display enabling unit 1114) display of a first user interface screen including a clock face, where the clock face includes one or more complication areas, receive (e.g., with receiving unit 1110) a first user input, and, in response to receiving the first user input, enter a clock face edit mode of the electronic device. Processing unit 1108 is further configured to, while in the clock face edit mode, receive (e.g., with receiving unit 1110) a second user input corresponding to selection of a first complication area of the one or more complication areas and, in response to receiving the second user input corresponding to selection of the first complication area, enable (e.g., with display enabling unit 1114) display of one or more representations of at least one of the one or more complications associated with the application, where the one or more representations includes a first representation of a first complication from the at least one of the one or more complications associated with the application and the first complication includes content associated with the first complication. Processing unit 1108 is further configured to determine (e.g., with determining unit 1116) a first display format for the content associated with the first complication, receive (e.g., with receiving unit 1110) a third user input corresponding to selection of the first representation of the first complication, and, in response to receiving the third user input, associate the first complication with the first complication area of the clock face. Processing unit 1108 is further configured to, while in the clock face edit mode, receive (e.g., with receiving unit 1110) a fourth user input and, in response to receiving the fourth user input: exit the clock face edit mode; and enable (e.g., with display enabling unit 1114) display of a second user interface screen including the clock face, where the clock face on the second user interface screen includes the first complication in the first complication area and the first complication includes a representation of the content formatted according to the first display format.

In some embodiments, the first complication includes a layout with one or more designated areas, where the content associated with the first complication is associated with a first designated area of the one or more designated areas and determining the first display format for the content includes: determining (e.g., with determining unit 1116) a size of the first designated area; and determining (e.g., with determining unit 1116) the first display format from a plurality of available display formats based on at least the content and the size of the first designated area.

In some embodiments, the content is associated with a display style and selecting the first display format is further based on the display style associated with the content. Optionally, the display style includes a font associated with the content.

In some embodiments, each display format of the plurality of available display formats corresponds to a display size of the information formatted according to the respective display format and determining the first display format further includes: determining (e.g., with determining unit 1116) an optimized display format, where the optimized display format is determined to be the display format of the plurality of available display formats that corresponds to the largest display size of the display sizes corresponding to the plurality of available display formats that does not exceed the size of the first designated area; and determining (e.g., with determining unit 1116) the first display format to be the optimized display format.

In some embodiments, the plurality of available display formats forms a hierarchy ranked according to the display sizes corresponding to the display formats of the plurality of available display formats and determining the first display format further includes: determining (e.g., with determining unit 1116) whether the optimized display format is below a predetermined lowest allowable display format in the hierarchy; and in accordance with a determination that the optimized display format is below the lowest allowable display format in the hierarchy, determining (e.g., with determining unit 1116) the first display format to be the lowest allowable display format.

In some embodiments, determining the first display format of the content from the plurality of available display formats further comprises: determining (e.g., with determining unit 1116) whether the optimized display format is above a predetermined highest allowable display format in the hierarchy; and in accordance with a determination that the optimized display format is above the highest allowable display format in the hierarchy, determining (e.g., with determining unit 1116) the first display format to be the lowest allowable display format.

In some embodiments, processing unit 1108 is further configured to: determine (e.g., with determining unit 1116) whether the display size corresponding to the first display format exceeds the size of the first designated area; and in accordance with a determination that the display size corresponding to the first display format exceeds the size of the first designated area, truncate the representation of the information to the size of the first designated area.

In some embodiments, the plurality of available display formats is a defined set that is based on the content of the information. In some embodiments, the content of the information represents a point in time, a duration, an offset, or a decimal number.

The operations described above with reference to FIGS. 10A-10B are, optionally, implemented by components depicted in FIGS. 1A-1B or FIG. 11. For example, receiving operations 1002, 1008, 1012, 1018, and 1022, loading and storing operation 1004, displaying operations 1006 and 1014, entering operation 1010, determining operations 1016, associating operation 1020, and exiting and displaying operation 1024 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub event, such as activation of an affordance on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
    a display;
    one or more processors;
    a memory; and
    one or more programs, wherein the one or more programs are stored in the memory and configured to be executed by the one or more processors, the one or more programs including instructions for:
        receiving content;
        determining a size of a first designated area of the display;
        determining, for the content, a first display format from a plurality of available display formats based on at least the content and the size of the first designated area, wherein the first display format corresponds to a first amount of abbreviation;
        abbreviating, according to the first display format, a first portion of the content to produce a first representation of the content;
        displaying the first representation;
        determining a size of a second designated area of the display different from the first designated area;
        determining, for the content, a second display format for the content from the plurality of available display formats based on at least the content and the size of the second designated area, wherein the second display format is different from the first display format and corresponds to a second amount of abbreviation different from the first amount of abbreviation;
        abbreviating, according to the second display format, a second portion of the content to produce a second representation of the content; and
        displaying the second representation.

2. The device of claim 1,
    wherein the content is associated with a display style, and
    wherein determining the first display format is further based on the display style associated with the content.

3. The device of claim 2, wherein the display style includes a font associated with the content.

4. The device of claim 1,
    wherein each display format of the plurality of available display formats corresponds to a display size of the content formatted according to the respective display format, and
    wherein determining the first display format of the content from the plurality of available display formats comprises:

determining an optimized display format, wherein the optimized display format is determined to be the display format of the plurality of available display formats that corresponds to the largest display size of the display sizes corresponding to the plurality of available display formats that does not exceed the size of the designated area; and determining the first display format to be the optimized display format.

5. The device of claim 4, wherein the plurality of available display formats forms a hierarchy ranked according to the display sizes corresponding to the display formats of the plurality of available display formats, and wherein determining the first display format of the content from the plurality of available display formats further comprises:

determining whether the optimized display format is below a predetermined lowest allowable display format in the hierarchy; and in accordance with a determination that the optimized display format is below the lowest allowable display format in the hierarchy, determining the first display format to be the lowest allowable display format.

6. The device of claim 5, wherein determining the first display format of the content from the plurality of available display formats further comprises:

determining whether the optimized display format is above a predetermined highest allowable display format in the hierarchy; and in accordance with a determination that the optimized display format is above the highest allowable display format in the hierarchy, determining the first display format to be the highest allowable display format.

7. The device of claim 5, the one or more programs further including instructions for:

determining whether the display size corresponding to the first display format exceeds the size of the designated area; and in accordance with a determination that the display size corresponding to the first display format exceeds the size of the designated area, truncating the representation of the content to the size of the designated area.

8. The device of claim 1, wherein the plurality of available display formats associated with the content is a defined set.

9. The device of claim 1, wherein the content represents a point in time, a duration, an offset, or a decimal number.

10. The device of claim 1, wherein the content is at least part of data representing a watch face complication.

11. The device of claim 10, wherein the complication includes a layout with one or more designated areas including the designated area associated with the content.

12. The device of claim 11, wherein the data representing the complication includes second content associated with a second designated area of the one or more designated areas, wherein the second designated area is distinct from the designated area associated with the content.

13. The electronic device of claim 1, wherein the first portion describes a property of the content, and wherein the second portion describes the property of the content.

14. The electronic device of claim 13, wherein the property is a day or a month.

15. A method, comprising:

at an electronic device with one or more processors, memory, and a display:
receiving content;

determining a size of a first designated area of the display;

determining, for the content, a first display format from a plurality of available display formats based on at least the content and the size of the first designated area, wherein the first display format corresponds to a first amount of abbreviation;

abbreviating, according to the first display format, a first portion of the content to produce a first representation of the content;

displaying the first representation;

determining a size of a second designated area of the display different from the first designated area;

determining, for the content, a second display format for the content from the plurality of available display formats based on at least the content and the size of the second designated area, wherein the second display format is different from the first display format and corresponds to a second amount of abbreviation different from the first amount of abbreviation;

abbreviating, according to the second display format, a second portion of the content to produce a second representation of the content; and displaying the second representation.

16. The method of claim 15, wherein the content is associated with a display style, and wherein determining the first display format is further based on the display style associated with the content.

17. The method of claim 16, wherein the display style includes a font associated with the content.

18. The method of claim 15, wherein each display format of the plurality of available display formats corresponds to a display size of the content formatted according to the respective display format, and wherein determining the first display format of the content from the plurality of available display formats comprises:

determining an optimized display format, wherein the optimized display format is determined to be the display format of the plurality of available display formats that corresponds to the largest display size of the display sizes corresponding to the plurality of available display formats that does not exceed the size of the designated area; and determining the first display format to be the optimized display format.

19. The method of claim 18, wherein the plurality of available display formats forms a hierarchy ranked according to the display sizes corresponding to the display formats of the plurality of available display formats, and wherein determining the first display format of the content from the plurality of available display formats further comprises:

determining whether the optimized display format is below a predetermined lowest allowable display format in the hierarchy; and in accordance with a determination that the optimized display format is below the lowest allowable display format in the hierarchy, determining the first display format to be the lowest allowable display format.

20. The method of claim 19, wherein determining the first display format of the content from the plurality of available display formats further comprises:

determining whether the optimized display format is above a predetermined highest allowable display format in the hierarchy; and
in accordance with a determination that the optimized display format is above the highest allowable display format in the hierarchy, determining the first display format to be the highest allowable display format.

21. The method of claim 19, further comprising:
determining whether the display size corresponding to the first display format exceeds the size of the designated area; and
in accordance with a determination that the display size corresponding to the first display format exceeds the size of the designated area, truncating the representation of the content to the size of the designated area.

22. The method of claim 15, wherein the plurality of available display formats associated with the content is a defined set.

23. The method of claim 15, wherein the content represents a point in time, a duration, an offset, or a decimal number.

24. The method of claim 15, wherein the content is at least part of data representing a watch face complication.

25. The method of claim 24, wherein the complication includes a layout with one or more designated areas including the designated area associated with the content.

26. The method of claim 25, wherein the data representing the complication includes second content associated with a second designated area of the one or more designated areas, wherein the second designated area is distinct from the designated area associated with the content.

27. The method of claim 15, wherein the first portion describes a property of the content, and wherein the second portion describes the property of the content.

28. The method of claim 27, wherein the property is a day or a month.

29. A non-transitory computer-readable storage medium storing one or more programs, the one or more programs comprising instructions, which when executed by one or more processors of an electronic device with a display and memory, cause the electronic device to:
receive content;
determine a size of a first designated area of the display;
determine, for the content, a first display format from a plurality of available display formats based on at least the content and the size of the first designated area, wherein the first display format corresponds to a first amount of abbreviation;
abbreviate, according to the first display format, a first portion of the content to produce a first representation of the content;
display the first representation;
determine a size of a second designated area of the display different from the first designated area;
determine, for the content, a second display format for the content from the plurality of available display formats based on at least the content and the size of the second designated area, wherein the second display format is different from the first display format and corresponds to a second amount of abbreviation different from the first amount of abbreviation;
abbreviate, according to the second display format, a second portion of the content to produce a second representation of the content; and
display the second representation.

30. The non-transitory computer-readable storage medium of claim 29,
wherein the content is associated with a display style, and
wherein the instructions further cause the device to determine the first display format is further based on the display style associated with the content.

31. The non-transitory computer-readable storage medium of claim 30, wherein the display style includes a font associated with the content.

32. The non-transitory computer-readable storage medium of claim 29,
wherein each display format of the plurality of available display formats corresponds to a display size of the content formatted according to the respective display format, and
wherein the instructions further cause the device to determine the first display format of the content from the plurality of available display formats, and wherein the instructions further cause the device to:
determine an optimized display format, wherein the optimized display format is determined to be the display format of the plurality of available display formats that corresponds to the largest display size of the display sizes corresponding to the plurality of available display formats that does not exceed the size of the designated area; and
determine the first display format to be the optimized display format.

33. The non-transitory computer-readable storage medium of claim 32,
wherein the plurality of available display formats forms a hierarchy ranked according to the display sizes corresponding to the display formats of the plurality of available display formats, and
wherein the instructions further cause the device to determine the first display format of the content from the plurality of available display formats, and wherein the instructions further cause the device to:
determine whether the optimized display format is below a predetermined lowest allowable display format in the hierarchy; and
in accordance with a determination that the optimized display format is below the lowest allowable display format in the hierarchy, determine the first display format to be the lowest allowable display format.

34. The non-transitory computer-readable storage medium of claim 33,
wherein the instructions further cause the device to determine the first display format of the content from the plurality of available display formats, and wherein the instructions further cause the device to:
determine whether the optimized display format is above a predetermined highest allowable display format in the hierarchy; and
in accordance with a determination that the optimized display format is above the highest allowable display format in the hierarchy, determine the first display format to be the highest allowable display format.

35. The non-transitory computer-readable storage medium of claim 33, wherein the instructions further cause the device to:
determine whether the display size corresponding to the first display format exceeds the size of the designated area; and
in accordance with a determination that the display size corresponding to the first display format exceeds the size of the designated area, truncate the representation of the content to the size of the designated area.

36. The non-transitory computer-readable storage medium of claim 29, wherein the plurality of available display formats associated with the content is a defined set.

37. The non-transitory computer-readable storage medium of claim 29, wherein the content represents a point in time, a duration, an offset, or a decimal number.

38. The non-transitory computer-readable storage medium of claim 29, wherein the content is at least part of data representing a watch face complication.

39. The non-transitory computer-readable storage medium of claim 38, wherein the complication includes a layout with one or more designated areas including the designated area associated with the content.

40. The non-transitory computer-readable storage medium of claim 39, wherein the data representing the complication includes second content associated with a second designated area of the one or more designated areas, wherein the second designated area is distinct from the designated area associated with the content.

41. The non-transitory computer-readable storage medium of claim 29, wherein the first portion describes a property of the content, and wherein the second portion describes the property of the content.

42. The non-transitory computer-readable storage medium of claim 41, wherein the property is a day or a month.

* * * * *